(12) United States Patent
Wantanbe et al.

(10) Patent No.: US 9,749,615 B2
(45) Date of Patent: Aug. 29, 2017

(54) IMAGE DISPLAY DEVICE HAVING DIFFUSING MEANS OR IMAGE SEPARATING MEANS ALLOWING IMAGE TO BE OBSERVED

(71) Applicant: Panasonic Intellectual Property Corporation of America, Torrance, CA (US)

(72) Inventors: Tatsumi Wantanbe, Osaka (JP); Ken Mashitani, Osaka (JP); Nobuyuki Kunieda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 679 days.

(21) Appl. No.: 13/902,107

(22) Filed: May 24, 2013

(65) Prior Publication Data
US 2013/0314512 A1    Nov. 28, 2013

(30) Foreign Application Priority Data
May 24, 2012    (JP) .................................. 2012-118875

(51) Int. Cl.
*H04N 13/04* (2006.01)
(52) U.S. Cl.
CPC ..... *H04N 13/0402* (2013.01); *H04N 13/0411* (2013.01); *H04N 13/0415* (2013.01); *H04N 13/0418* (2013.01)
(58) Field of Classification Search
CPC ........... H04N 13/0402; H04N 13/0411; H04N 13/0415; H04N 13/0418; G02B 27/2214;
(Continued)

(56) References Cited

U.S. PATENT DOCUMENTS

| 7,268,943 | B2 | 9/2007 | Lee |
| 7,957,060 | B2 * | 6/2011 | Mashitani .......... G02B 27/2214 359/462 |

(Continued)

FOREIGN PATENT DOCUMENTS

| JP | 8-304735 | 11/1996 |
| JP | 2010-282098 | 12/2010 |

(Continued)

OTHER PUBLICATIONS

Goo Hamagishi et al., "Autostereoscopic 3D Displays using Image-Splitter Method", Journal of The Institute of Image Information and Television Engineers, vol. 51, No. 7, pp. 1070-1078, (1997).

*Primary Examiner* — Jessica M Prince
(74) *Attorney, Agent, or Firm* — Wenderoth, Lind & Ponack, L.L.P.

(57) ABSTRACT

A parallax composite image displayed by image display means may be observed as predetermined parallax image at predetermined position by reflecting and guiding light from light source means and by using a diffusion pattern in which diffusion patterns are engraved at predetermined intervals to diffuse and transmit incident light on the diffusion pattern to the image display means. A fine notched structure is provided to cyclically and symmetrically vary the diffusion patterns in the horizontal direction. A structure is provided to control an amount and range of blur of pixels visible through light diffused toward the image display means by the diffusion pattern to which recesses and protrusions are added. By evaluating and adjusting a cycle of the notched structure so as to be appropriate, resultant adverse effects from the notched structure itself may be suppressed. Bright-dark patterns having a relatively long cycle may be reduced without increasing crosstalk.

4 Claims, 53 Drawing Sheets

(58) Field of Classification Search
CPC ...... G02B 27/22; G02B 6/004; G02B 6/0043;
G02B 6/0068; G02B 27/60; G02B
6/0036; G02B 6/0053; G02B 6/0055;
G02B 6/0061; G02B 6/0096; G02F
1/133615; G02F 2001/133607; G09G
2320/02
USPC .......................................................... 348/51
See application file for complete search history.

(56) References Cited

U.S. PATENT DOCUMENTS

| | | |
|---|---|---|
| 2005/0073472 A1 | 4/2005 | Kim et al. |
| 2010/0142220 A1* | 6/2010 | Lee ................ G02B 6/0053 362/609 |
| 2011/0187832 A1* | 8/2011 | Yoshida ............ A63F 13/02 348/46 |
| 2012/0075698 A1* | 3/2012 | Minami ............ G02B 6/0043 359/462 |
| 2014/0160562 A1 | 6/2014 | Minami |

FOREIGN PATENT DOCUMENTS

| | | |
|---|---|---|
| JP | 2012-68588 | 4/2012 |
| WO | 2010/007787 | 1/2010 |

\* cited by examiner

FIG. 7
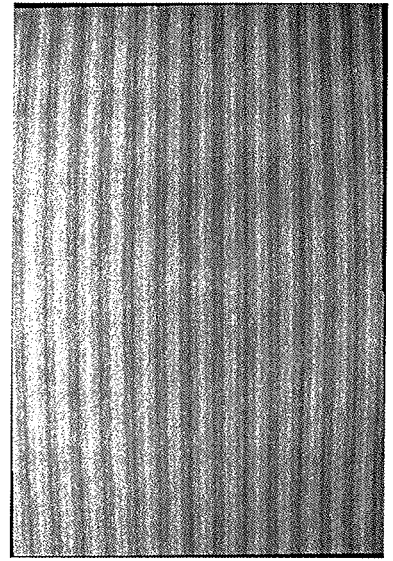
(b) COARSE HORIZONTAL STRIPES
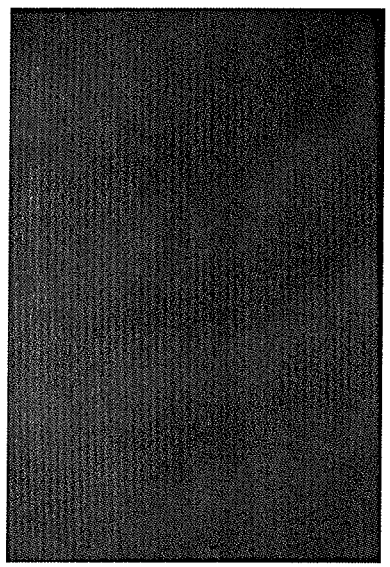
(a) FINE HORIZONTAL STRIPES

FIG. 8

| | 0 | FEW HORIZONTAL STRIPES | |
|---|---|---|---|
| | 1 | FINE STRIPES | HORIZONTAL STRIPES OBSERVED |
| | 2 | INTERMEDIATE STRIPES | |
| | 3 | WIDE STRIPES | |
| | 4 | VERTICAL STRIPES OBSERVED | |
| | 5 | DIAGONAL STRIPES OBSERVED | |

VISIBILITY EVALUATION OF HORIZONTAL STRIPES

FIG. 10

| INTEGER RATIO TO VERTICAL SUB-PIXEL LENGTH | PITCH WIDTH (μm) | STATE OF HORIZONTAL STRIPES (VISIBILITY EVALUATION) |
|---|---|---|
| | 92 | 0 |
| | 92.5 | 0 |
| | 93 | 0 |
| | 93.5 | 1 |
| | 94 | 1 |
| | 94.5 | 1 |
| | 95 | 2 |
| | 95.5 | 3 |
| 5 | 96 | 0 |
| | 96.5 | 3 |
| | 97 | 2 |
| | 97.5 | 2 |
| | 98 | 1 |
| | 98.5 | 1 |
| | 99 | 1 |
| | 99.5 | 0 |
| | 100 | 0 |
| | 100.5 | 0 |
| | 101 | 0 |
| | 101.5 | 0 |
| | 102 | 0 |
| | 102.5 | 5 |
| | 103 | 4 |
| | 103.5 | 4 |
| | 104 | 5 |
| | 104.5 | 5 |
| | 105 | 0 |
| | 105.5 | 0 |
| | 106 | 0 |
| | 106.5 | 0 |
| | 107 | 0 |
| | 107.5 | 0 |
| | 108 | 0 |
| | 108.5 | 0 |
| | 109 | 4 |
| | 109.5 | 4 |
| | 110 | 0 |
| | 110.5 | 0 |
| | 111 | 0 |

| | | |
|---|---|---|
| | 111.5 | 0 |
| | 112 | 0 |
| | 112.5 | 0 |
| | 113 | 0 |
| | 113.5 | 1 |
| | 114 | 1 |
| | 114.5 | 1 |
| | 115 | 1 |
| | 115.5 | 1 |
| | 116 | 2 |
| | 116.5 | 2 |
| | 117 | 2 |
| | 117.5 | 2 |
| | 118 | 3 |
| | 118.5 | 3 |
| | 119 | 3 |
| | 119.5 | 3 |
| 4 | 120 | 0 |
| | 120.5 | 3 |
| | 121 | 3 |
| | 121.5 | 3 |
| | 122 | 2 |
| | 122.5 | 2 |
| | 123 | 2 |
| | 123.5 | 1 |
| | 124 | 1 |
| | 124.5 | 1 |
| | 125 | 1 |

▮ RATIO OF VERTICAL SUB-PIXEL LENGTH TO NOTCH CYCLE IS INTEGER RATIO n

▭ INCLUDES NOTCH CYCLE CAUSING DIAGONAL /VERTICAL STRIPES BESIDES HORIZONTAL STRIPES FOR VERTICAL HEIGHT (PITCH) OF NOTCHED STRUCTURE

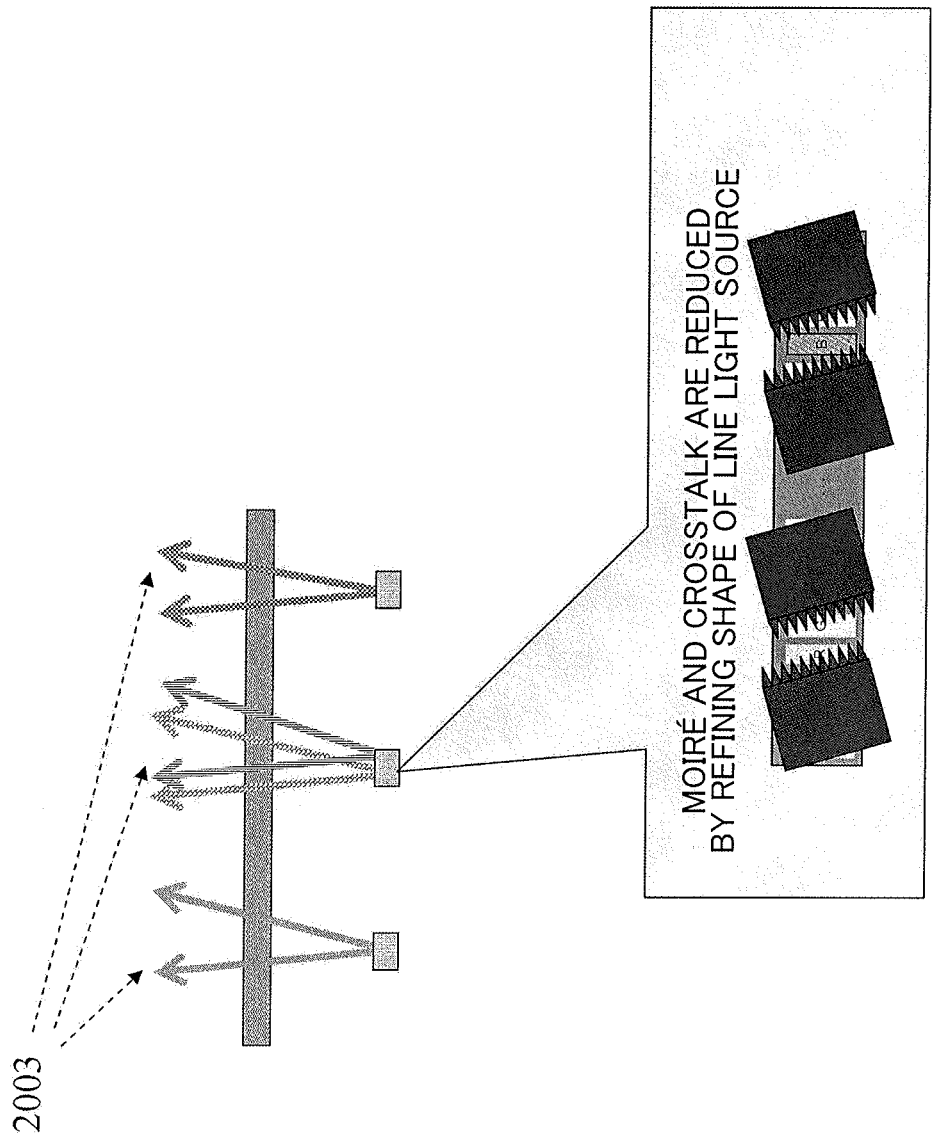

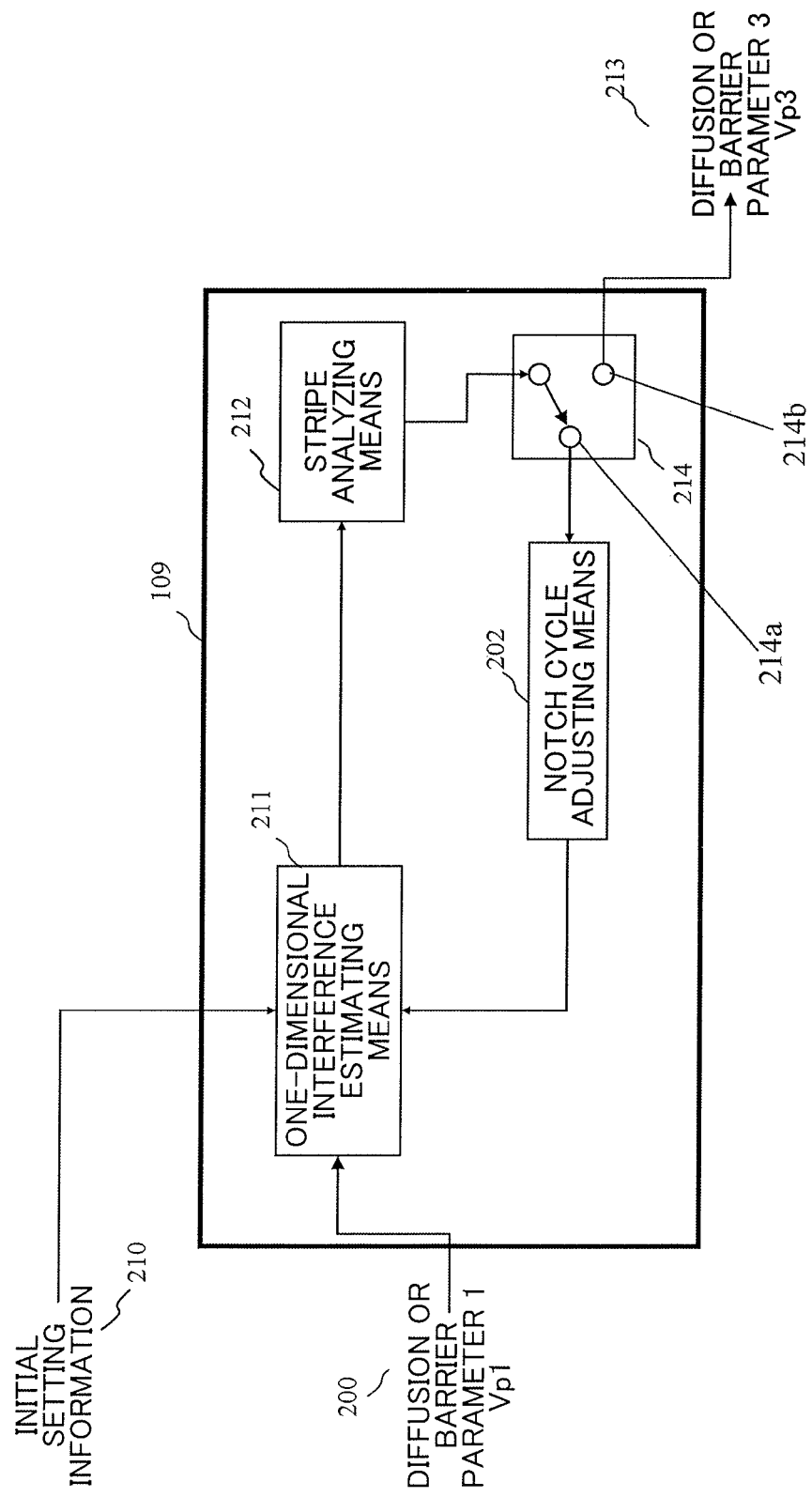

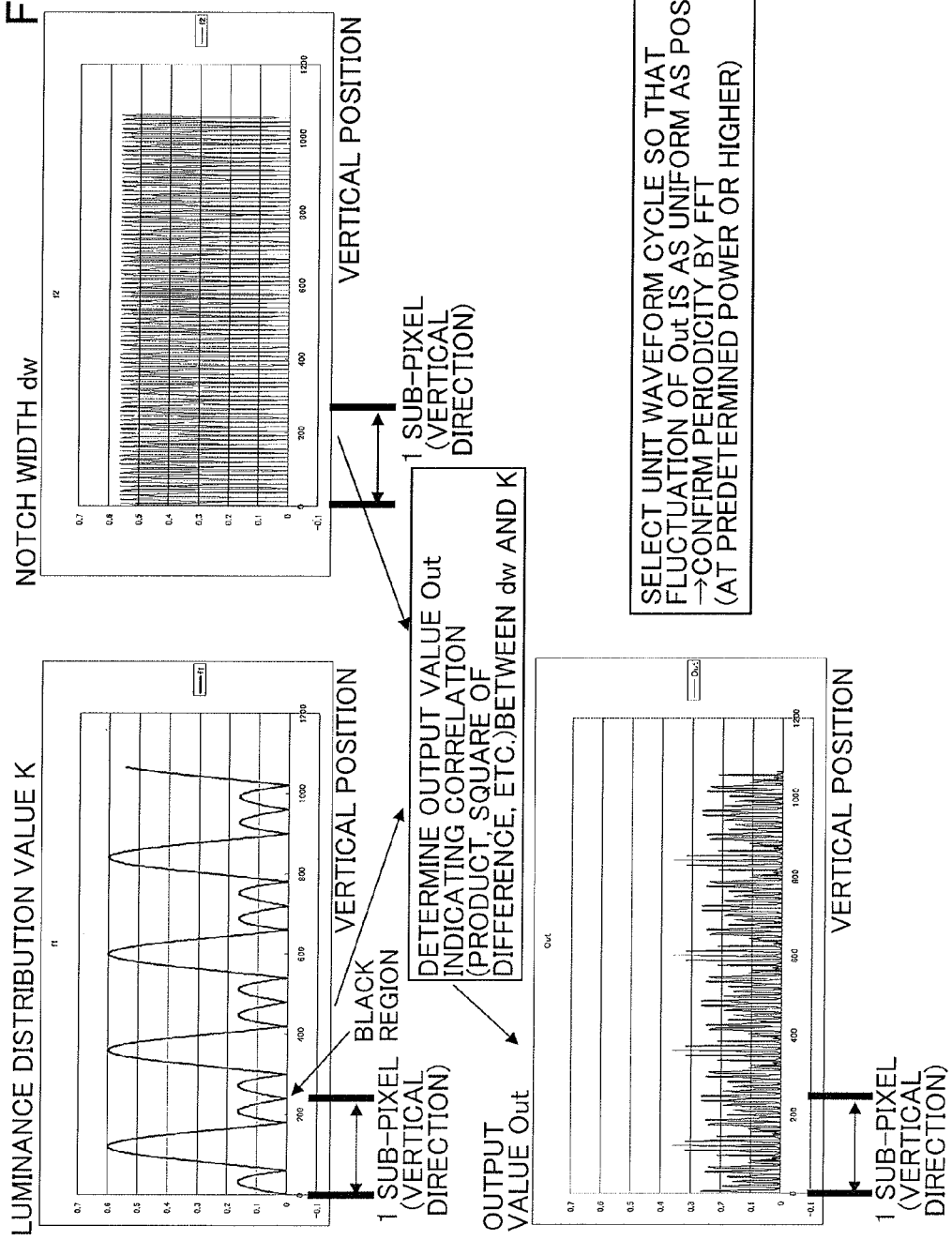

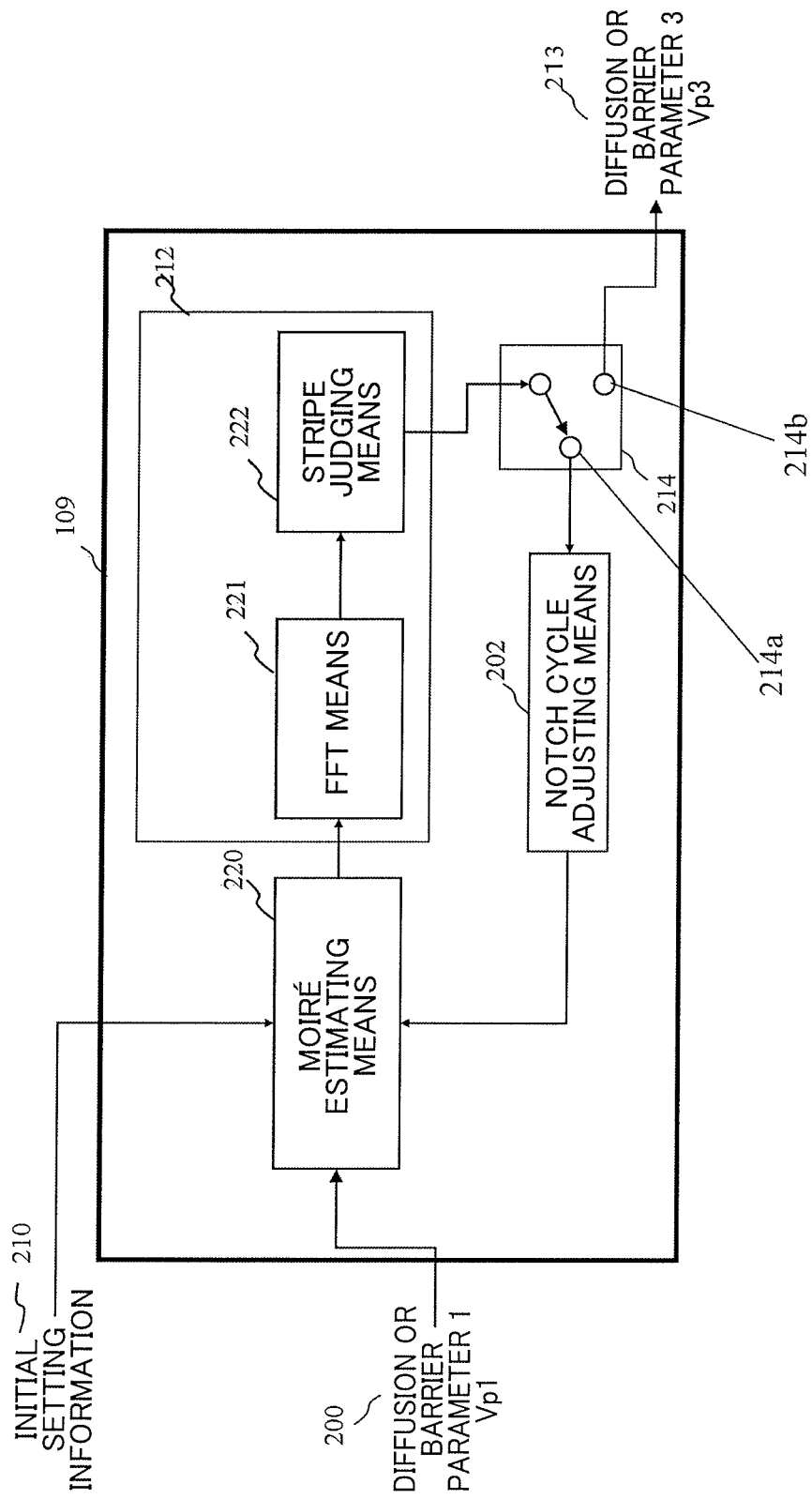

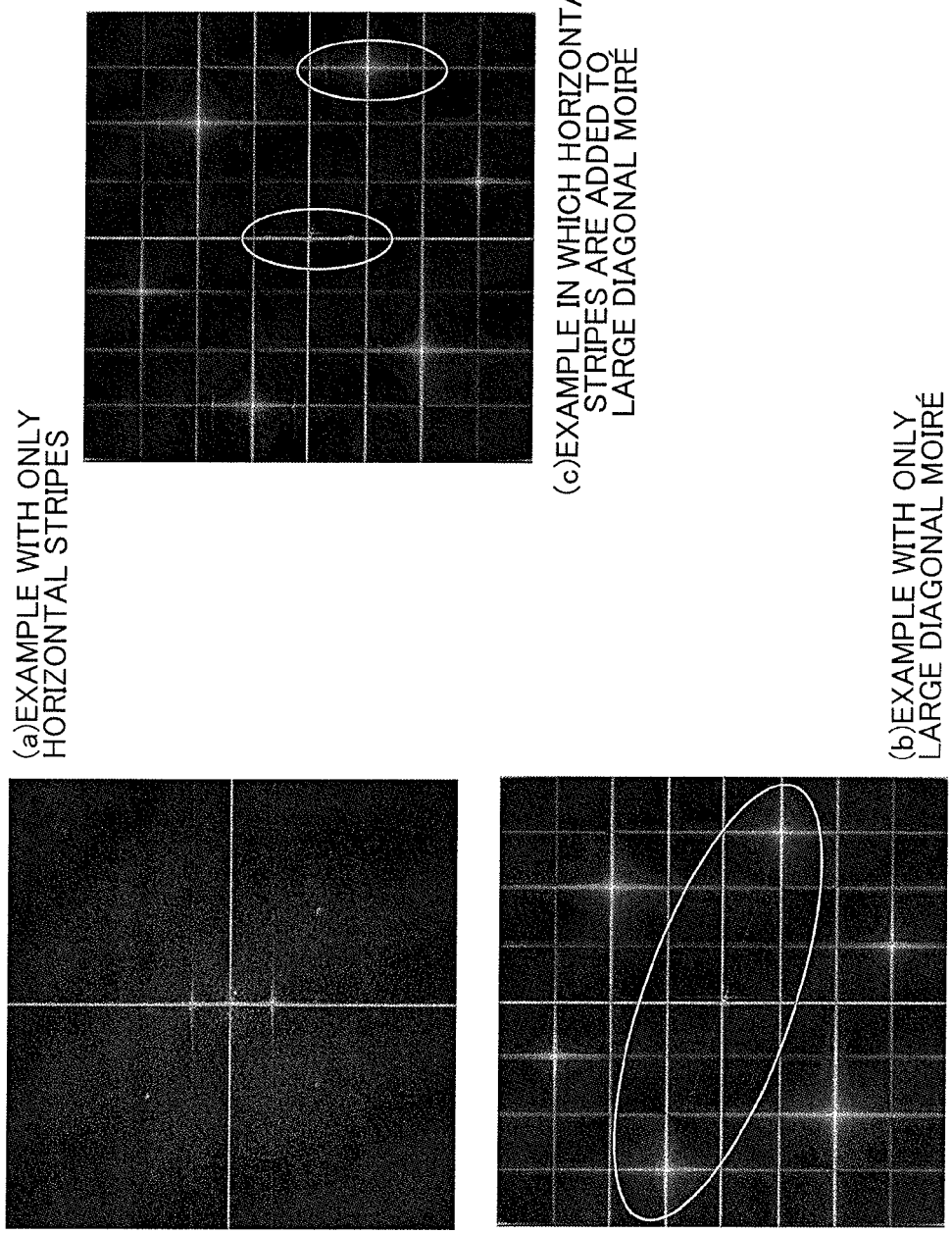

FIG. 22
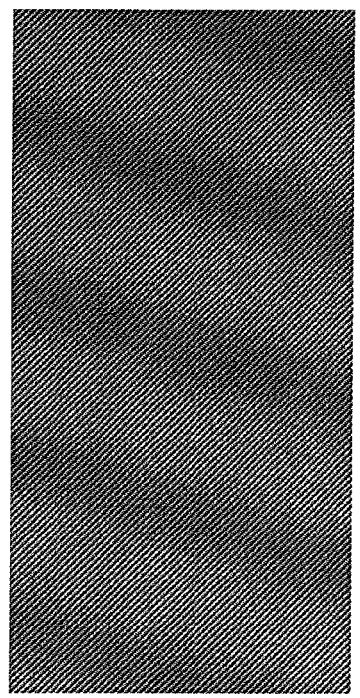
(a) REFERENCE 1
(INCLINATION: 18.435 DEGREES)
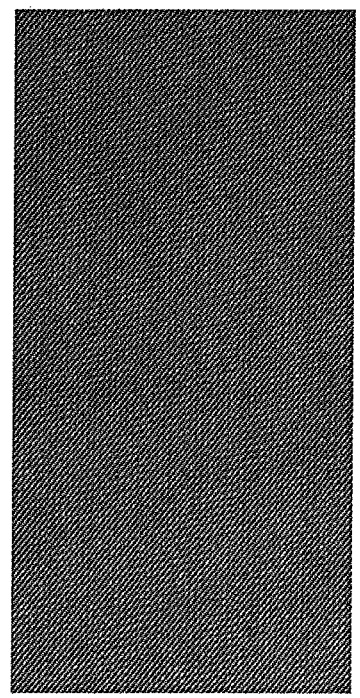
(b) REFERENCE 2
(INCLINATION: 23 DEGREES)

STEP BARRIER

SLANT BARRIER

PRIOR ART
FIG. 51
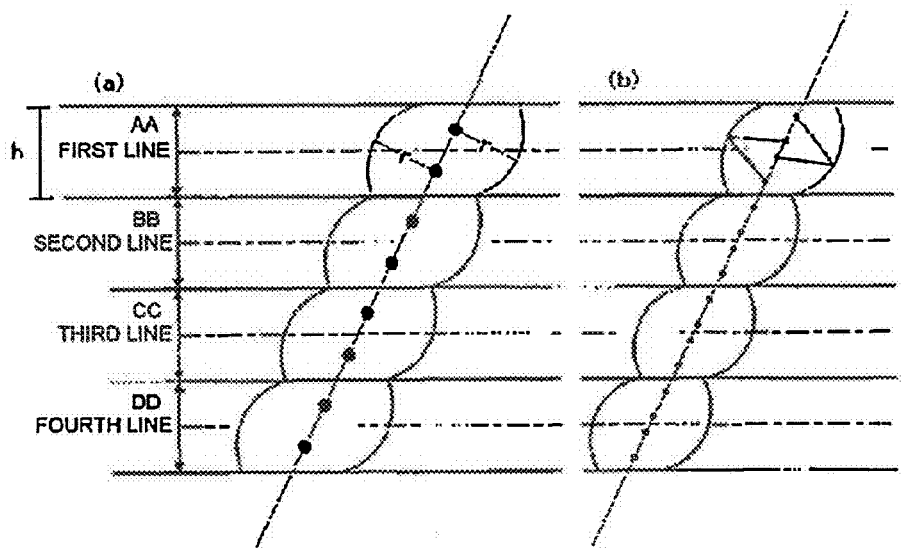
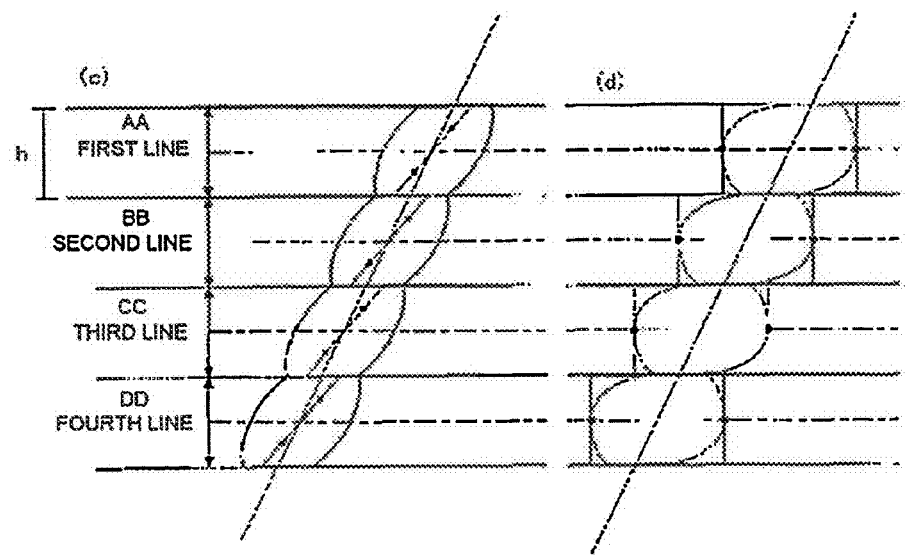
AA FIRST LINE
BB SECOND LINE
CC THIRD LINE
DD FOURTH LINE

IMAGE DISPLAY DEVICE HAVING DIFFUSING MEANS OR IMAGE SEPARATING MEANS ALLOWING IMAGE TO BE OBSERVED

CROSS-REFERENCE TO RELATED APPLICATIONS

This application is based on Japanese Patent Application No. 2012-118875 filed on May 24, 2012, the contents of which are hereby incorporated by reference.

BACKGROUND OF THE INVENTION

1. Field of the Invention

The present invention relates to an image display device which allows a stereoscopic image to be observed without special eyeglasses.

2. Description of the Related Art

A device which is known as a prior art of a device for displaying a stereoscopic image without special eyeglasses has a parallax barrier, a lenticular lens or alike (spectroscopic means) situated on an observer side of a display device such as a liquid crystal panel or a plasma display panel (PDP). The spectroscopic means horizontally separates light from left and right eye images, which are displayed on a display panel, to provide a stereoscopic image.

FIG. 52 shows principles of an eyeglass-free stereoscopic image display device which uses a parallax barrier. In the drawing, reference numeral 1 denotes an image display panel and 2 denotes a parallax barrier. Rows, in which left eye pixels L are aligned vertically, and rows, in which right eye pixels R are aligned vertically, are alternately formed on the image display panel ("Autostereoscopic 3D Displays using Image-Splitter Method", Journal of The Institute of Image Information and Television Engineers, Vol. 51, No. 7, pp. 1070-1078, (1997)). Many slit openings 2a, which extend vertically, are formed on the parallax barrier 2. Barrier portions 2b, which extend vertically, are formed between the openings 2a. It should be noted that there is sufficient binocular parallax between a left eye image, which is formed by the left eye pixels L, and a right eye image, which is formed by the right eye pixels R, for a person to perceive a stereoscopic image. An observer attempting to observe a stereoscopic image may position the head at a predetermined position (ordinary viewing position) so that a left eye image 3L enters the left eye 4L through the opening 2a while a right eye image 3R enters the right eye 4R through the opening 2a to perceive a stereoscopic image. Meanwhile, light of the right eye image is blocked by the barrier portion 2b and prevented from entering the left eye 4L, and light of the left eye image is blocked by the barrier portion 2b and prevented from entering the right eye 4R. However, it has been figured out so far that such a stereoscopic image display device causes interference fringes (moiré) between a pattern of the parallax barrier and a pixel pattern of a plasma display, and that a moiré condition depends on a width or a shape of the openings of the parallax barrier. In general, a region referred to as a black matrix for preventing color mixture among RGB sub-pixels exists in a liquid crystal display (LCD) or a PDP (a black matrix is also referred to as a rib for LCD). Besides the black matrix between sub-pixels, auxiliary electrodes or alike may be arranged on each sub-pixel. Therefore, the black matrix and the auxiliary electrodes are observed through slits in the parallax barrier. Consequently, contrast is created between an opening, in which there is a large visible ratio of the black matrix and the auxiliary electrode, and another opening, in which there is a small visible ratio of the black matrix and the auxiliary electrode although it depends on observing positions. Accordingly, uneven luminance (moiré) is created on a screen and causes problems about significant degrade of image quality. As an example of moiré, FIG. 48 shows moiré patterns observed through a step barrier, which has stepped slits in front of a display displaying white on the entire display screen, and through a slanted barrier, which has slanted slits in front of the display. In this case, the opened slits in the drawing is horizontally as wide as sub-pixels (opening ratio of 1). As shown in the drawing, in the case of a step barrier, grid-like moiré is likely to result from fluctuation in a mixture ratio between black matrix portions and pixel portions of upper, lower, left and right regions which are visible through slits of the step barrier. The fluctuation is caused by a change in observing position. In contrast, there is a smaller fluctuation of an observed pixel area in the case of a slanted barrier than in the case of a step barrier, regardless of a positional relationship. Therefore, the slanted barrier is likely to cause weaker contrast of moiré than the step barrier. In particular, horizontal moiré patterns become less visible. However, in both cases, moiré patterns are visible in this manner. Notable image deterioration occurs during 2D viewing but not 3D viewing. In order to remove such moiré patterns in 3D image display, a method, in which a first plate having a pattern formed in a first cycle and a second plate having a pattern formed in a second cycle are crossed at a predetermined angle, has already been proposed. FIG. 49 schematically shows this condition. FIG. 49 shows a barrier pattern inclined at a range of 20 to 30 degrees with respect to pixels in order to reduce moiré (US 2005-0073472).

Another prior art example, in which a vertical stripe pattern in a tooth shape with a half size of a barrier pitch, has been reported, as shown in FIG. 50. In this case, averaging between pixels and a black matrix increases (U.S. Pat. No. 7,268,943). Besides the aforementioned shape, an example using a zigzag or curved pattern as shown in FIG. 51 has also been reported (WO 2010/007787).

US Patent Application No. 2005-0073472 describes a method for making moiré less noticeable by significantly inclining a barrier as shown in FIG. 49 to increase degree of suppressing a fluctuation in observed pixel area from an observing position. However, when actually inclining a barrier angle, adjacent pixels become more visible from a single slot simultaneously. Accordingly, crosstalk increases.

With a vertical stripe pattern in tooth shape which has a half size of a barrier pitch as shown in FIG. 50, an increase in average opening ratio makes image blur more noticeable because of an increase in crosstalk although averaging between pixels and a black matrix increases as described in U.S. Pat. No. 7,268,943. As described below, in the cause of such a size, adverse effects are more likely to result from the tooth shape itself because of a balance between a size and a number of viewpoints.

As described in WO 2010/007787, cases using a zigzag or a curved pattern as shown in FIG. 51 have also been reported. These cases aim to make jump points less noticeable by resultant mixture between adjacent parallax pixels from elliptical arc edges of openings. In other words, like the two conventional examples described above, image blur is likely to become more noticeable because of an increase in crosstalk.

In the aforementioned circumference, a reduction in moiré contrast is inadvertently accompanied by an increase in crosstalk. In other words, there is a tradeoff between moiré intensity and an amount of crosstalk, and improving one worsens the other. Therefore, a challenge is to determine what kind of measure is capable of reducing moiré intensity with an insignificant increase in crosstalk.

SUMMARY OF THE INVENTION

With an image display device of the present invention, moiré reduction is performed by providing means for guiding light from a light source, arranging a diffusion pattern at predetermined intervals to diffuse light, and adding a notched structure to edge portions of the diffusion pattern, which diffuses and separates incident light on the diffusion pattern in a predetermined direction of display means. By providing a mechanism which determines a cycle of an uneven portion (notches) so that adverse effects are not created by the notches themselves of the diffusion pattern edges, stereoscopic image display is provided such that an amount/range of blur of pixels visible under illumination and orientation of diffused light from the diffusion pattern toward the display means can be controlled.

With the image display device according to the present invention, stereoscopic image display can be realized by determining a cycle of an uneven portion (notches) so that adverse effects are not created by the notches themselves and adding a notched structure to diffusion pattern edge portions in order to control an amount/range of blur of pixels visible under illumination and orientation of diffused light from the pattern toward display means.

The above and other objects, features, and advantages of the present invention will become more apparent from a reading of the following detailed description taken in connection with the accompanying drawings.

BRIEF DESCRIPTION OF THE DRAWINGS

FIG. 7 shows an example of (horizontal) stripes that are created under inappropriate selection of a cycle of the notched structure of the image display device as the first invention according to the present invention;

FIG. 8 shows an example of visibility evaluation for horizontal/diagonal/vertical stripes using moiré simulation;

FIG. 10 shows the second example which represents results of visual confirmation of presence/absence of horizontal/diagonal/vertical stripes for a notch cycle using moiré simulation;

FIG. 13B schematically shows an example that combines a line light source with notches as another example of the image display device as the second invention according to the present invention;

FIG. 14 shows a configuration of a notch adjusting means in an image display device as the third invention according to the present invention;

FIG. 15 schematically shows a stripe analyzing means in the notch adjusting means of the image display device as the third invention according to the present invention;

FIG. 16 shows another configuration of the notch adjusting means in the image display device as the third invention according to the present invention;

FIG. 17 schematically shows an FFT-based stripe analyzing means in the notch adjusting means of the image display device as the third invention according to the present invention;

FIG. 22 shows an example of a reference data image used by the image display device as the fourth invention according to the present invention;

FIG. 51 schematically shows a third prior art example of a conventional barrier pattern.

DESCRIPTION OF THE PREFERRED EMBODIMENTS

Figure 1:
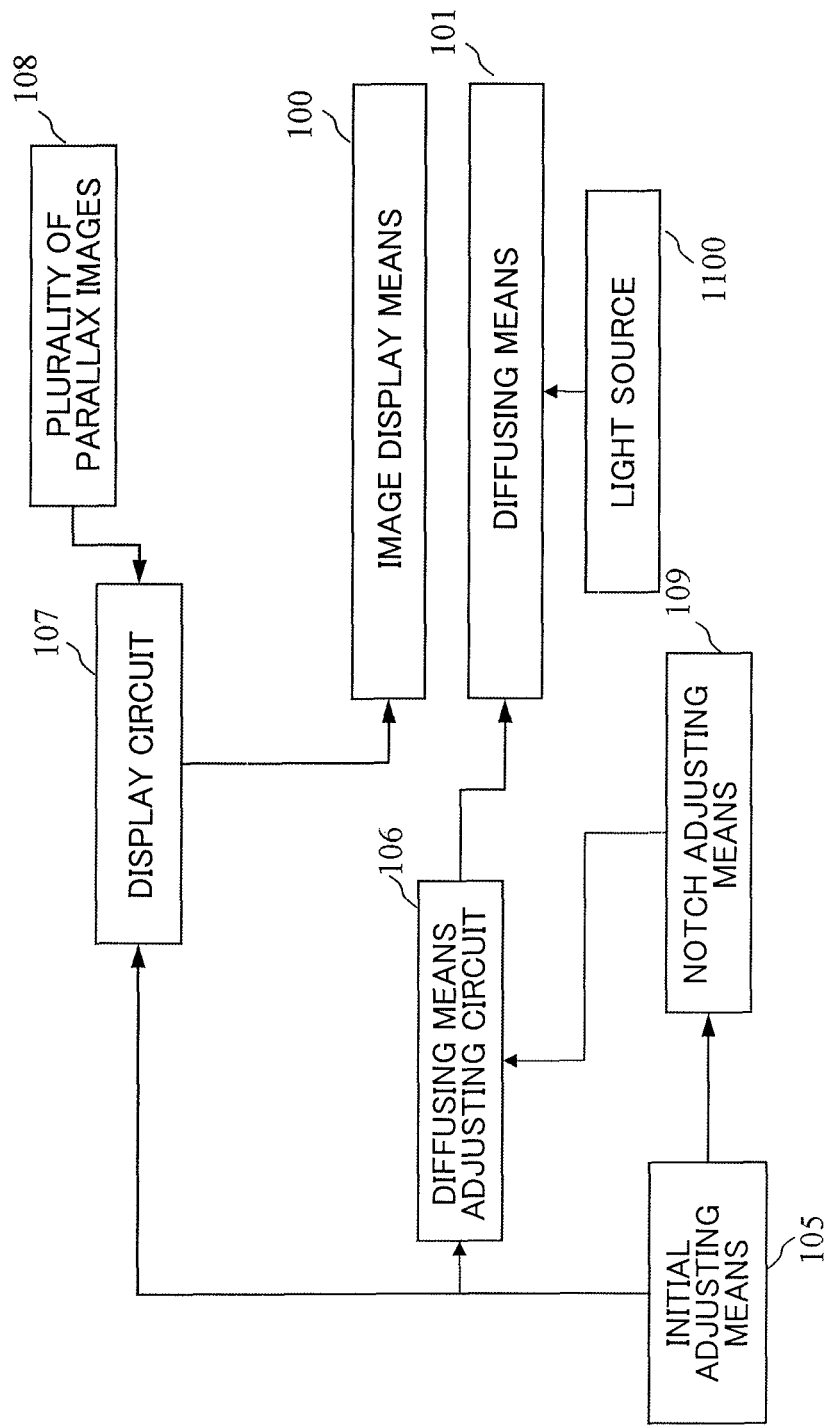
FIG. 1 shows a configuration of an image display device as the first invention according to the present invention.

Hereinafter, the first to eighth embodiments are described as preferred embodiments of the present invention.

In the first embodiment, an image display device is described. The image display device uses a notch cycle determining mechanism which makes notches cause few adverse effects. Diffusion pattern edge portions are provided with a fine notched structure so as to cyclically and symmetrically vary an opening width in the horizontal direction in order to control a blur amount/range of visible pixels under light diffusion by the pattern.

In the second embodiment, an image display device is described. The image display device determines a notch cycle so that an uneven portion (notches) itself causes few adverse effects. A notched structure is added to an edge of a parallax barrier opening or reflecting means in order to control a blur amount/range of visible pixels under illumination and orientation of diffused light from the pattern toward display means.

In the third embodiment, an image display device is described. The imaged display device includes a mechanism configured to estimate a moiré pattern of the first or second embodiment by means of parameters for realizing a notched structure, and then determines whether or not the notches themselves cause adverse effects on the basis of the analysis.

In the fourth embodiment, an image display device is described. The image display device uses a notch cycle appropriately adjusted on the basis of any one of the first to third embodiments to estimate moiré pattern by means of parameters for realizing a notched structure. The image display device performs quantitative evaluation of moiré patterns obtained by each parameter by comparing frequency characteristics among moiré patterns obtained by barriers having predetermined reference angles.

In the fifth embodiment, an image display device is described. The image display device is capable of performing the moiré pattern quantitative evaluation according to the fourth embodiment on pattern candidates which satisfies a notch cycle. The image display device automatically and appropriately adjusts a barrier pattern by performing a predetermined optimization search.

In the sixth embodiment, an image display device is described. The image display device has a barrier pattern structure with a notched structure. The image display device uses a notch cycle appropriately evaluated and adjusted, like any one of the first to third embodiments, to make a ratio of a visible pixel region through openings in the barrier pattern at each of horizontally aligned barrier positions as uniform as possible.

In the seventh embodiment, an image display device is described. The image display device has a barrier structure to which a notched structure is added so as to improve an imbalance situation of a positional relationship among openings, pixel regions and black matrix that coexist with each other because of resultant omissions from black portions and in-pixel electrodes. The image display device uses a notch cycle which is appropriately evaluated and adjusted, like any one of the first to third embodiments.

In the eighth embodiment, an image display device is described. The image display device has a barrier structure with a repetitive unit pattern formed along a barrier pattern from a group of pixels in which phases created by left and right notched structures coincide with each other and a group of pixels in which pattern phases do not coincide with each other. The image display device uses a notch cycle appropriately evaluated and adjusted, like any one of the first to third embodiments.

<First Embodiment>

As a first embodiment of the present invention, a barrier structure and a device comprising the barrier structure are described with reference to FIGS. 1 to 11. The barrier structure is configured so that a notch cycle determining mechanism makes notches cause few adverse effects. A diffusion pattern 2001 is provided with a fine notched structure so as to cyclically and symmetrically vary an opening width in the horizontal direction. Irregularities are added to an opening edge portion of the diffusion pattern 2001 in order to control a blur amount/range of visible pixels under light diffusion by the diffusion pattern toward display means.

Figure 2:
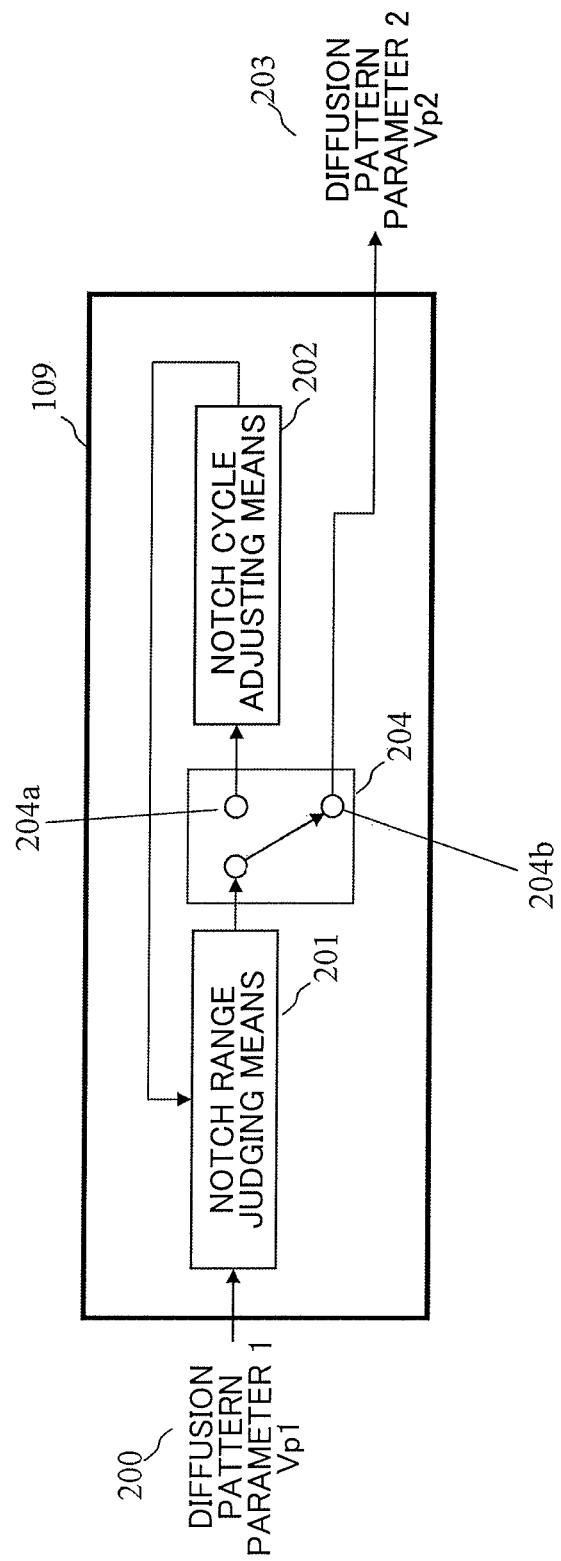
FIG. 2 shows a configuration of notch adjusting means in the image display device as the first invention according to the present invention.
Figure 3:
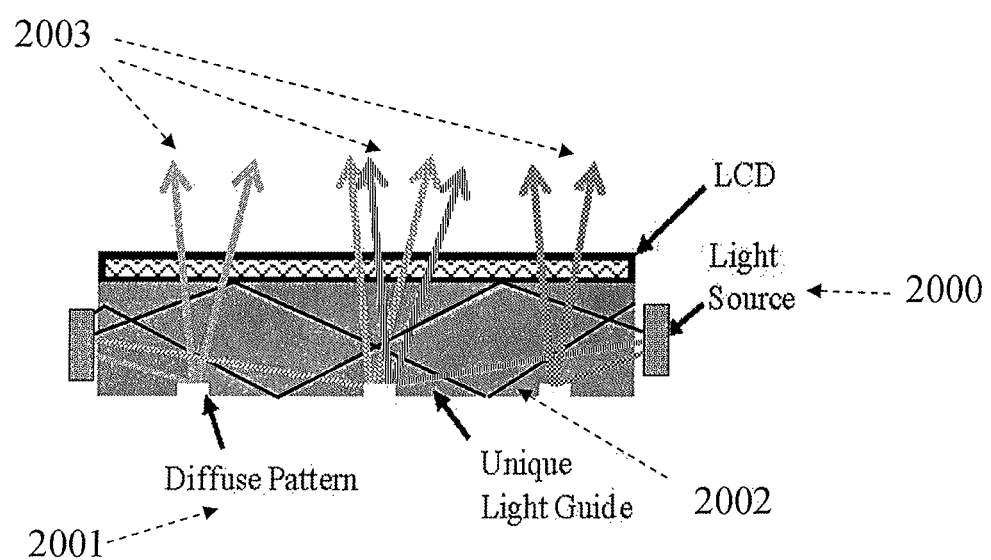
FIG. 3 schematically shows light diffusion/guidance by means of diffusing means of the image display device as the first invention according to the present invention.
Figure 4:
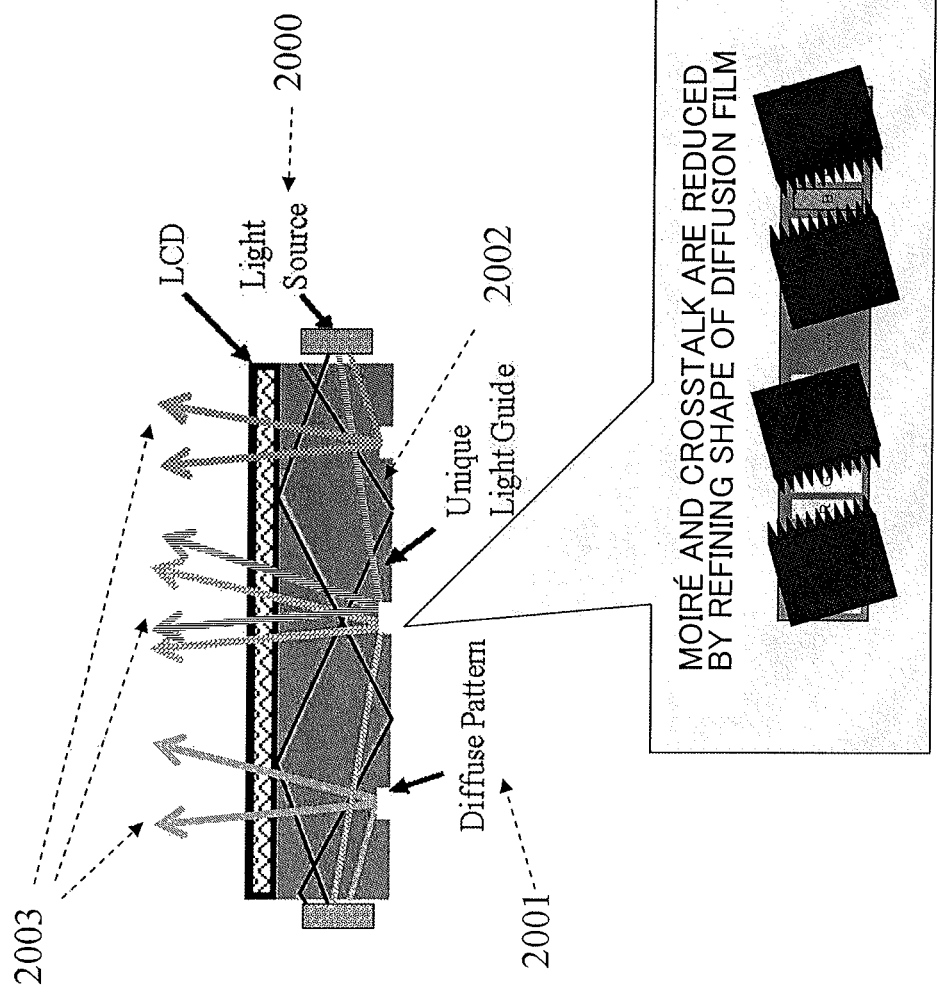
FIG. 4 schematically shows an example in which a notched structure is provided on an edge of a diffusion pattern of the diffusing means of the image display device as the first invention according to the present invention.
Figure 5:
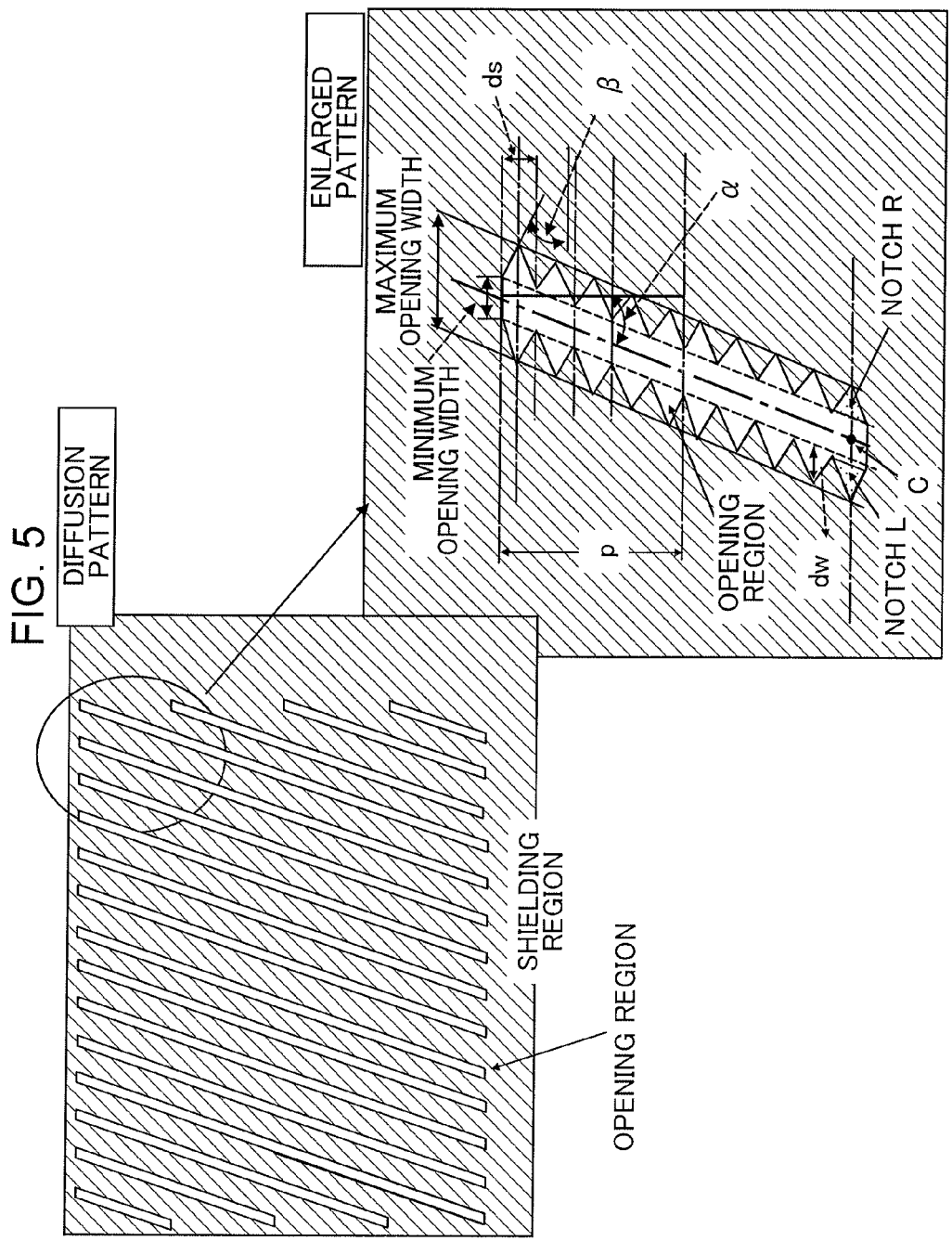
FIG. 5 schematically shows a diffusion pattern having a notched structure of the image display device as the first invention according to the present invention.
Figure 6:
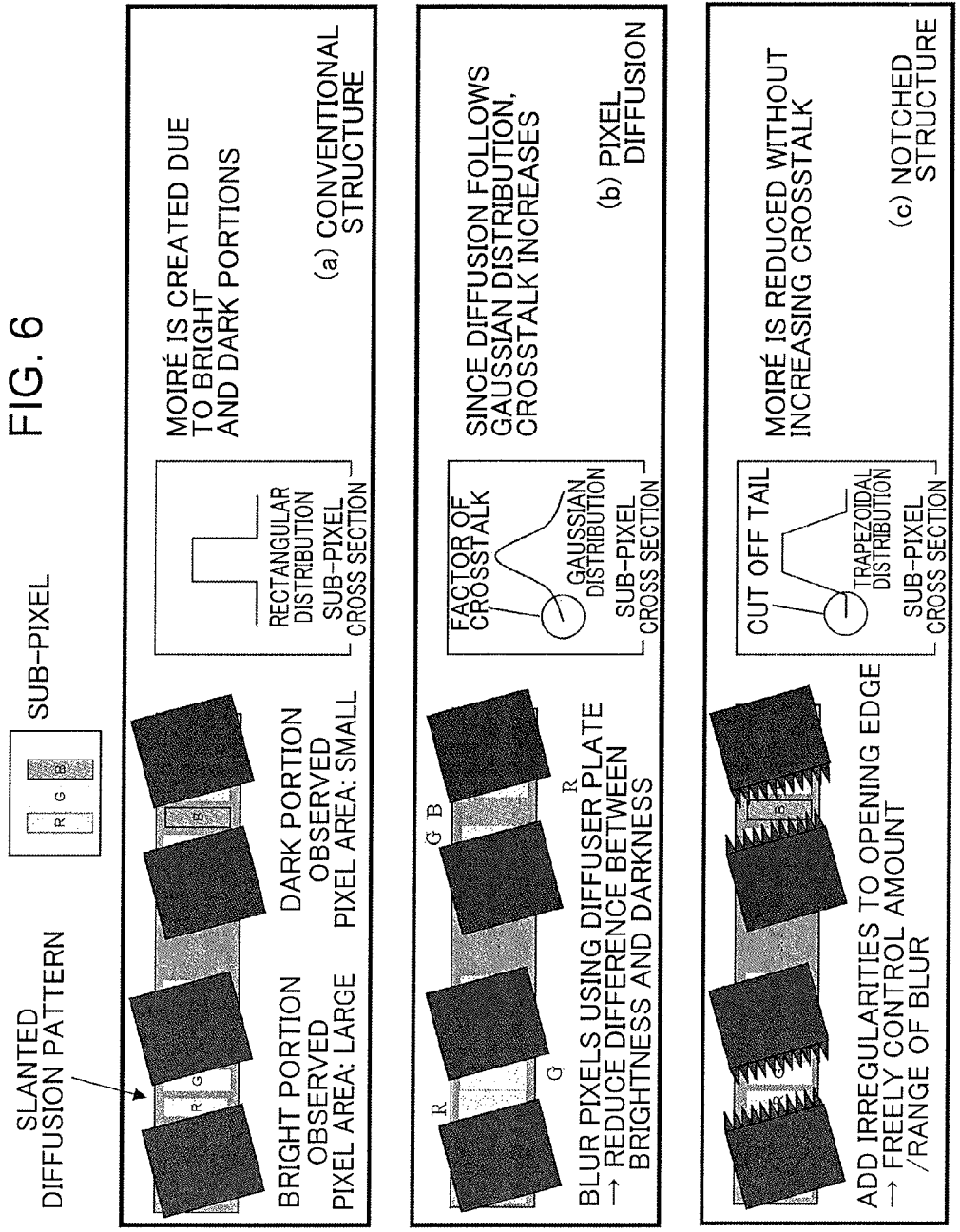
FIG. 6 schematically shows moiré reduction by means of the notched structure of the image display device as the first invention according to the present invention.
Figure 9:
FIG. 9 shows the first example which represents results of visual confirmation of presence/absence of horizontal/diagonal/vertical stripes for a notch cycle using moiré simulation.
Figure 11:
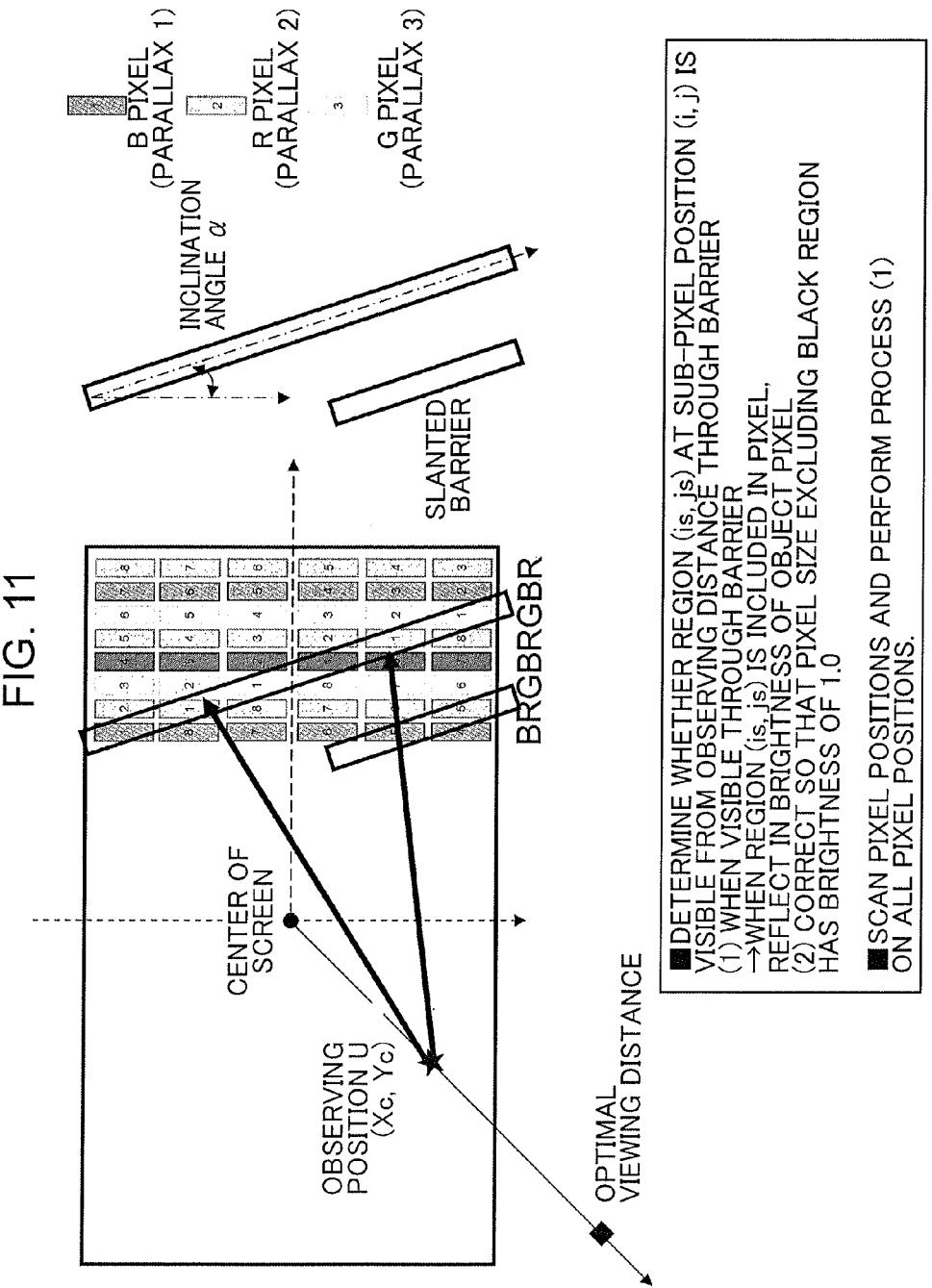
FIG. 11 schematically shows a moiré pattern estimating method described in an analysis of the image display device as the first invention according to the present invention.

FIG. 1 shows a configuration of an image display device representing the first embodiment of the present invention. FIG. 2 shows a configuration of a notch adjusting means 109 which uses a notch cycle determining mechanism to make notches cause few adverse effects. FIG. 3 schematically shows light diffusion and guidance by diffusing means. FIG. 4 schematically shows an example in which an edge of a diffusion pattern of diffusing means is provided with a notched structure. FIG. 5 schematically shows a diffusion pattern having a notched structure. FIG. 6 schematically shows an effect of the uneven structure. FIG. 7 shows an example of resultant adverse effects caused by an uneven portion (notches) itself. FIGS. 8 to 10 show examples of analysis results about adverse effect occurrence (horizontal or diagonal/vertical stripes) for cycles of an uneven portion (notches) itself. FIG. 11 schematically shows an estimation method for conducting moiré image estimation by means of predetermined parameters during the visual analysis shown in FIGS. 8 and 9. With reference to these drawings, the image display device representing the first embodiment of the present invention is described.

As shown in FIG. 1, the image display device includes an initial adjusting means 105, which adjusts a display device, a diffusing means and alike, an image display means 100, which displays two-dimensional parallax images, a display circuit 107 of the image display means 100, a light source 1100, a diffusing means 101, which has a diffusion pattern configured to diffuse and transmit light from the light source 1100 to the image display means and enables at least one of images included in a composite image displayed on the image display means to be observed, a diffusing means adjusting circuit 106, which adjusts a distance between the diffusing means and the image display means, a position of the diffusing means and alike, a storage medium 108 which stores parallax composite images to be displayed through the display circuit, and a notch adjusting means 109 which judges and adjusts a cycle of an uneven portion (notches). For example, as shown in FIG. 3, the diffusing means reflects and guides light from the light source means. Diffusion patterns are engraved at predetermined intervals on the diffusing means so that the diffusing means diffuses and transmits incident light on the diffusion patterns toward the image display means.

The initial adjusting means 105 adjusts the display device, the diffusing means and alike when the image display device starts displaying images or is initially installed in a room such as a living room. In this case, a distance between the diffusing means and a display or an inclination of a diffusion pattern of the diffusing means is adjusted by means of a predetermined adjustment image. A device such as liquid crystal configured to variably control a position or a width of a diffusion pattern by means of voltage or alike may be used. The device has a variable pitch between diffusion patterns. Therefore, the device may adjust the pitch.

Meanwhile, stereoscopic image visibility evaluation by means of a test image from an optimal viewing distance is performed. Tuning or alike of gradation characteristics is performed by means of the display circuit on the basis of visibility and a degree of blur/fusion. Optionally, parallax amount control in a parallax image (intensity control or adjustment of a horizontal shift amount using a linear coefficient) may be conducted.

A parallax composite image 108 displayed by the image display means 100 is displayed by means of light from the light source 1100. The diffusing means 101 makes a stereoscopic image observed at a predetermined position so that different parallax images are observed by the left and right eyes at a position of an observer, respectively.

As shown in FIG. 3, the diffusing means 101 includes a light guiding region, which guides light from the light source means, and a diffusion pattern engraved at predetermined intervals. The diffusing means 101 diffuses and transmits incident light on the diffusion pattern toward the image display means. Meanwhile, light except for the incident light on the diffusion pattern continues to be reflected and guided by the light guiding region. A parallax barrier system including opening portions and barrier portions for a naked-eye 3D system completely blocks light whereas according to the aforementioned configuration the light is continuously reflected and guided by the light guiding region, and then diffused in a predetermined direction toward the display panel upon incidence to the diffusion pattern. Therefore, the aforementioned configuration achieves brighter image display than a conventional parallax barrier system.

Figure 48:
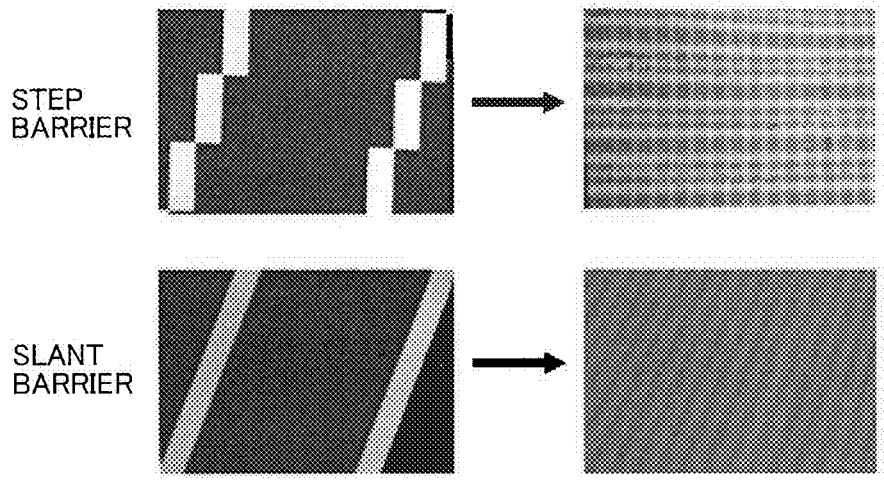
FIG. 48 shows an example of a moiré pattern caused by a conventional step barrier and a conventional slanted barrier.
Figure 49:
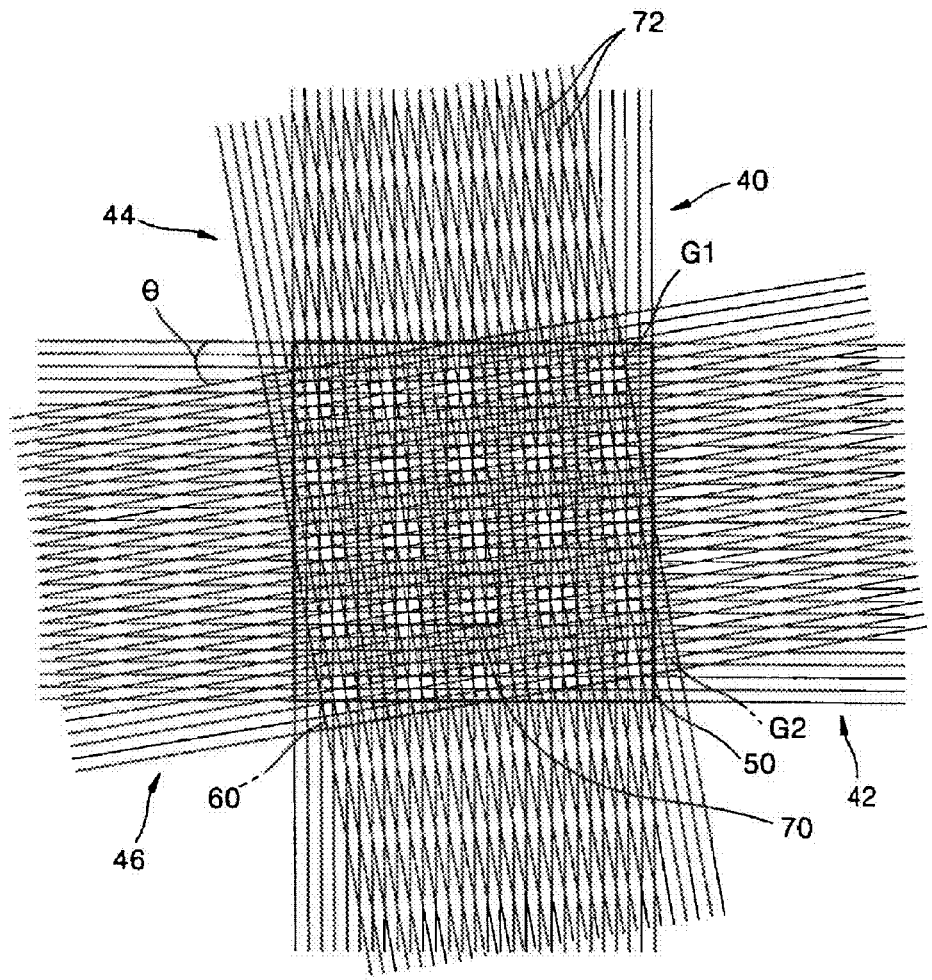
FIG. 49 schematically shows a prior art example of a conventional barrier pattern.
Figure 50:
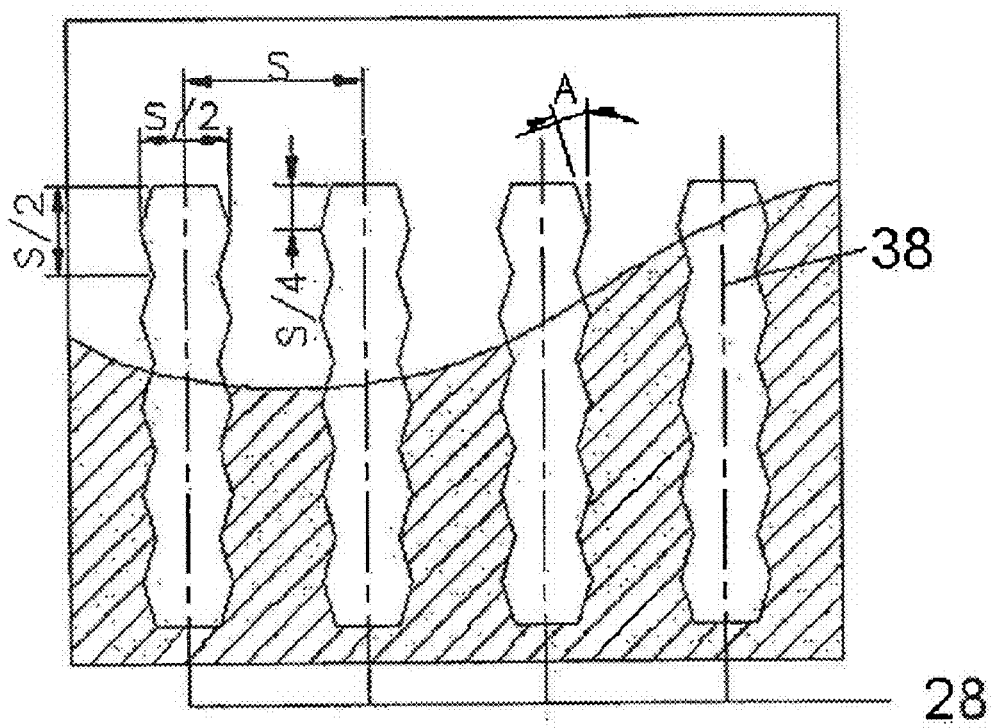
FIG. 50 schematically shows a second prior art example of a conventional barrier pattern.
Figure 52:
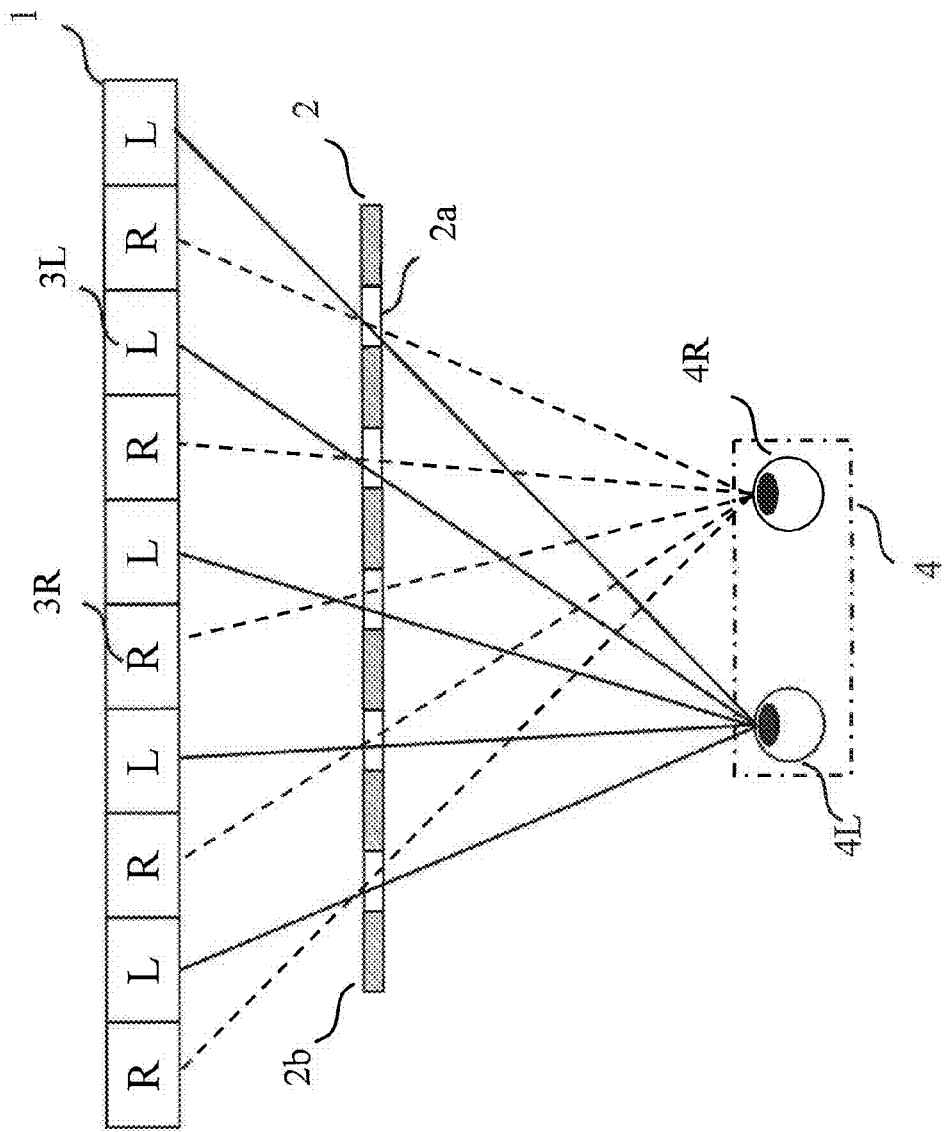
FIG. 52 schematically shows a stereoscopic image display device/method using a conventional parallax barrier.

As shown in the left part of FIG. 48, a diffusion pattern often has a slanted structure, which is arranged at a predetermined pitch and inclined in a diagonal direction, a stepped structure having a rectangular structure that conforms to a sub-pixel size, or a vertical striped structure. The diffusion pattern pitch is geometrically determined on the basis of factors such as a pixel pitch, an optimal viewing distance, a distance between the display panel and the diffusion pattern, and a parallax number. In general, a size (width when considering parallax in the horizontal direction) of the diffusion pattern is adjusted in order to reduce a moiré pattern and to reduce crosstalk/blur that is created by mixture of adjacent parallax images. However, there is a tradeoff between moiré intensity and an amount of crosstalk, and improving one worsens the other, as described above.

In the present first embodiment, as shown in FIGS. 4 and 5, the diffusion pattern is shaped so that an uneven structure (herein, defined as a notched structure) determined by a predetermined fineness is added to a diffusion pattern having a slanted structure in order to reduce moiré contrast without increasing crosstalk. FIG. 5 shows an example in which a triangular structure is added to an opening of a slanted diffusion pattern having a minimum opening width so that an opening width cyclically and linearly varies between a maximum opening width hmax and a minimum opening width hmin. Left and right triangles are symmetrical about the point C on the central axis of the pattern (refer to notches R and L). As shown in FIG. 5, this diffusion pattern is defined by four parameters, namely, an inclination angle α of the central axis of the diffusion pattern with respect to the vertical direction, an inclination angle β of the notched structure (triangular) portion with respect to the horizontal axis, a cycle width ds of the notched structure, and a height dw of the notched structure. ds may be expressed by a number of divisions n of the notched structure in one pixel pitch p as ds=p/n. The cycle width of the notched structure may be defined along an inclination angle θ of the diffusion pattern although the cycle width ds of the notched structure is represented by a width in the vertical direction. In this case, the cycle width of the notched structure is a quotient of ds divided by cos θ. If a single pixel includes three sub-pixels R, and B, p may be expressed by a sub-pixel size sp as p=3×sp. FIG. 6 schematically shows an effect created by the uneven structure. With reference to these drawings, the image display device representing the first embodiment of the present invention is described. For example, the height dw of the notched structure may be expressed as (Eqn 1).

(Eqn 1)

$$dw = 0.5 \times ds \times (1/\tan \beta + \tan \alpha) \quad (1)$$

A similar effect is conceivably created with a diffusion pattern having an ordinary vertical striped structure although FIG. 5 is described on the basis of a slanted structure. An effect created by the uneven structure is schematically shown in FIG. 6.

Under usage of a diffusion pattern having a conventional striped structure, a visible portion becomes bright (bright portion) if a pixel area observed through an opening is large whereas a visible portion becomes darker (dark portion) if the pixel area observed through the opening becomes smaller, as shown in FIG. 6(*a*). In general, the diffusion pattern pitch is set to a slightly smaller value than a product of a sub-pixel size multiplied by a parallax number N since the diffusion pattern pitch gathers pixels in a predetermined parallax direction of an entire image at a predetermined optimal viewing distance. Therefore, a variation occurs in a relationship of pixel positions, which are visible under light diffusion by the diffusion pattern toward the panel when viewed from a given observing position. Accordingly, a bright-dark pattern is created and observed as moiré, as shown in FIG. 6(*a*). In this case, bright-dark intensity is conceivably perceived as moiré intensity. As shown in FIG. 6(*b*), by blurring the contrast of light using a diffuser plate or a diffusing film which diffuses light, moiré may become less notable due to a decrease in influence of a black matrix portion (in the case of a PDP, also referred to as a rib portion) or an auxiliary electrode, which leads to a reduction in amplitude of the contrast. However, since diffusion characteristics often include a variation similar to a Gaussian distribution in the horizontal direction around the center of an opening, blur or crosstalk of a parallax image is created near a contour, which is unfavorable in terms of image quality. If a notched structure is provided, as shown in FIG. 6(*c*), an amount or range of blur may be controlled by adding an uneven structure to a diffusion pattern edge portion so as to increase hidden pixel regions by means of the notched structure in a bright portion and increase visible pixel regions by means of the notched structure in a dark portion. In other words, a rectangular distribution shown in the rectangular diagram of FIG. 4A may be adjusted so as to assume a trapezoidal distribution by cutting off both end portions of the rectangular distribution, as shown in the rectangular diagram of FIG. 6(*c*).

In this case, due to the aforementioned characteristics, it is conceivable that this effect is greater when the width of the notched structure is somewhat narrow (the cycle of the notched structure is favorably somewhat large). However, an appropriate value of the width (i.e. the cycle) of the notched structure depends on pixel structure (in particular, a metal auxiliary electrode or alike which divides pixels in the vertical direction). For example, if one sub-pixel is divided by m in the vertical direction, an effect of moiré reduction is enhanced when a number of divisions n of the notched structure is near a product of m multiplied by a natural number k (k>1), namely, when near n=k×m. Even unless the number of divisions n of the notched structure satisfies the above, when one pixel is divided by m, it is preferable that the number of divisions n of the notched structure is set to a value no less than nn=m+(m−1)+2 which is a sum of the number of divisions m, the number of metal electrodes m−1 created by dividing a pixel, and 2 that is the number of upper and lower black matrix portions. In other words, the number of divisions n is determined on the basis of the number of repetitions of effective pixel portions, which emit light at a predetermined brightness, and dark portions without emitting light such as a black matrix or a metal electrode when viewed in the vertical direction. However, even if conditions for reducing the moiré are satisfied, it is known that adverse effects such as those shown in FIG. 7 occurs in response to the value of the notch cycle ds. FIG. 7(*a*) shows an example of fine horizontal stripes created when the notch cycle ds is small (i.e. when the number of notch divisions n is a predetermined value greater than a bright-dark number nn in pixels in the vertical direction). FIG. 7(*b*) shows an example of broad horizontal stripes created when the notch cycle ds is large (when the number of notch divisions n is smaller than the bright-dark number nn). While moiré stripes in a diagonal (vertical) direction due to a large bright-dark pattern such as that shown in the left diagram in FIG. 48 are eliminated in both cases. However, a different bright-dark stripe pattern may be sometimes created in the horizontal direction conceivably due to interference of the pixel structure with the notches themselves. Therefore, it is important that the notch cycle ds is appropriately adjusted. With regard to whether such stripes are created or not, the creation of adverse effects (stripes) for the notch cycle ds (μm) was analyzed by performing a visibility evaluation by means of a moiré pattern estimation image simulated by a method shown in FIG. 11. The visibility evaluation may be performed by means of an actually-observed real image instead of a simulation image. However, such a case requires a device or apparatus such as liquid crystal in which a position or a width of a diffusion pattern may be variably controlled by voltage or alike. Therefore, from the perspectives of efficiency and convenience, it is more favorable to use a visual estimation obtained by simulation.

A moiré pattern (bright-dark pattern) visible from a predetermined observing position U(xc, yc) is estimated for parameters $vp[i]=(\alpha[i], \beta[i], hmin[i], hmax[i], dw[i],$ and $ds[i])$ of a diffusion pattern having a horizontally symmetrical notched structure. It is assumed that an optimal viewing distance dlen, a diffusion pattern-panel distance gap, a pixel size p, a sub-pixel size sp, and a parallax number num are set by the initial setting means. Calculations were performed by fixing $\alpha[i], \beta[i], dw[i]$, a diffusion pattern minimum width hmin[i], and a diffusion pattern maximum width hmax[i].

An outline of the estimation of a moiré pattern when observed from the observing position U(Xc, Yc) by a method such as that shown in FIG. 11 is described. FIG. 11 shows an example of a slanted structure with 8 parallaxes and an inclination of 3:1 ($\alpha$=18.435 degrees).

(Step 1)

Perform the following processes at a sub-pixel position (i, j). First, the object sub-pixel (i, j) is subdivided. Next, the following evaluation is performed on pixels of each subdivided region (is[k], js[k])(k=1, . . . , nn) to calculate an area of a black portion (a black matrix portion; also referred to as a rib in a PDP) and an area of a pixel portion of an object sub-pixel.

Initialize to Value=0.0.

When the pixel position (is[k], js[k]) is visible under light diffusion by the diffusion pattern:
(1) if the pixel position is included in a black region: the pixel position is not reflected in brightness of the object sub-pixel.
(2) if the pixel position is included in a pixel region: the pixel position is reflected in the brightness of the object sub-pixel by adding 1.0 to Value.

Unless the pixel position (is[k], js[k]) is visible under light diffusion by the diffusion pattern: The pixel position is not reflected in brightness of the object sub-pixel regardless of whether the pixel position is included in a black or pixel region.

A number of pixel positions Total corresponding to the pixel region of the object sub-pixel is determined. On the basis of assumption that Total corresponds to full brightness 255.0 of the object sub-pixel, a transform coefficient Tk for transforming Value into an actual brightness of the object sub-pixel visible by means of the light source is determined.

Brightness Yval of the object sub-pixel actually visible under light diffusion by the diffusion pattern is calculated from (Eqn 3).

(Eqn 3)

$$Yval = Value/Total \times 1.0 = Value \times Tk \quad (3)$$

(Step 2)

Pixel positions are scanned to perform the process of step 1 on all pixel positions.

Based on the visibility evaluation criteria shown in FIG. 8, Step 2 was performed for each notch cycle (pitch) ds[i] by means of the moiré pattern estimation image obtained in this manner. FIGS. 9 and 10 show examples in which sub-pixel size sp=160 μm, inclination 3:1 ($\alpha$=18.435 degrees), minimum opening width hmin[i]=hmin0=sp×0.9, and dw[i]=dw0. A notch angle is may be calculated from (Eqn 1), and a maximum opening width hmax[i] may be calculated as hmax[i]=hmin0+dw0×2. FIG. 9 shows that:

(1) when a vertical length of the sub-pixel is a multiple of the notch cycle by an integer n, creation of stripes is not confirmed;
(2) although horizontal stripes for a pitch of the notched structure in a solid rectangle are not created in (1), horizontal stripes are created around (1). There is a trend that the closer to (1), the greater the intervals of the horizontal stripes; and
(3) no horizontal stripes are created near halfway between a case where the vertical length of the sub-pixel is a multiple of the notch cycle by an integer n and a case where the vertical length of the sub-pixel is a multiple of the notch cycle by an integer n+1.

In addition, FIG. 10 shows that:
(4) when a vertical length of the sub-pixel is a multiple of the notch cycle by an integer n, creation of stripes is not confirmed;
(5) like FIG. 7, although horizontal stripes for a pitch of the notched structure in a solid rectangle are not created in (1), horizontal stripes are created around (1). There is a trend that the closer to (1), the greater the intervals of the horizontal stripes;
(6) a dotted rectangle includes not only horizontal stripes for the pitch of the notched structure in the rectangle but also a notch cycle that creates diagonal/vertical stripes; and
(7) the stripes described in (6) are more likely to be created when the notch cycle ds is large (i.e. when the number of divisions n for the vertical length p of the sub-pixel is small).

Visibility evaluations performed on other sub-pixels sp revealed that the aforementioned results were also true for the other sub-pixels.

Based on the aforementioned analysis, the notch adjusting means 109 judges whether or not adverse effects are created by the notches themselves and adjusts such adverse effects. Notch range judging means 201 performs the following determination.

[Condition 1]

The notch cycle ds is absent from a predetermined range Δdsth from a multiple of the vertical length of the sub-pixel by an integer n. In this case, the predetermined range Δdsth is a value representing a vicinity of a multiple of the vertical length of the sub-pixel by an integer n. For example, the predetermined range Δdsth represents approximately 1/10 of a difference between a notch cycle ds_n1, which is a multiple of the vertical length of the sub-pixel by an integer n, and a notch cycle ds_n2, which is a multiple of the vertical length of the sub-pixel by an integer n−1.

[Condition 2]

The notch cycle ds corresponds to near halfway between a multiple of the vertical length of the sub-pixel by an integer n and a multiple of the vertical length of the sub-pixel by an integer n−1 (or n+1).

[Condition 3]

The notch cycle ds is within a predetermined range. In this case, the predetermined range indicates a maximum value and a minimum value of the notch cycle ds. For example, a size obtained by the number of divisions n based on the number of repetitions nn of effective pixel portions which emit light at predetermined brightness and dark portions without light emission such as a black matrix or a metal electrode when a sub-pixel is viewed in the vertical direction may be used as the maximum value. Alternatively, a maximum notch cycle obtained by a study performed in advance may be used as the maximum value.

When [Condition 1] and [Condition 2] are satisfied, switching means 204 is connected to 204a to pass the aforementioned parameters as appropriate notch cycle parameters to the diffusing means adjusting circuit. Without satisfaction of the aforementioned conditions, the switching means 204 is connected to 204b to hand over processes to notch cycle adjusting means 202.

In this case, "an intermediate value dso=(ds1+ds2)/2 between a value ds1 that is a multiple of the length of the sub-pixel in the vertical direction by an integer n and a value ds2 that is a multiple of the length of the sub-pixel in the vertical direction by an integer n−1 or n+1" which is the closest to the current notch cycle ds and which satisfies [Condition 2] can be adopted as an adjusted notch cycle dso, or a value dso=ds+Δdsth×η that is a sum of the current notch cycle ds and a product of Δdsth multiplied by a predetermined coefficient η can be adopted as an adjusted notch cycle. However, the coefficient η is to be selected so as to satisfy [Condition 1] to [Condition 3].

By providing judging/adjusting means of the notch cycle ds, adverse effects (horizontal stripes, diagonal/vertical stripes and alike) caused by interference of the notches themselves with the pixel structure may be prevented from being created. By providing the edge portion of the diffusion pattern with a fine notched structure to cyclically vary an opening width so as to be horizontally symmetrical, an amount/range of blur of pixels visible under light diffusion by the diffusion pattern toward the display means may be controlled.

In the case of this notched structure, since the opening width varies, a ratio (opening ratio) rH of the opening width to sub-pixel size which is used as criteria of crosstalk also varies. However, in this case, the ratio is defined by an average opening ratio Ave_rH within a predetermined range (e.g. a size of u-number of pixels). Therefore, a fine notched structure has crosstalk characteristics substantially equivalent to those of a slanted structure which has the average opening ratio and an inclination angle α with respect to a central axis between diffusion patterns. Accordingly, by setting the average opening ratio to a predetermined value ThAve_rH and controlling an amount of blur when using a notched structure with irregularities, averaging of a visible pixel area may be performed while minimizing increase of the amount of crosstalk.

Alternatively, the notched structure may be trapezoids, elliptical arcs with varying curvature or parallelograms although a triangular notched structure is used in FIG. 5. The present embodiment may be applied to a diffusion pattern having a vertical striped structure although the present embodiment is described on the basis of a slanted structure. Instead of providing a notched structure in the horizontal direction as shown in FIG. 5, a notched structure may be added in a direction perpendicular to the central axis between diffusion patterns.

The present embodiment may be similarly applied to a diffusion pattern having a vertical striped structure or a diffusion pattern having a stepped structure in which rectangular shapes of sub-pixels are arranged in a diagonal direction although the present embodiment is described on the basis of an example of a diffusion pattern having a slanted structure.

If dw denotes a height of a notched structure and p denotes a size of one pixel, an opening area dSn of the notched structure in one pixel and an opening area dSo of a slanted barrier having a minimum opening width hmin in one pixel may be expressed as follows.

(Eqn 4)

$$dSn = dw \times p$$

$$dSo = h\min \times p \tag{4}$$

This expression shows that the opening area S=dSo+dSn is consistent even if the number of divisions in one pixel increases.

When keeping the pixel-size average opening ratio Ave_rh at ThAve_rH, crosstalk reduction may be satisfied by suppressing the maximum opening width hmax so as to stay in a predetermined size LWMax=sp×dmax for the sub-pixel size sp=p/3. In this case, since a minimum opening width of around sub-pixel size ×0.5 or smaller is susceptible to adverse effects because of abrupt opening width fluctuation and influence of fluctuations in viewing positions (horizontal/vertical), it is preferable that the minimum opening width is around sub-pixel size ×0.7 or greater. Adding such a portion enables control of not only the average opening ratio but also the maximum opening width for a sub-pixel sp, which is a reference for parallax image arrangement. Consequently, a pattern capable of suppressing a moiré pattern while satisfying further crosstalk reduction may be designed.

<Second Embodiment>

The second embodiment of the present invention is described with reference to FIGS. 2, 12 and 13A. This embodiment is provided with a parallax barrier including openings, which allows light transmission from a light source means, and barrier portions, which block light, and diffusing means, which is situated between an image separating means and the light source means and configured to reflect and diffuse light which is emitted from the light source means and then shielded by the image separating means. This embodiment reduces moiré by adding a notched structure to one of the parallax barriers and the diffusing means.

Figure 12:
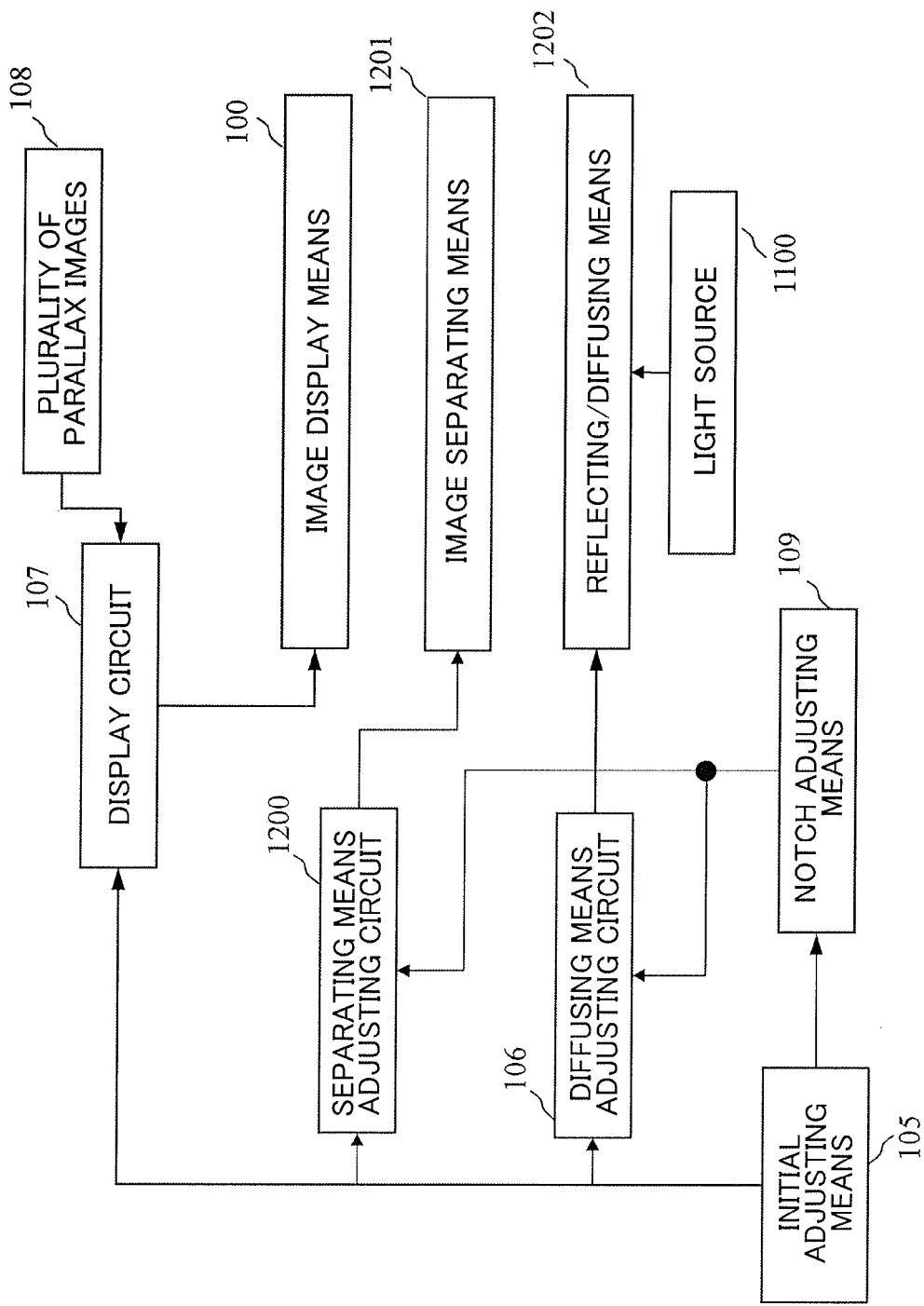
FIG. 12 shows a configuration of an image display device as the second invention according to the present invention.

FIG. 12 shows a configuration of an image display device representing the second embodiment of the present invention. FIG. 2 shows a configuration of a notch adjusting means 109 which uses a notch cycle determining mechanism to prevent adverse effects from being created by notches, like the first embodiment. FIG. 13A schematically shows an example which combines an image separating means with an image reflecting means in the image display device representing the second invention of the present invention. A diffusing means is arranged in accordance with a barrier portion of a parallax barrier means to cause a multiple reflection of light hitting the barrier portion and then extract the multiple reflection from openings of the parallax barrier means. With reference to these drawings, the image display device representing the second embodiment of the present invention is described.

As shown in FIG. 12, the image display device includes an initial adjusting means 105, which adjusts a display device, a parallax barrier and alike, an image display means 100 which displays two-dimensional parallax images, a display circuit 107 of the image display means 100, a light source 1100, an image separating means 1201 such as a parallax barrier, which allows transmission of image light from 100 through an opening or shielding the image light from 100 to present a parallax image at a predetermined position, a separating means adjusting circuit 1200, which adjusts a distance between the separating means and the image display means, a position of the separating means and alike, a storage medium 108, which stores parallax composite images displayed on the image display means 100 through the display circuit, a notch adjusting means 109, which judges and adjusts a cycle of an uneven portion (notches), a reflecting/diffusing means 1202 which is situated between the image separating means and the light source means and configured to reflect light, which is emitted from the light source means and then shielded by the image separating means, and a diffusing means adjusting circuit 106, which adjusts a position or alike of the reflecting/diffusing means.

As the parallax barrier 1201, a fixed barrier made of a thin film or a substance with high transparency (such as glass) or a device (such as a TFT liquid crystal panel) of which shielding and opening (light transmittance) may be varied by applying a voltage or alike may be used. With respect to 1202, it is also possible to use a device such as liquid crystal in which a position or a width of a diffusion pattern may be variably controlled by voltage or alike in order to set and adjust a variable pitch between diffusion patterns. For example, the reflecting/diffusing means is configured to improve extraction efficiency of light existing in a light guiding region by means of multiple reflection of light from the light source means and transmit light passing through openings of the parallax barrier means (image separating means), which are arranged at predetermined intervals, to the image display means to enable separation and observation of a parallax image displayed by the display means as shown in FIG. 13A.

When starting image display or upon initial installation in a room such as a living room, the initial adjusting means 105 adjusts the display device, the diffusing means, the image separating means and alike. In this case, a distance between the diffusing means or the image separating means and a display, an inclination of a diffusion pattern of the reflecting/diffusing means, and an inclination of the parallax barrier means of the image separating means are adjusted by means of a predetermined adjustment image. Meanwhile, a stereoscopic image visibility evaluation using a test image from an optimal viewing distance is performed. On the basis of visibility and a degree of blur/fusion, tuning or alike of gradation characteristics is performed by means of the display circuit. Optionally, parallax amount control in a parallax image (intensity control or an adjustment of a horizontal shift amount using a linear coefficient) may be conducted.

A parallax composite image 108 displayed by the image display means 100 is displayed due to light from the light source 1100 so that a predetermined parallax image may be observed at a predetermined position by means of the reflecting/diffusing means 1202 and the image separating means 1201. A stereoscopic image may be observed at a position of an observer by observing different parallax images with the left and right eyes, respectively.

Figure 13A:
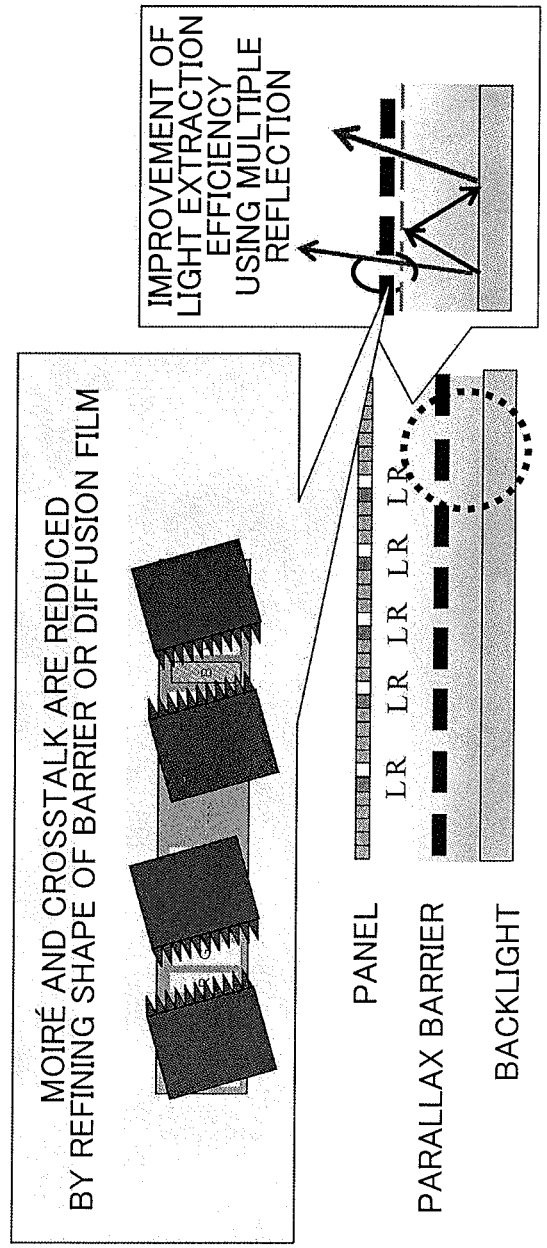
FIG. 13A schematically shows an example that combines image separating means with reflecting/diffusing means in the image display device as the second invention according to the present invention.

A conventional parallax barrier system for a naked-eye 3D system including an opening portion and a barrier portion completely blocks light by means of barrier whereas the configuration shown in FIG. 13A makes the light continuously multiply-reflected, guided and extracted from the parallax barrier to improve light extraction efficiency, which results in brighter image display than a conventional parallax barrier system.

As shown in the left part of FIG. 48, the parallax barrier means often has a slanted structure, which is arranged at a predetermined pitch and inclined in a diagonal direction, a stepped structure having a rectangular structure, which conforms to a sub-pixel size, or a vertical striped structure. The parallax barrier pitch is geometrically determined on the basis of factors such as a pixel pitch, an optimal viewing distance, a distance between the display panel and the parallax barrier, and a parallax number. In general, a size of the parallax barrier means (width when considering parallax in the horizontal direction) is adjusted in order to reduce a moiré pattern and crosstalk/blur, which is created by mixture of adjacent parallax images. However, there is a tradeoff between moiré intensity and an amount of crosstalk, and improving one worsens the other as described above.

As shown in FIGS. 4 and 5, the present second embodiment is configured to reduce moiré contrast without increasing crosstalk by adding an uneven structure (herein, defined as a notched structure), which is determined by a predetermined fineness, to a slanted barrier. In addition to the opening of the parallax barrier means, a notched structure may be added to an edge portion of the reflecting/diffusing means that is set between 1100 and 1201. Alternatively, a notched structure may be added only to the edge portion of the reflecting/diffusing means that is set between 1100 and 1201. By providing means for judging and adjusting a notch cycle ds, like the first embodiment, adverse effects (horizontal stripes, diagonal/vertical stripes and alike) caused by interference of the notches themselves with the pixel structure may be prevented from being created. As described above, with the invention according to the second embodiment, while preventing adverse effects due to notches from being created using a notch cycle determining mechanism, like the first embodiment, an opening of the parallax barrier means 1201 or an edge portion of the diffusing means is provided with a fine notched structure so as to cyclically and left-right symmetrically vary an opening width. Accordingly, the invention according to the second embodiment offers an advantage of reducing moiré without increasing crosstalk by controlling a blur amount/range of pixels, which are visible under light transmission by the parallax barrier means 1201 with a notched structure.

The width may be defined along an inclination angle θ of the diffusion pattern or the barrier pattern although the width ds of the notched structure is represented by a width in the vertical direction, like the first embodiment. In this case, the cycle width of the notched structure is a quotient of ds divided by cos θ.

Alternatively, the notched structure may include trapezoids, elliptical arcs with varying curvature or parallelograms although a notched structure including triangles is used, like the first embodiment. The present embodiment may be applied to a vertical striped structure although the present embodiment is described on the basis of an example of a slanted structure. Instead of providing a notched structure in the horizontal direction as shown in FIG. 5, a notched structure may be added in a direction perpendicular to the central axis between diffusion patterns or a barrier central axis.

The present embodiment may be applied to an example of a barrier with a stepped structure in which rectangular shapes of sub-pixels are arranged in a diagonal direction although an example of a slanted structure is described.

If dw denotes a height of a notched structure and p denotes a size of one pixel, an opening area dSn of the notched structure in one pixel and an opening area dSo of a slanted structure with a minimum opening width minh in one pixel may be expressed as (Eqn 2), like the first embodiment. This is applicable regardless of the presence of a gap or alike. Even if heights dwL and dwR of the left and right notched structures vary, the opening area S in one pixel in the vertical direction becomes consistent as long as dwL+dwR=dw×2 is satisfied.

With keeping the pixel-size average opening ratio Ave_rh at ThAve_rH, crosstalk reduction may be satisfied by suppressing the maximum opening width hmax so as to stay in a predetermined size LWMax=spxdmax for the sub-pixel size sp=p/3. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater. Adding such a portion enables control of not only the average opening ratio but also the maximum opening width for a sub-pixel sp, which is a reference for parallax image arrangement. Consequently, a diffusion pattern or a barrier pattern capable of suppressing a moiré pattern while satisfying greater crosstalk reduction may be designed.

The reflecting/diffusing means does not have to be provided if a notched structure is added to a parallax barrier. As shown in FIG. 13B, an image of the image display means may be separated and presented at a predetermined position by using a line light source as the light source means and controlling a direction of the line light source. In this case, a reduction in moiré and crosstalk may be achieved by adjusting a shape of the line light source itself to which a notched structure is added.

<Third Embodiment>

The third embodiment of the present invention is described with reference to FIG. 1 or 12 and FIGS. 14 to 17. This embodiment is configured so that estimation about creation of horizontal stripes is performed by means of parameters for realizing a notched structure. On the basis of the analysis, determination/correction is made as to whether or not adverse effects due to the notches themselves are created in order to appropriately adjust a notch cycle by adding a notched structure to a diffusion pattern according to the first embodiment (FIG. 1) or by adding a notched structure to a barrier opening or the reflecting/diffusing means according to the second embodiment (FIG. 12). Subsequently, moiré reduction is realized by controlling an amount/range of blur of visible pixels visible on the basis of the obtained notch cycle.

FIG. 14 shows a configuration of a notch adjusting means 109 including a one-dimensional interference estimating means 211, which estimates whether or not horizontal stripes are created by estimating a luminance distribution in the vertical direction to estimate an interference state between a pixel structure and a notched structure in the vertical direction, and a stripe analyzing means 212a which judges presence or absence of horizontal stripes on the basis of the estimated interference pattern. If horizontal stripes are less likely to occur, a switching means 214 connects to 214a to hand over the parameters as appropriate notch cycle parameters to a barrier adjusting circuit or a diffusing means adjusting circuit. Unless the aforementioned conditions are satisfied, the switching means 214 is connected to 214b to hand over processes to a notch cycle adjusting means 202. In this case, the one-dimensional interference estimating means estimates an interference state between a pixel structure and a notched structure for a fluctuation in the vertical direction using a method such as that shown in FIG. 15. In short, a periodic function f1 approximating a pixel luminance distribution, in which a luminance distribution of one pixel for a vertical position is cyclically repeated, and a periodic function f2, which has a width of a notch shape as a cycle and represents a notch width for a vertical position are indicated from candidates of a number of selected unit waveforms. A correlation Out (e.g. a product or a square of a difference) of the two periodic functions is calculated. The Out value conceivably represents interference between a pixel and a notched structure in the vertical direction. By studying the correlation value Out, an influence of the notched structure itself to pixels may be considered. In this case, when the obtained correlative output value Out for the vertical position has a low-frequency component that fluctuates at a relatively large cycle (or a gradual cycle) like a beat, the notched structure itself is likely to create interference fringes (horizontal stripes). This likelihood is particularly noteworthy if an auxiliary electrode region in a pixel size or a pixel portion increases and a width of a selected notched structure increases considerably. In order to suppress the interference by the notched structure itself, it is preferable that the correlative output Out has a relatively uniform output value or only has a high-frequency component that performs short fluctuations, instead of having a low-frequency component that fluctuates at large cycles. A variation in correlative output does not have to have periodicity. From the above, when considering greater suppression of interference fringes created by the notched structure itself, it is more preferable to select a number of unit waveforms for which the correlative output Out has a relatively uniform output value or only has a high-frequency component that performs short fluctuations from several candidates of the number of unit waveforms selected in order to erase moiré created by the interference between a black region of the pixels and an opening. Thus, it is determined whether or not a current notch cycle ds (i.e. a number of divisions n of a sub-pixel in the vertical direction) is problematic. Subsequently, when it is determined that the correlative output Out has a low-frequency component which fluctuates at large cycles, the notch cycle adjusting means 202 adjusts the notch cycle ds, like the first or second embodiment.

With respect to the initial notch cycle ds (a number of notch divisions n), like the first embodiment, moiré reduction effect depends on the pixel structure of a sub-pixel in the vertical direction. Therefore, when a sub-pixel is divided by t, it is preferable that the initial notch cycle ds is no more than a size obtained by the number of divisions nn of t (the number of pixel regions)+2 (black matrix regions)+t−1 (auxiliary electrode regions) to the left or right of an opening. Therefore, the notch cycle ds may start from this value. Alternatively, a predetermined minimum notch cycle ds_min and a predetermined maximum notch cycle ds_max may be set. Therefore, the notch cycle ds may start from one of these set values. In consideration of [Condition 2] "The notch cycle ds corresponds to near halfway between a multiple of the length of the sub-pixel in the vertical direction by an integer n and a multiple of the length of the sub-pixel in the vertical direction by an integer n+1" according to the first embodiment, the notch cycle ds may start from "a value shifted by a predetermined range Δdsth from a notch cycle ds corresponding to an integer n-th part of a length of a sub-pixel in the vertical direction" between ds_min and ds_max.

A diffusion pattern or a barrier is adjusted by means of parameters vp[i]=(α[i], β[i], hmin[i], hmax[i], dw[i], ds[i]) of a barrier or a diffusion pattern which includes the notch cycle dso appropriately adjusted and obtained in this manner and has a horizontally symmetrical notched structure.

As described above, a notch cycle is appropriately adjusted by estimating a vertical luminance distribution of a pixel to estimate the creation of horizontal stripes, determining and correcting whether or not adverse effects are created by the notches themselves, on the basis of the analysis. Irregularities are added to an opening edge. An amount/range of blur of pixels visible through the barrier is controlled to achieve moiré reduction by means of the obtained notch cycle.

FIGS. 16 and 17 show modification of the above. In the modification, at the notch adjusting means, a moiré estimating means 220 performs the moiré image estimation simulation used to analyze horizontal/diagonal/vertical stripes by the notched structure shown in FIGS. 8 to 10 according to the first embodiment by means of parameters vp[i]=(α[i], β[i], hmin[i], hmax[i], dw[i], ds[i]) of a current barrier or a current diffusion pattern having a horizontally symmetrical notched structure. An FFT means 221 performs a two-dimensional FFT transformation on the moiré image. FIG. 17(a) shows an example of a result of the FFT on FIG. 5(a). FIG. 17(b) shows an example of an FFT image for an estimation image which does not include horizontal stripes and only includes diagonal moiré where sub-pixel sp=160 µm. FIG. 17(c) shows an example of an FFT image for a diagonal moiré estimation image to which horizontal stripes created by notches are added where sub-pixel sp=160 µm. In a two-dimensional FFT image, in general, the center of the image represents a direct-current component. The presence/absence of directional periodic components are indicated as pixel values from the center toward horizontal and vertical directions. Therefore, the higher the value is, the greater the power of the periodic component is. FIG. 17(a) shows a periodic component corresponding to horizontal stripes. FIG. 17(b) shows a diagonal component enclosed in a white circle. FIG. 17(c) shows that a component corresponding to the horizontal stripes shown in FIG. 17(a) appears and is added to the diagonal component although the diagonal component shown in FIG. 17(b) is suppressed.

A portion with power no less than a predetermined level is extracted on the basis of the two-dimensional FFT images. A stripe judging means 222 judges whether or not there is a pattern having periodicity in the horizontal direction or alike (a horizontal component such as the portion enclosed by the white circle in FIG. 17). It is determined whether the notch cycle ds is appropriate or not on the basis of the judgment. Switching of a subsequent processing direction is performed. As described above, even if estimation of vertical luminance distribution is insufficient by itself, the presence/absence of stripes with periodicity may be confirmed by estimating an actual moiré image, performing two-dimensional FFT, and analyzing the results.

The width may be defined along an inclination angle θ of the diffusion pattern or the barrier pattern although the width ds of the notched structure is represented by a width in the vertical direction, like the first and second embodiments. In this case, the cycle width of the notched structure is a quotient of ds divided by cos θ.

Alternatively, the notched structure may include trapezoids, elliptical arcs with varying curvature, or parallelograms although a notched structure including triangles is used, like the first embodiment. The present embodiment may be applied to a vertical striped structure although the present embodiment is described on the basis of an example of a slanted structure. Instead of providing a notched structure in the horizontal direction as shown in FIG. 5, a notched structure may be added in a direction perpendicular to the central axis between diffusion patterns or a barrier central axis. The present embodiment may be applied to an example of a stepped structure in which rectangular shapes of sub-pixels are arranged in a diagonal direction although an example of a slanted structure is described.

If dw denotes a height of a notched structure and p denotes a size of one pixel, an opening area dSn of the notched structure in one pixel and an opening area dSo of a slanted structure having a minimum opening width hmin in one pixel may be expressed as (Eqn 2), like the first embodiment. This is applicable regardless of the presence of a gap or alike. Even if heights dwL and dwR of the left and right notched structures vary, the opening area S in one pixel in the vertical direction is consistent as long as dwL+dwR=dwx2 is satisfied.

With keeping the pixel-size average opening ratio Ave_rh at ThAve_rH, crosstalk reduction may be satisfied by suppressing the maximum opening width hmax so as to stay in a predetermined size LWMax=sp×dmax relative to the sub-pixel size sp=p/3. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater. Adding such a portion enables control of not only the average opening ratio but also the maximum opening width for a sub-pixel sp, which is a reference for parallax image arrangement. Accordingly, a diffusion pattern or a barrier pattern capable of suppressing a moiré pattern while satisfying greater crosstalk reduction may be designed.

<Fourth Embodiment>

The fourth embodiment of the present invention is described with reference to FIGS. 11 and 18 to 23. This embodiment provides a stereoscopic image display device configured to perform quantitative evaluation of a moiré pattern obtained by each parameter. This embodiment adds variation parameters such as a phase shift between left and right notched structures, a gap between notched structures and a maximum opening width of a diffusion pattern to the first invention to expand adjustable range. This embodiment estimates a moiré pattern by means of parameters for realizing a notched structure by adding a notched structure, which is obtained by comparing frequency characteristics of moiré patterns obtained by a diffusion pattern having a predetermined reference angle and estimating appropriate parameters.

Figure 18:
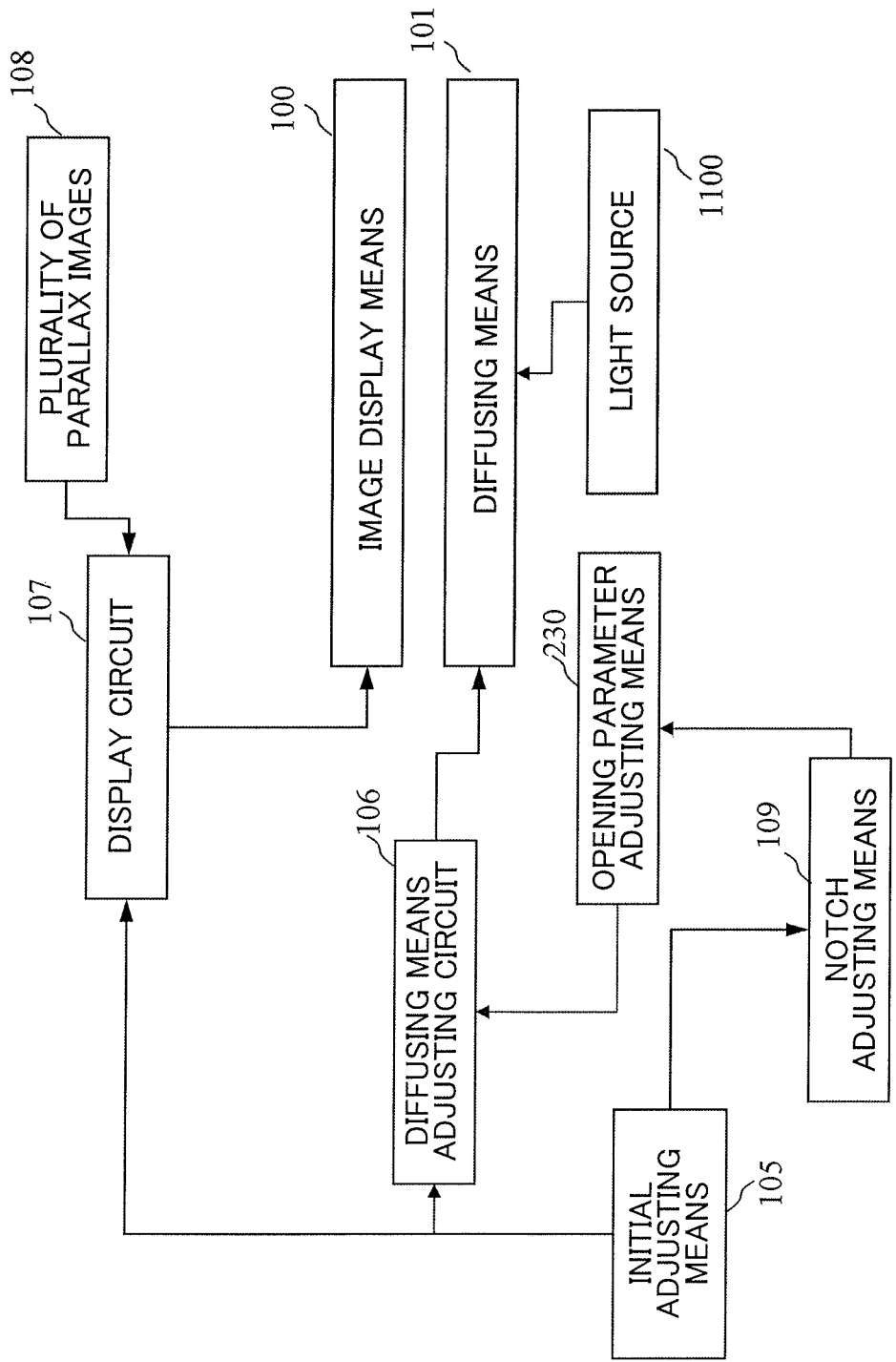
FIG. 18 shows a configuration of an image display device as the fourth invention according to the present invention.
Figure 19:
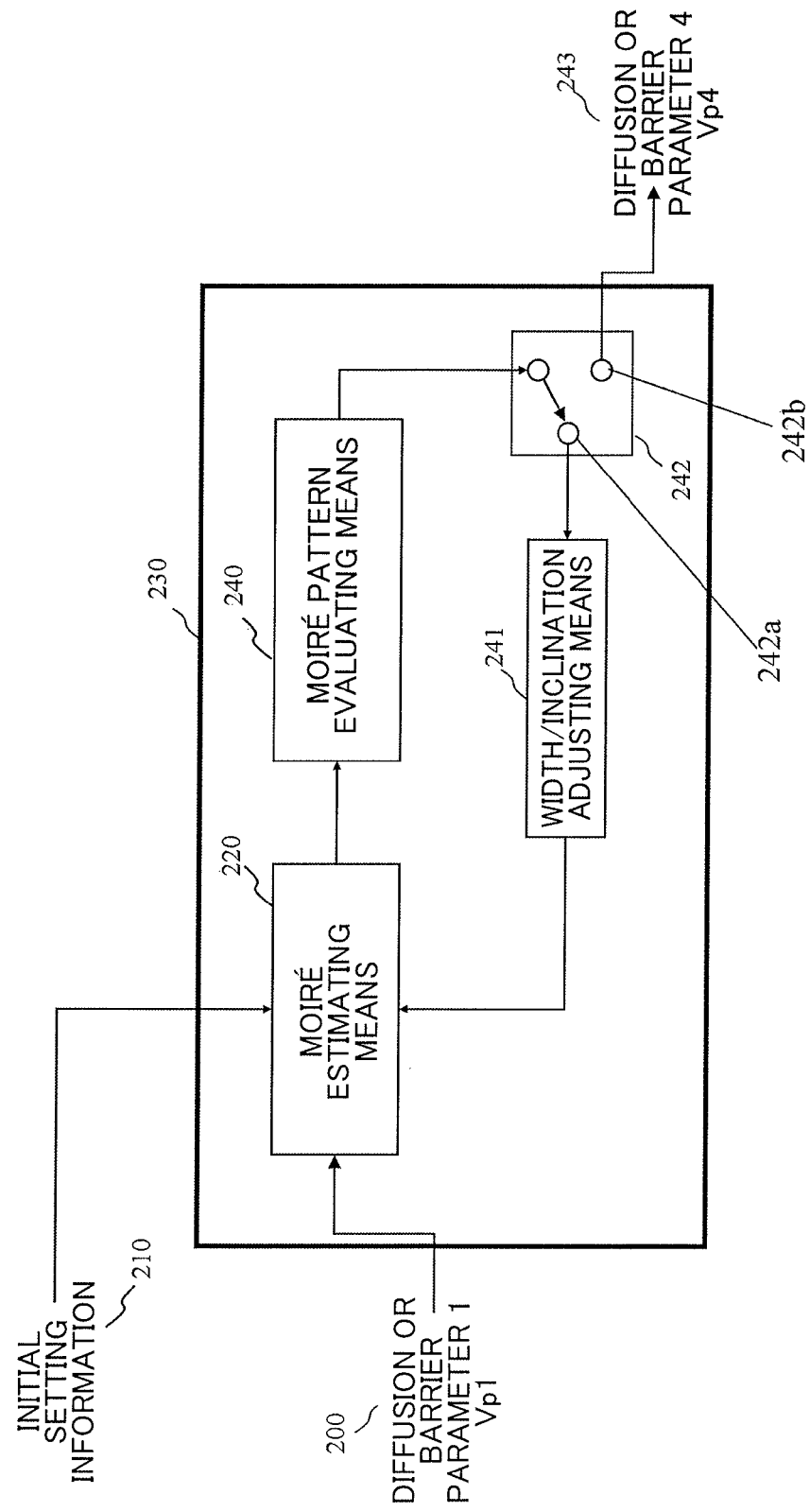
FIG. 19 shows a configuration of an opening parameter adjusting means in the image display device as the fourth invention according to the present invention.
Figure 20:
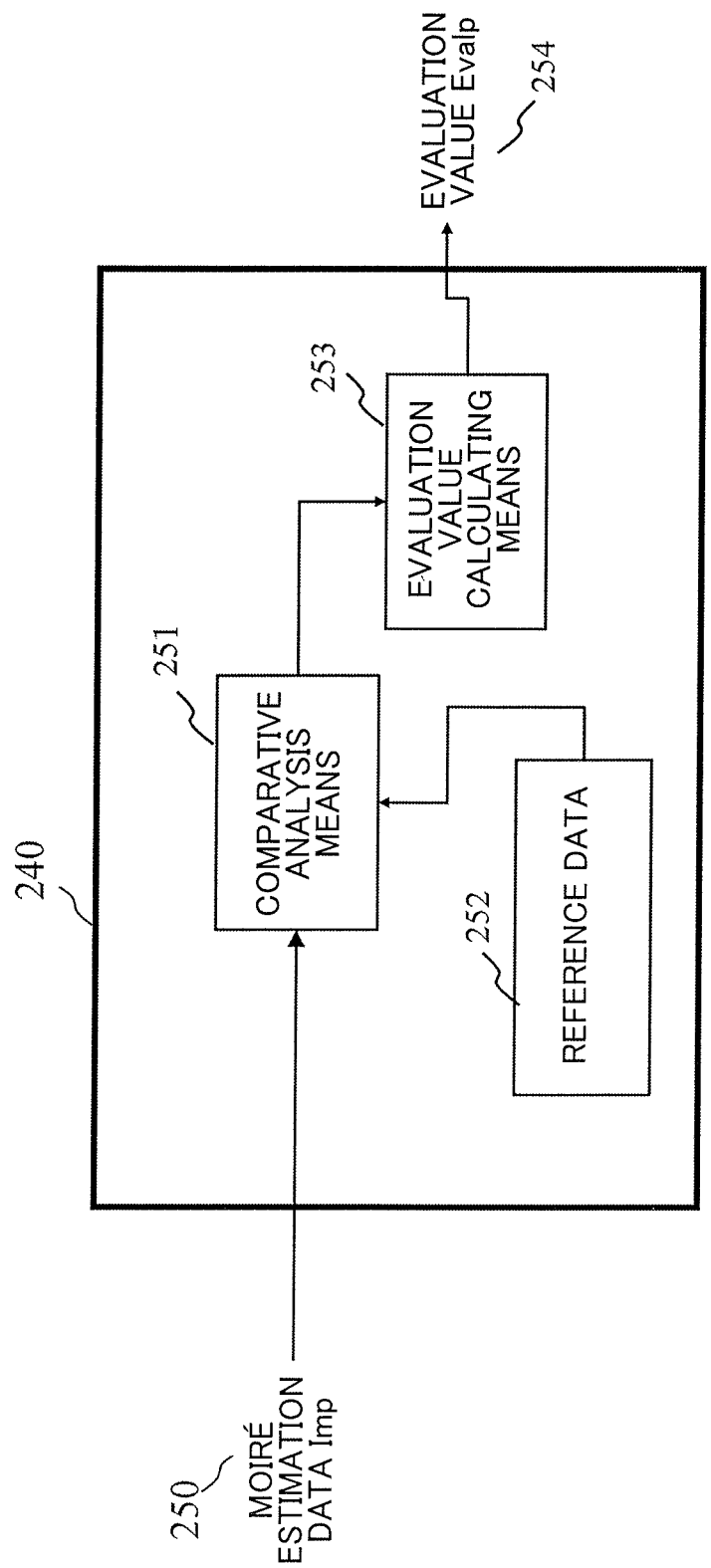
FIG. 20 shows a configuration of a moiré pattern evaluating means in the image display device as the fourth invention according to the present invention.
Figure 21:
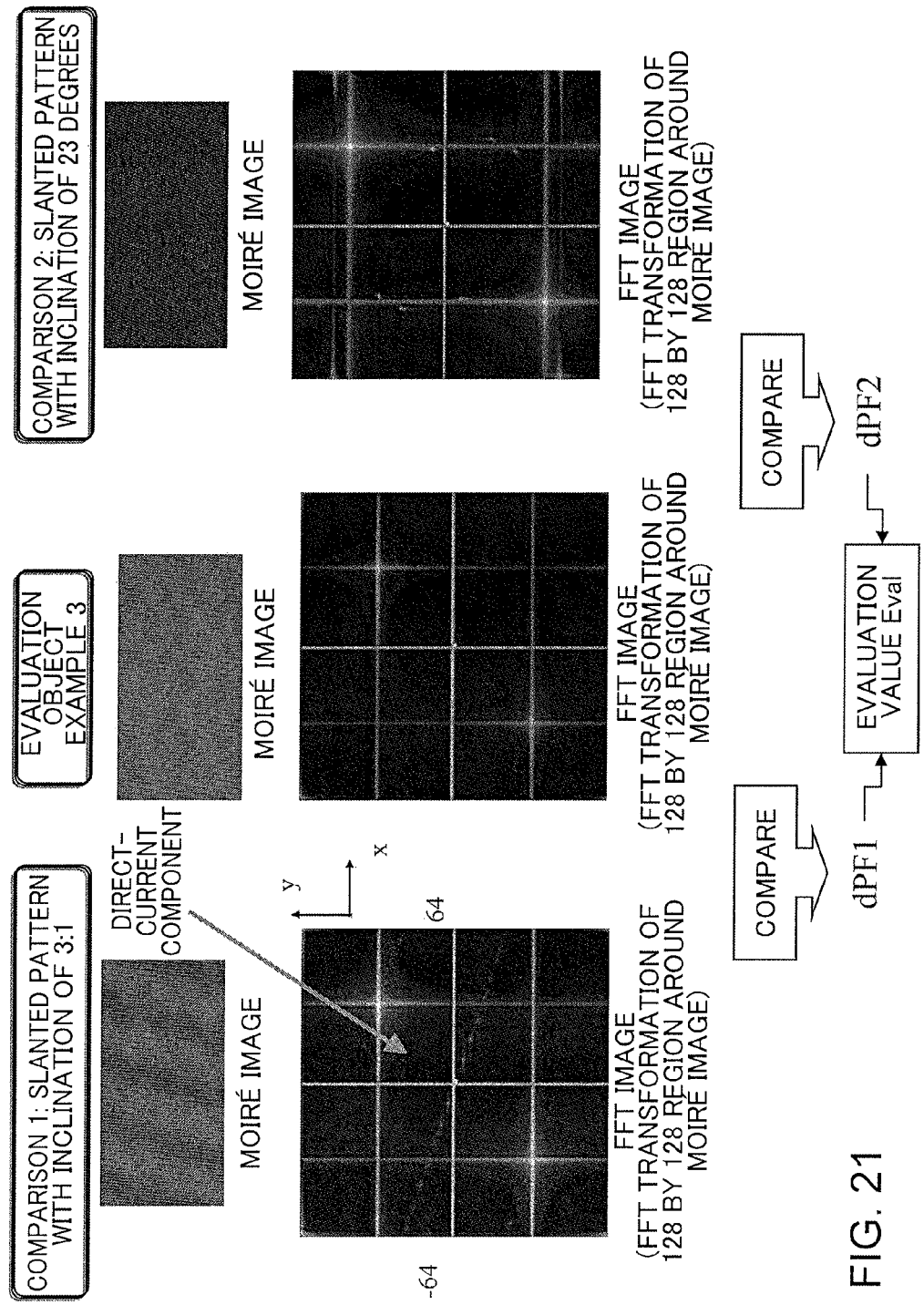
FIG. 21 schematically shows a moiré pattern evaluation value calculating method of the image display device as the fourth invention according to the present invention.

FIG. 18 shows a configuration of an image display device representing the fourth embodiment of the present invention. FIG. 19 shows a configuration of an opening parameter adjusting means of the image display device representing the fourth embodiment of the present invention. FIG. 20 shows a configuration of a moiré pattern evaluating means. This invention is configured by adding the opening parameter adjusting means to the first embodiment. FIG. 21 schematically shows a moiré pattern evaluation method. FIG. 22 shows an example of a reference pattern used for moiré pattern evaluation. An opening parameter implemented by 230 represents a parameter other than a notch cycle ds. It is assumed that a moiré estimating means uses the method shown in FIG. 11 and described in the first embodiment. With reference to these drawings, the image display device representing the fourth embodiment of the present invention is described.

As shown in FIG. 18, the image display device includes an initial adjusting means 105, which adjusts a display device, a diffusing pattern and alike, an image display means 100, which displays a two-dimensional parallax image, a display circuit 107 of the image display means 100, a light source 1100, a diffusing means 101 which has a diffusion pattern configured to diffuse and transmit light from the light source 1100 to the image display means and enables at least one of images included in a composite image displayed on the image display means to be observed, a diffusing means adjusting circuit 106, which adjusts a distance between the diffusing means and the image display means, a position of the diffusing means and alike, a parallax composite image 108, which is displayed on the image display means 100 through the display circuit, a notch adjusting means 109, which appropriately adjusts a notch cycle by judging and correcting whether or not adverse effects are created by the notches themselves, and an opening parameter adjusting means 230, which adjusts other notch parameters (opening width, angle and alike) on the basis of the obtained notch cycle. For example, as shown in FIG. 3, the diffusing means reflects and guides light from the light source means. Diffusion patterns are engraved at predetermined intervals on the diffusing means. The diffusing means includes the diffusion patterns which diffuse and transmit incident light on the diffusion patterns toward the image display means.

As shown in FIG. 19, in the opening parameter adjusting means 230, when it is determined whether the opening parameter has to be adjusted by a moiré estimating means 220 configured to estimate moiré due to a predetermined pattern or a moiré pattern evaluating means 240 configured to perform a frequency analysis on a moiré estimation pattern or a reference pattern, a switching means 242 is connected to 242a to hand over the opening parameter as an appropriate barrier parameter Vp4 to the diffusing means adjusting circuit. Unless the aforementioned conditions are satisfied, the switching means 242 is connected to 242b to hand over processes to a width/inclination adjusting means 241. 240 includes reference data 211, a comparative analysis means 251, which performs frequency analysis on a moiré estimation pattern or a reference pattern, and an evaluation value calculating means 213 which calculates an evaluation value of a pattern for a current parameter on the basis of a frequency analysis result obtained by the analysis means.

The initial adjusting means 105 adjusts a display device, a diffusing pattern and alike when starting image display or upon initial installation in a room such as a living room. Meanwhile, a stereoscopic image visibility evaluation using a test image from an optimal viewing distance is performed. Tuning or alike of gradation characteristics is performed by means of the display circuit on the basis of visibility and a degree of blur/fusion. Optionally, parallax amount control in a parallax image (intensity control or an adjustment of a horizontal shift amount using a linear coefficient) may be conducted.

A parallax composite image 108 displayed by the image display means 100 is separated so that a predetermined parallax image may be observed at a predetermined position by the image separation means 101. Therefore, a stereoscopic image can be observed at a position of an observer by observing different parallax images with the left and right eyes, respectively. As shown in FIG. 3, the diffusing means 101 includes a light guiding region, which guides light from the light source means. Diffusion patterns are engraved at predetermined intervals. The diffusing means 101 operates so as to diffuse and transmit incident light on the diffusion pattern toward the image display means. Light except for the incident light on the diffusion pattern continues to be reflected and guided by the light guiding region. A parallax barrier system for a naked-eye 3D system including opening portions and barrier portions completely blocks light by barriers whereas the aforementioned configuration continuously reflects and guides the light by means of the light guiding region. The light is diffused in a predetermined direction toward the display panel upon incidence to the diffusion pattern, which results in brighter image display than a conventional parallax barrier system. The diffusion pattern has a slanted structure, which is arranged at a predetermined pitch and is inclined in a diagonal direction, or a stepped structure having a rectangular structure that conforms to a sub-pixel size.

Figure 23:
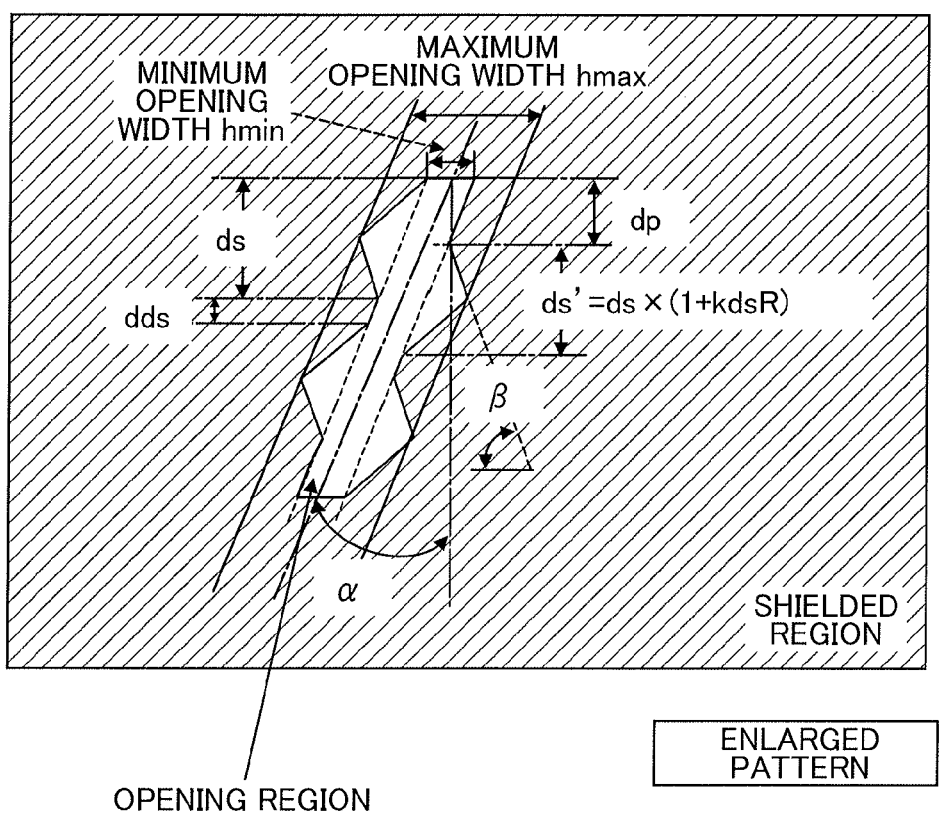
FIG. 23 is a schematic diagram showing a more versatile notched structure of the image display device as the fourth invention according to the present invention.

In the present fourth embodiment, an opening of the diffusion pattern is shaped by adding a phase shift dp between left and right notched structures, a gap dds between notched structures, and a variation parameter kdsR of a height of the right notched structure to a slanted structure to which an uneven structure (notched structure) is added according to the first embodiment as shown in FIG. 23. In this case, by adding an uneven structure to an edge of an opening so that hidden pixel regions by the notched structure in a bright portion are increased and visible pixel regions through the notched structure in a dark portion are increased, like FIG. 6(c) which shows the effect achieved by the first embodiment. An amount or range of blur may be advantageously controlled over a wider adjustment range. Consequently, parameter evaluation or adjustment to various parameters may be performed by taking manufacturing errors during manufacturing the diffusion pattern into consideration as tolerance in advance. Evaluation of parameters for a diffusion pattern by taking manufacturing errors into consideration may be performed by considering a predetermined manufacturing error err(%) for a location where errors are likely to occur such as the minimum opening width hmin and estimating a moiré pattern by adding the manufacturing errors err(%) when estimating and evaluating moiré.

220 evaluates a notched structure pattern obtained by each diffusion pattern parameter using a notch cycle dso judged and adjusted by a method, like the first embodiment. 220 estimates a moiré pattern (bright-dark pattern) visible from a predetermined observing position U(xc, yc) for each of parameters vp[i]=($\alpha$[i], $\beta$[i], ds[i], hmax[i], hmin[i], dp[i], dds[i], kdsR[i], Ave_rh[i]) of a diffusion pattern having a notched structure. It is assumed that an optimal viewing distance dlen, a diffusion pattern-panel distance gap, a pixel size p, a sub-pixel size sp, and a parallax number num are set by the initial setting means. Some parameters including Ave_rh[i]=Aveh0, $\alpha$[i]=$\alpha$0, and hmin[i]=hmin0 are often fixed as a panel pixel structure or design values, but variable parameters may be adopted instead. The maximum opening width hmax, namely, the height dw of the notched structure may vary. In this case, a variation may be added as a parameter such as kdw. Ave_rh represents an average opening ratio in the size of one object pixel (vertical direction), like the first or second embodiment. Among the barrier parameters, ds[i] is set to dso adjusted like the first embodiment and is not an adjustment object of 230. 220 estimates a moiré pattern as viewed from an observing position U using a method depicted in FIG. 11 which shows a simulation of creation of adverse-effect stripes for a notch cycle according to the first embodiment.

An evaluation of a moiré estimation pattern created by an object parameter vp and obtained as described above, namely, an evaluation of a diffusion pattern is performed by means of the method shown in FIG. 21. A diffusion pattern may be handled in a similar manner although an example of a barrier pattern is shown. Among the reference pattern 252, (1) represents a moiré pattern obtained by a slanted barrier with favorable parallax separation, less crosstalk, a reference 1 inclination angle of 3:1 ($\alpha$=18.435 degrees), and an opening ratio of rhth=1.0. In addition, (2) represents a moiré pattern obtained by a slanted barrier, which is inclined so as to reduce moiré at a reference 2 inclination angle α (e.g. 23 degrees) and has an opening ratio of rhth=1.0.

FIG. 22 shows estimation data (a pattern of 400 pixels× 200 pixels as observed from the center of the screen U with an optimal viewing distance 3000 mm, an observing distance 1000 mm, and 4 parallaxes) although reference data may be actual image data or an estimation image created by the aforementioned moiré simulation. If actual photography data is used as reference data, average brightness correction, color balance correction and alike has to be performed. However, in this case, since a difference amount of frequency analysis for brightness is used, evaluation may be directly performed. 251 performs frequency analysis on a moiré pattern k estimated on the basis of reference 1, reference 2 and a notched structure parameter vp[k], and calculates an average power spectrum within a predetermined frequency range. Subsequently, 251 calculates a difference dPF1 between a power spectrum for reference 1 and a power spectrum of a notched structure diffusion pattern of parameter vp, and calculates a difference dPF2 between a power spectrum for reference 2 and the power spectrum of the notched structure diffusion pattern of the parameter vp. On the basis of these two differences, 253 calculates an evaluation value Eval[k] of vp according to (Eqn 5), where w represents a weight coefficient (0.0≤w≤1.0), and dPFMax1 represents a maximum value of dPF1. In other words, Eval[k] represents a frequency distribution which is different from reference 1. The closer Eval[k] is to reference 2, the smaller the evaluation value. As herein defined, the smaller the evaluation value, the more appropriate the parameter. A notched structure diffusion pattern which is close as possible to a pattern that is inclined so as to reduce moiré, like the case of reference 2 while having the crosstalk characteristics of reference 1 is selected. The closer w is to 0, a diffusion pattern having a value that is further away from reference 1 has a smaller evaluation value. Therefore, the diffusion pattern is determined to be more appropriate. The closer w is to 1.0, a diffusion pattern having a value that is closer to reference 2 has a smaller evaluation value. Therefore, the diffusion pattern is more appropriately determined.
(Eqn 5)

$$\text{Eval}=(dPF\text{Max}1-dPF1)\times(1.0-w)+w\times dPF2 \quad (5)$$

Accordingly, the adjustment range may be further widened. Meanwhile, it may be determined whether a selected parameter is appropriate. For example, when the notched structure diffusion pattern according to the first embodiment is created by emulsion on a glass plate, an occurrence of manufacturing errors often results in creation of a notch gap dds. A fluctuation of the maximum opening width hmax or a left-right phase shift is also highly likely to occur. This means that such errors are equally likely to occur in an active barrier such as a liquid crystal barrier due to approximation caused by expressible shape accuracy. In this case, optimization of a diffusion pattern by taking the errors into consideration may be achieved by expanding the adjustment range like the present embodiment although the errors are not taken into consideration in the first embodiment.

Albeit qualitative, the following are known.

The notch gap dds has periodicity in (0.2-0.4)×ds. An optimum notch gap dds is favorably selected from this range.

A right notch start position dp is related to phase shift, has periodicity at ds, and tends to be relatively optimal near ds×0.5.

Right cycle increase kdsR has periodicity in (0.2-0.4)×ds.

An evaluation value of the notch width ds also has periodicity, and the smaller the value of hmin, the greater the periodicity. This is also attributable to the fact that, the smaller the value of hmin, the more significantly the height dw of the notched structure can be varied when Ave_rh is constant.

The width may be defined along an inclination angle θ of the diffusion pattern although the width ds of the notched structure is represented by a vertical width, like the first embodiment. In this case, the width of the notched structure is a quotient of ds divided by cos θ.

Alternatively, the notched structure may include trapezoids, elliptical arcs with varying curvature or parallelograms although a notched structure including triangles is shown in FIG. 5, like the first embodiment. The present embodiment may be applied to a vertical striped structure although the present embodiment is described with reference to an example of a diagonal barrier structure. Instead of providing a notched structure in the horizontal direction as shown in FIG. 5, a notched structure may be added in a direction perpendicular to the central axis of the diffusion pattern.

The present embodiment may be applied to a stepped structure in which rectangular shapes of sub-pixels are arranged in a diagonal direction although a slanted structure is described as an example.

If dw denotes a height of a notched structure and p denotes a size of one pixel, an opening area dSn of the notched structure in one pixel and an opening area dSo of a slanted structure having a minimum opening width hmin in one pixel may be expressed as (Eqn 2), like the first embodiment. This is applicable regardless of the presence of a gap or alike. Even if heights dwL and dwR of the left and right notched structures vary, the opening area S in one pixel in the vertical direction is consistent as long as dwL+dwR=dw×2 is satisfied.

With keeping the pixel-size average opening ratio Ave_rh at ThAve_rH, crosstalk reduction may be satisfied by suppressing the maximum opening width hmax so as to stay in a predetermined size LWMax=sp×dmax relative to the sub-pixel size sp=p/3. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater. Adding such a portion enables control of not only the average opening ratio but also the maximum opening width with respect to a sub-pixel sp, which is a reference for parallax image arrangement. Accordingly, a diffusion pattern capable of suppressing a moiré pattern with satisfying greater crosstalk reduction may be designed.

A luminance distribution at a horizontal position as described in the second embodiment may be used instead although the comparative analysis means is premised on two-dimensional FFT transform performed on moiré estimation data Imp. Analysis may be performed by comparing with a moiré pattern using image recognition.

The present invention may be combined with the second embodiment (FIG. 12). In this case, the initial adjusting means 105 adjusts a parallax barrier, a diffusion pattern (second embodiment) or alike. The opening parameter adjusting means 230 is added to a barrier opening or the reflecting/diffusing means. In this case, as the barrier (parallax barrier) 1201, a fixed barrier made of a thin film or a substance with high transparency (such as glass) or a device (such as a TFT liquid crystal panel), of which shielding and opening (light transmittance) may be varied by applying a voltage or alike, may be used. Likewise, the opening parameter adjusting means according to the present invention may be added to the third embodiment.

<Fifth Embodiment>

Figure 24:
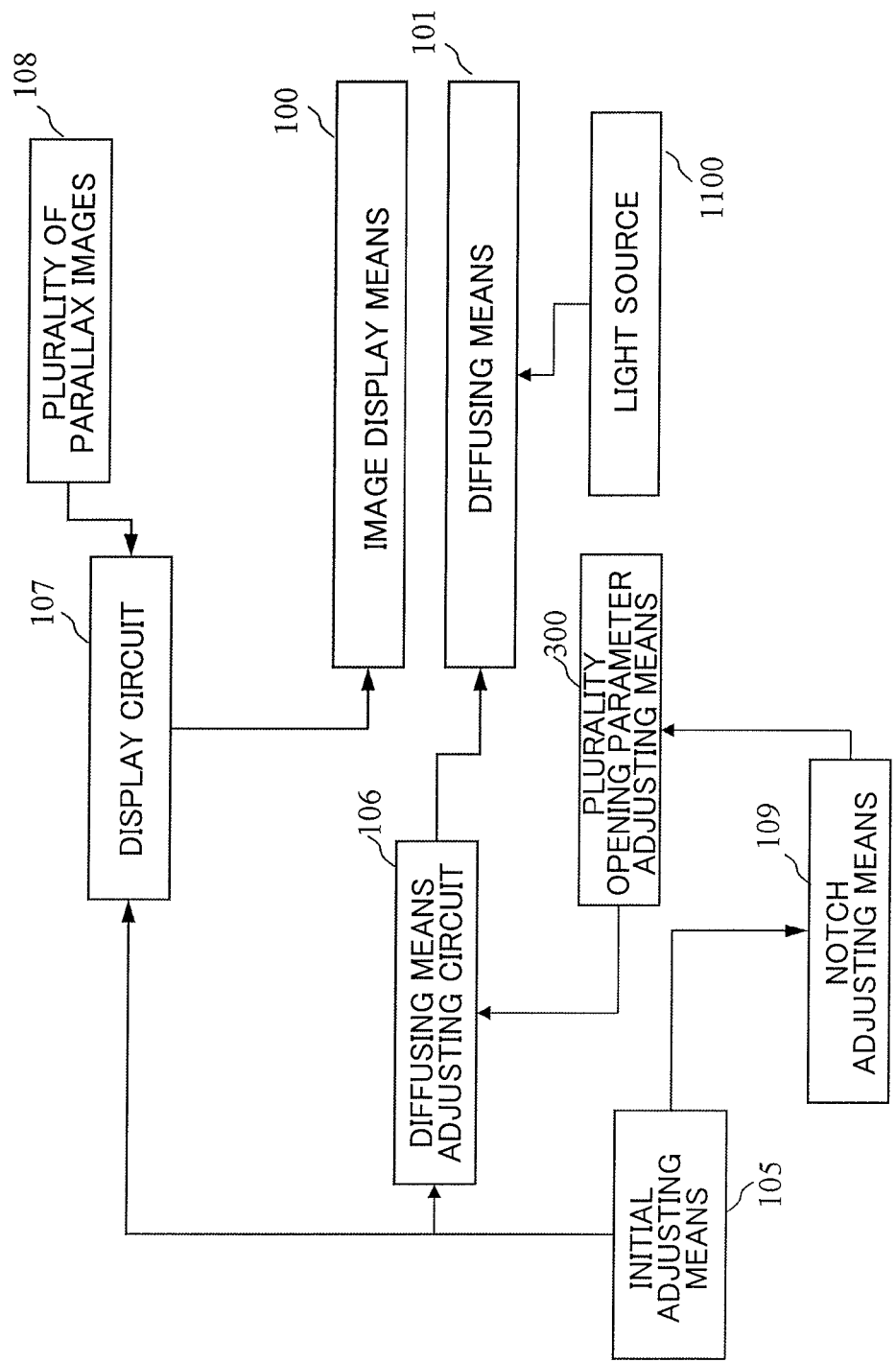
FIG. 24 shows a configuration of an image display device as the fifth invention according to the present invention.
Figure 25:
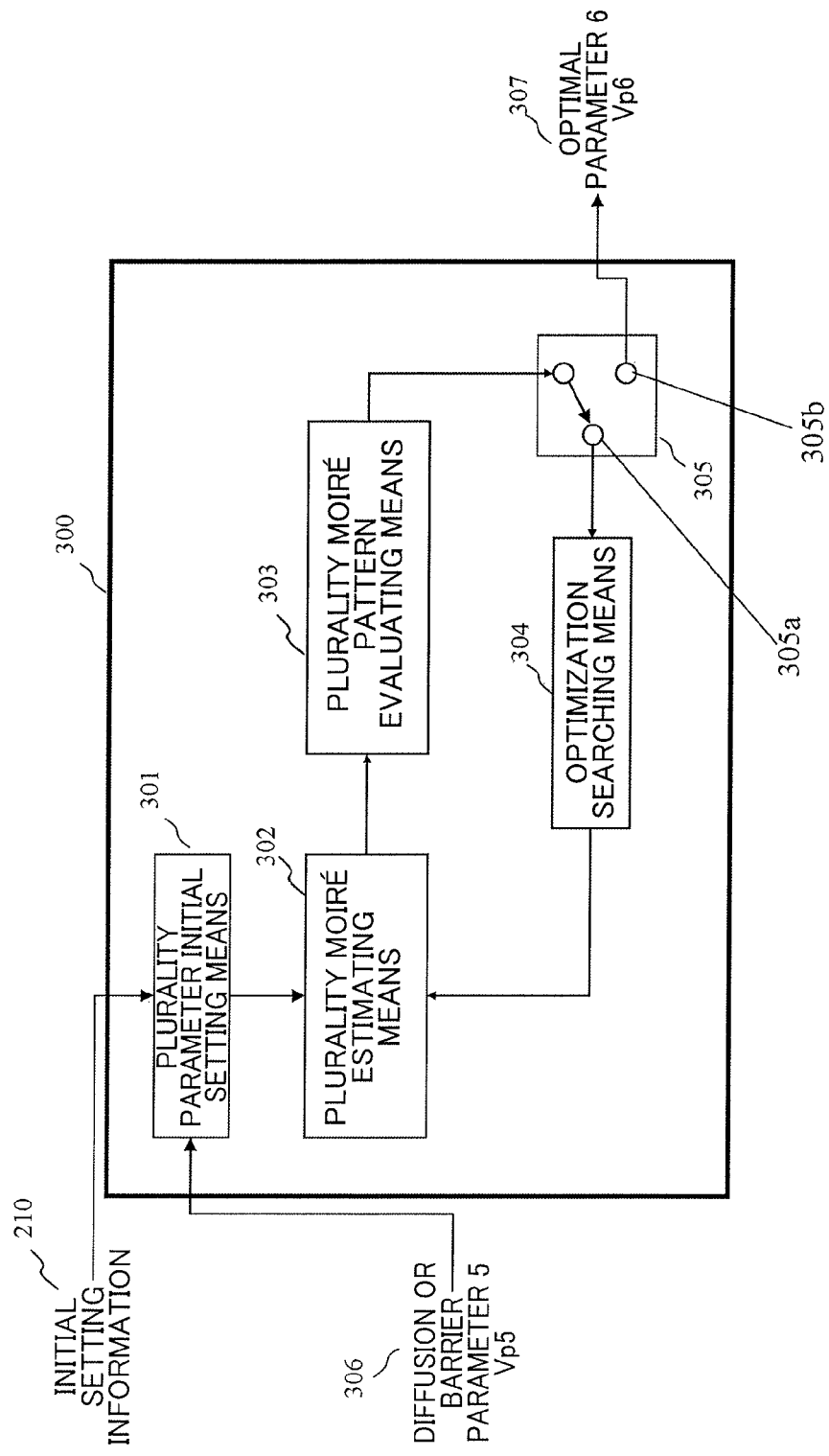
FIG. 25 shows a configuration of a plurality opening parameter adjusting means in the image display device as the fifth invention according to the present invention.
Figure 26:
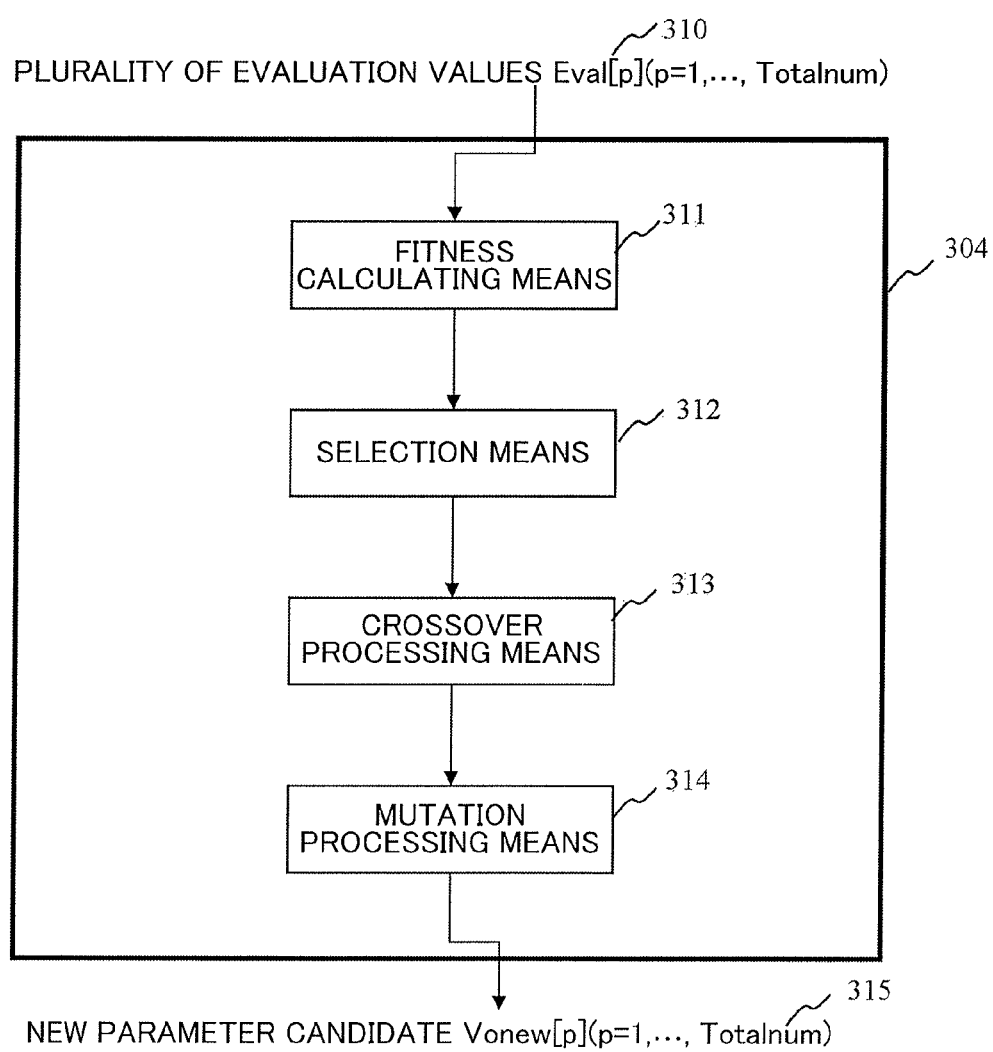
FIG. 26 shows a configuration of an optimization searching means in the image display device as the fifth invention according to the present invention.

The fifth embodiment of the present invention is described with reference to FIGS. 11 and 24 to 26. This embodiment provides stereoscopic image display having a more appropriate diffusion pattern by performing quantitative evaluation of each moiré pattern according to the fourth embodiment on several pattern candidates which satisfies a notch cycle and performing a predetermined optimization search. FIG. 24 shows a configuration of an image display device according to the fifth embodiment of the present invention. FIG. 25 shows a configuration of a plurality opening parameter adjusting means 300 according to the fifth embodiment of the present invention. FIG. 26 shows a configuration of an optimization searching means 304 according to the fourth embodiment of the present invention.

Like the notch adjusting means 109 according to the first or fourth embodiment, it is determined whether or not resultant adverse effects (horizontal, diagonal or vertical stripes and alike) from notches themselves are created. If the adverse effects are likely to be created, a notch cycle ds is adjusted. Meanwhile, appropriately adjusted notch cycles ds are not uniquely determined but several candidates may obtained.

Since there are a gnum number of parameter candidates for a nnum number of appropriate notch cycles ds[i](i=0, nnum−1) extracted by 109, Totalnum=gnum×nnum number of parameter candidate vectors of a diffusion pattern having a notched structure are defined as vp[k][i]=(α[k][i], β[k][i], ds[k][i], hmax[k][i], hmin[k][i], dp[k][i], dds[k][i], kdsR[k], Ave_rh[k])(i=0, . . . , nnum−1) (k=0, . . . , gnum−1), where gnum represents the number of parameter candidates initially set for a single notch cycle ds[i]. Although gnum is fixed in this case, gnum may be variable for each ds[i]. 301 uses this process and other fixed parameters necessary for moiré estimation (a gap between the diffusion pattern and a panel, and alike). A plurarity moiré estimating means 302 estimates a moiré pattern (bright-dark pattern) image Img[k][i], which is visible from a predetermined observing position U(xc, yc) for the group of parameter candidate vectors vp[k][i]. 303 performs a frequency analysis of the moiré pattern (bright-dark pattern) image 1 mg[k][i], which is visible from a predetermined observing position U(xc, yc) using two-dimensional FFT for the group of parameter candidate vectors vp[k][i] obtained by 302. Subsequently, a moiré state in the group of parameter candidate vectors vp[k][i] is evaluated by means of the evaluation shown in FIG. 21 according to the fourth embodiment to determine an evaluation value Eval[k][i] of each parameter vector. If there is a value greater than a predetermined threshold ThEval, the switching means 305 is switched to 305b on assumption that an appropriate parameter candidate is obtained. The value is output as an optimum barrier parameter 6 Vp6 and handed over to the diffusing means adjusting circuit. On the other hand, unless 303 obtains a value greater than the predetermined threshold ThEval, it is determined that adjustment and search of a parameter candidate vector is necessary. The switching means 305a is connected to hand over processes to the optimization searching means 304.

The optimization searching means 304 is a processing unit, which performs a multivariate parameter optimal search (e.g. a genetic algorithm, a neural network or a least square method) on the basis of each evaluation value Eval[k][i] of the large number of parameter candidates vp[k][i] (i=0, . . . , nnum−1)(k=0, . . . , gnum−1) initially set by 301. FIG. 26 shows a configuration example, in which a genetic algorithm is used for a multivariate parameter optimal search. In the genetic algorithm, processes are executed as follows.

<<Step 1>>

A set P consisting of Totalnum number of vp[k][i] as members is considered. Each element of a vector vp[k][i] as a member of the set P expresses a specific solution of a corresponding parameter in an optimum solution search problem, which is given as an object. It should be noted that a vector vp corresponds to a specific solution vector. The respective elements α[k][i], β[k][i], ds[k][i], hmax[k][i], hmin[k] [i], dp[k][i], dds[k][i], kdsR[k] and Ave_rh[k] of the vector vp[k][i] are referred to as "genes" in association with a living organism. The vector vp may be sometimes referred to as a "chromosome". With a genetic algorithm, an initial set P of solution vectors is appropriately created.

<<Step 2>>

A quality of a solution of each member (chromosome) of the set P is evaluated according to an evaluation scale set in advance. A result of the evaluation is expressed as an evaluation value. In this case, the evaluation scale set in advance is referred to as an evaluation function (fitness function). Further transformation may be performed by means of another linear/non-linear transformation function although Eval[k][i] from 303 is used as the evaluation value of the vector vp[k][i].

<<Step 3>>

Fitness of a solution is determined on the basis of a magnitude relationship of the evaluation value obtained in Step 2. A larger evaluation value may be a solution with better fitness or a smaller evaluation value is a solution with better fitness although it depends on problems. The former is referred to as a maximization problem whereas the latter as a minimization problem. Solution vectors with low fitness are deleted from a current solution set so that solution vectors with high fitness are selectively retained. Such an operation is referred to as selection. There are various known methods for performing selection.

<<Step 4>>

Genetic modification such as crossover (global search) and/or mutation (local search) is performed on the set of solution vectors selected in Step 3 to create a new set of solution vectors.

Modification of the current group of diffusion parameter candidate vectors vp[k][i] is performed as described above to create new diffusion parameter candidate vectors vp[k][i]. This process is terminated when (in the case of a maximization problem) the evaluation value Eval[k][i] for the group of diffusion parameter candidate vectors vp[k][i] exceeds a predetermined value (in the case of a minimization problem, a judgment to terminate the process is made when the evaluation value Eval[k][i] falls below a predetermined value). Alternatively, the process may be terminated when an absolute value of a variation of Eval[k][i] falls below a predetermined value. Until the process is terminated, the process routine returns to Step 2. It is known that such a method corresponding to multivariate parameter optimal search is capable of realizing optimization of multivariate parameter vectors by repeating the crossover (global search) and/or mutation (local search) in Step 4. An appropriate diffusion pattern satisfying the notch cycle may be selected by handing over the optimum diffusion pattern parameter obtained as described above to the barrier adjusting circuit. In general, several notch cycle candidates ds[i] without creating adverse effects conceivably exist as shown in FIGS. 7 and 8. It is also conceivable that there are several parameter candidates such as an appropriate notch width or an appropriate angle for each notch cycle candidate. This invention has advantages that a diffusion pattern without creating resultant adverse effects from the notches themselves may be automatically optimized by combining a method of optimizing multivariate parameter vectors and the fourth embodiment in order to perform the quantitative evaluation of each moiré pattern according to the fourth invention on several pattern candidates satisfying the notch cycle to perform a predetermined optimization search.

The width may be defined along an inclination angle θ of the diffusion pattern although the width ds of the notched structure is represented by a width in the vertical direction, like the first or third embodiment. In this case, the width of the notched structure is a quotient of ds divided by cos θ.

Alternatively, the notched structure may include trapezoids, elliptical arcs with varying curvature, or parallelograms although a notched structure including triangles is shown in FIG. 5, like the first embodiment. The present embodiment may be applied to a vertical striped structure although the present embodiment is described on the basis of a slanted structure. Instead of providing a notched structure in the horizontal direction as shown in FIG. 2, a notched structure may be added in a direction perpendicular to the central axis of the diffusion pattern.

The present embodiment may be applied to a diffusion pattern with a stepped structure in which rectangular shapes of sub-pixels are arranged in a diagonal direction although a diffusion pattern having a slanted structure is described as an example.

If dw denotes a height of a notched structure and p denotes a size of one pixel, an opening area dSn of the notched structure in one pixel and an opening area dSo of a slanted structure having a minimum opening width hmin in one pixel may be expressed as (Eqn 4), like the first embodiment. This is applicable regardless of the presence of a gap or alike. Even if heights dwL and dwR of the left and right notched structures vary, the opening area S in one pixel in the vertical direction remains unchanged as long as dwL+dwR=dw×2 is satisfied.

A crosstalk reduction may be satisfied by suppressing the maximum opening width hmax so as to stay in a predetermined size LWMax=sp×dmax for the sub-pixel size sp=p/3 with keeping the pixel-size average opening ratio Ave_rh at ThAve_rH. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater. Adding such a portion enables control of not only the average opening ratio but also the maximum opening width for a sub-pixel sp as a reference for parallax image arrangement. Consequently, a diffusion pattern capable of suppressing a moiré pattern with satisfying greater crosstalk reduction may be designed.

A luminance distribution for a position in the horizontal direction as described in the second embodiment may be used instead although the comparative analysis means is premised on a two-dimensional FFT transformation performed on moiré estimation data Imp. Analysis may be performed by comparing with a moiré pattern by means of image recognition.

The present invention may be combined with the second embodiment (FIG. 12). In this case, the initial adjusting means 105 adjusts a parallax barrier, a diffusion pattern (second embodiment) or alike. The plurality opening parameter adjusting means 300 is added to a barrier opening or the reflecting/diffusing means.

<Sixth Embodiment>

As the sixth embodiment of the present invention, a device performing stereoscopic image display is described with reference to FIGS. 1, 2 and 27 to 32. The device reduces moiré contrast without increasing crosstalk. The device is provided with a notched structure so that pixel regions visible under light diffusion by a diffusion pattern are as uniform as possible across each of pattern positions aligned in the horizontal direction. The device is also equipped with a function, which determines and corrects a notch cycle so as to prevent adverse effects from being created, like the first embodiment. FIGS. 1 and 14 or FIGS. 1 and 16, which show configurations of the third embodiment, may be combined with contents shown in FIGS. 27 to 32.

Figure 27:
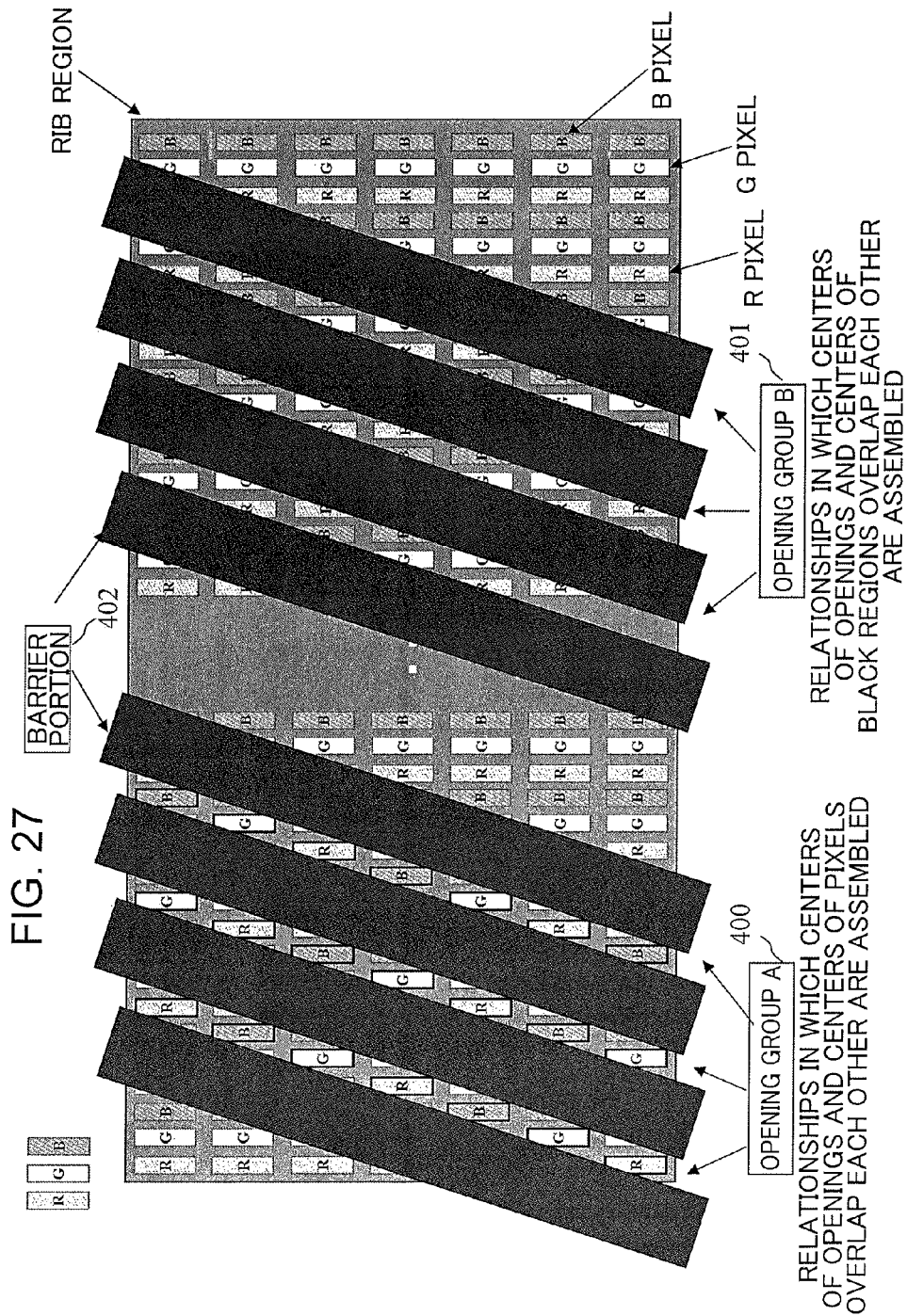
FIG. 27 schematically shows moiré creation by means of a slanted barrier or a diffusion pattern inclined at 18.435 degrees in an image display device as the sixth invention according to the present invention.
Figure 28:
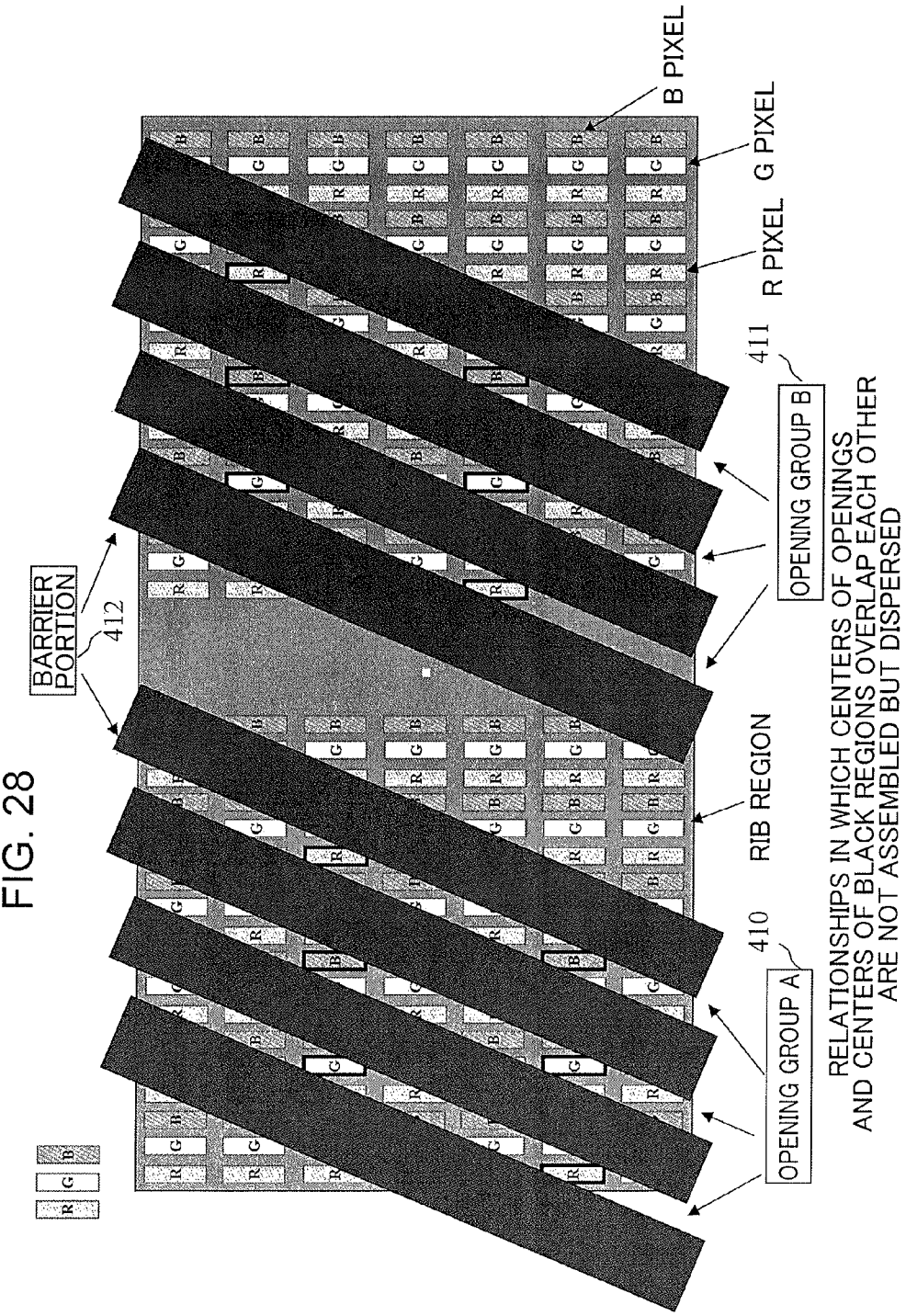
FIG. 28 schematically shows a factor that contributes to lower moiré in a case of a slanted barrier or a diffusion pattern inclined at 23 degrees in the image display device as the sixth invention according to the present invention.

The configuration may be shown by a similar configuration diagram to the first and third embodiments. Features of this invention are that a slanted pattern having the notched structure according to the first or third embodiment is created on the basis of concepts shown in FIGS. 27 to 32. FIG. 27 is a diagram estimating a reason that a moiré pattern is likely to be created under observation from a predetermined position in the case of a diffusion pattern having an inclination of 3:1 (α=18.435 degrees). FIG. 28 schematically shows a reason that moiré is less likely to be created under observation from a predetermined position in the case of a diffusion pattern with inclination of α=23 degrees. The diffusion pattern creates a very small amount of actually-visible moiré patterns. FIGS. 29 to 32 show examples of pattern in which an uneven structure (notched structure) is added to the diffusion pattern of α=18.435 degrees shown in FIG. 27 so as to reduce a moiré pattern on the basis of the aforementioned reason. As shown in FIGS. 29 to 32, in the notched structures, widths dw or heights ds do not have to coincide with each other to the left and right of a central opening, unlike the first and third embodiments. However, like the first embodiment, each notched structure is defined by four parameters, namely, an inclination angle α of the central axis of a diffusion pattern with respect to the vertical direction, an inclination angle β of the notched structure (triangular) portion with respect to a horizontal axis, a cycle width ds of the notched structure, and a height dw of the notched structure. ds may be expressed by the number of divisions n of the notched structure in one pixel width p as ds=p/n. The width may be defined along an inclination angle θ of the diffusion pattern although the cycle width ds of the notched structure is represented by a width in the vertical direction, like the first and third embodiments. In this case the cycle width of the notched structure is a quotient of ds divided by cos θ.

Likelihood of creation of a moiré pattern by an ordinary slanted diffusion pattern is described with reference to FIGS. 27 and 28. In the drawings, several openings of a slanted diffusion pattern having a predetermined opening width (opening ratio rhth=1.0) are shown in front of RGB pixels. Although parallax number N=4 is shown in this example, the same is applicable to other parallax numbers. A case of inclination angle α=18.435 degrees is schematically represented as shown in FIG. 27. According to a comparison between an opening group A 400 and an opening group B 401, the opening group A represents an assembly of openings featuring a relationship in which the centers of each of openings overlap the centers of RGB sub-pixel regions behind each of the openings whereas the opening group B represents an assembly of openings featuring a relationship in which the centers of each of openings overlap the centers of black matrix regions between RGB sub-pixel regions behind each of the openings. According to geometric calculations, it is known that a pitch distance between the centers of diffusion patterns has a value close to parallax number N×sub-pixel size sp. Therefore, although similar relationships between openings and sub-pixels are assembled around an object opening Ak(k=1, . . . , nA) with respect to a horizontal direction of a screen, the further away from the vicinity of the object opening Ak(k=1, . . . , nA) in the horizontal direction of the screen, the more likely an opening Bn(n=1, . . . , nB) that deviates from the object opening Ak is created. With openings Ak in the opening group A, since many have a relationship in which the centers of each of the openings overlap the centers of RGB sub-pixel regions behind each of the openings, the openings are perceived as being bright from a predetermined observing position, so that a bright pattern is observed for the group as a whole. In contrast, with openings Bk in the opening group B, since many have a relationship in which the centers of each of the openings overlap centers of black matrix regions between RGB sub-pixel regions behind each of the openings, the openings are perceived as being significantly dark from a predetermined observing position, so that a dark pattern is observed for the group as a whole. Accordingly, if the diffusion pattern of α=18.435 degrees is observed from a predetermined position, a moiré pattern, in which bright and dark portions are cyclically repeated in the horizontal direction, is notably created. As described above, when viewing through each of the openings, it is speculated that an assembly of similar positional relationships between each of the openings and the RGB sub-pixel regions behind each of the openings is likely to result in non-uniform brightness among each of the openings (Ak and Bk), and increases the likelihood of creation of a moiré pattern. FIG. 28 schematically shows a case of the inclination angle α=23 degrees. This case actually has a very small amount of moiré. In this case, a comparison between an opening group A 410 and an opening group B 411 of a slanted diffusion pattern shows that both the opening group A and the opening group B represent a case where openings featuring a relationship in which the centers of each of the openings overlap the centers of RGB sub-pixel regions behind each of the openings are not assembled but dispersed. Accordingly, at openings Ak in the opening group A, since openings featuring a relationship in which the centers of each of the openings overlap the centers of RGB sub-pixel regions behind each of the openings are dispersed, the openings are not perceived as being significantly bright from a predetermined observing position. Likewise, at openings Bk in the opening group B, since openings featuring a relationship in which the centers of each of the openings overlap the centers of RGB sub-pixel regions behind each of the openings are dispersed, the openings are not perceived as being significantly bright from a predetermined observing position. In other words, a moiré pattern is less likely to result from a reduction in a difference in bright-dark patterns between the opening groups A and B. As described above, when viewing through each of the openings, it is speculated that a dispersion instead of an assembly of similar positional relationships between each of the openings and the RGB sub-pixel regions behind each of the openings reduces the likelihood of non-uniform brightness among the openings (Ak and Bk) and the likelihood of a moiré pattern creation.

Figure 29:
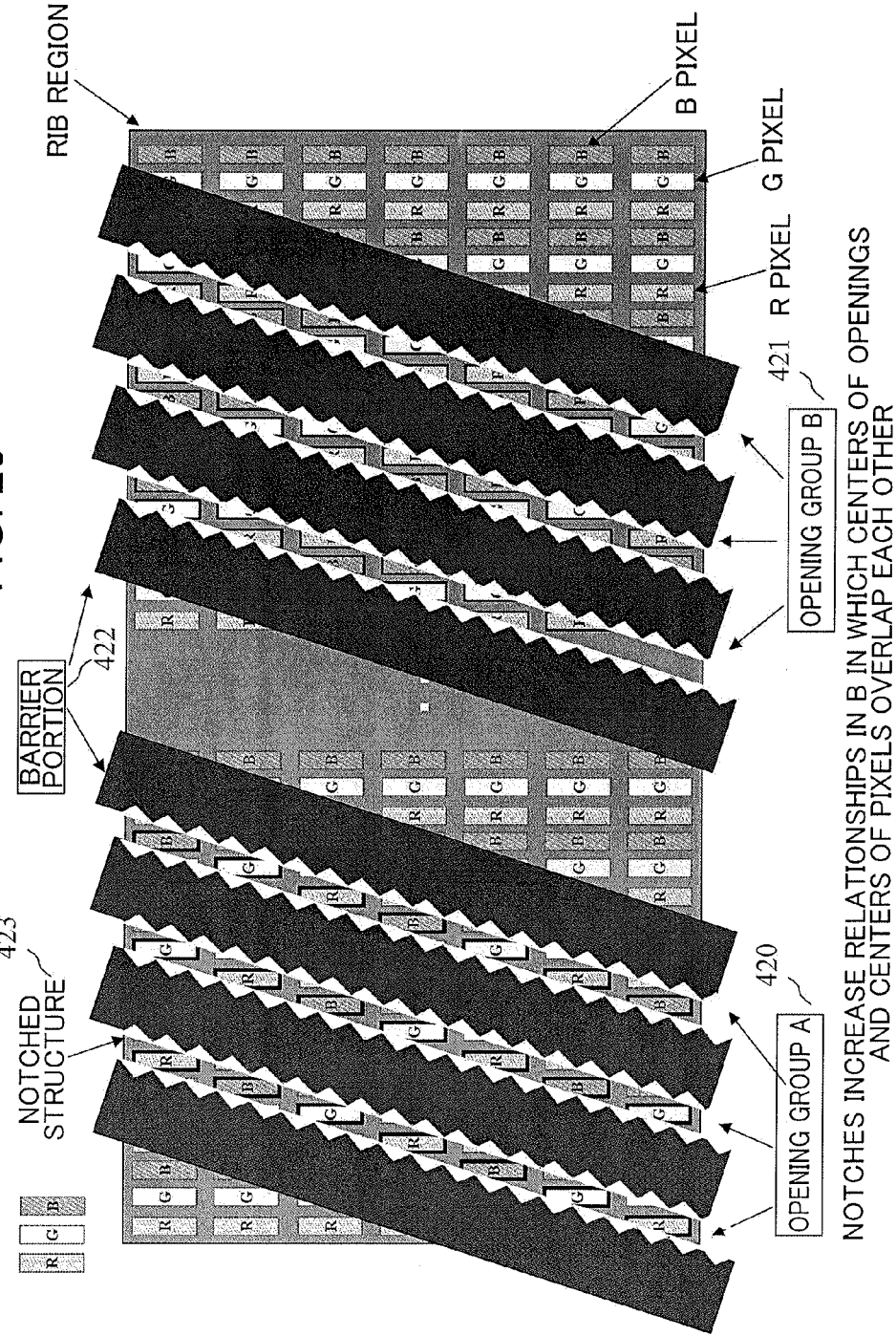
FIG. 29 schematically shows a positional relationship between openings and pixels in a barrier or a diffusion pattern of a first notched structure example (1 pixel is divided by 2.5) in the image display device as the sixth invention according to the present invention.

Examples of patterns in which an uneven structure (notched structure) is added to the barrier pattern of α=18.435 degrees shown in FIG. 27 based on the above are shown in FIGS. 29 to 32. It is assumed that an average opening ratio Ave_rh is equal to rhth. Therefore, a ratio of the minimum opening width to sub-pixel size is smaller than rhth and is expressed as rhmin=rhth×Rmin (in FIGS. 29 to 32, rhmin=1.0). FIG. 29 shows a case where the number of divisions n of a notched structure is n=2.5. Left and right notch opening widths (heights) dw are the same. Phases of left and right notch openings coincide with each other. With respect to the number of divisions n of a notched structure, in consideration of influence of manufacturing errors, it is preferable that a value nnd, which is a quotient of a sub-pixel size p in the vertical direction divided by the notch cycle ds, is a value, which is apart from a vicinity of an integer, like the first or second embodiment. If possible, a notch cycle, which is close to an intermediate value of consecutive integer ratios nn1 and nn1+1 or nn1−1 and nn1, is more favorable since the influence of manufacturing errors may be almost totally eliminated.

Figure 30:
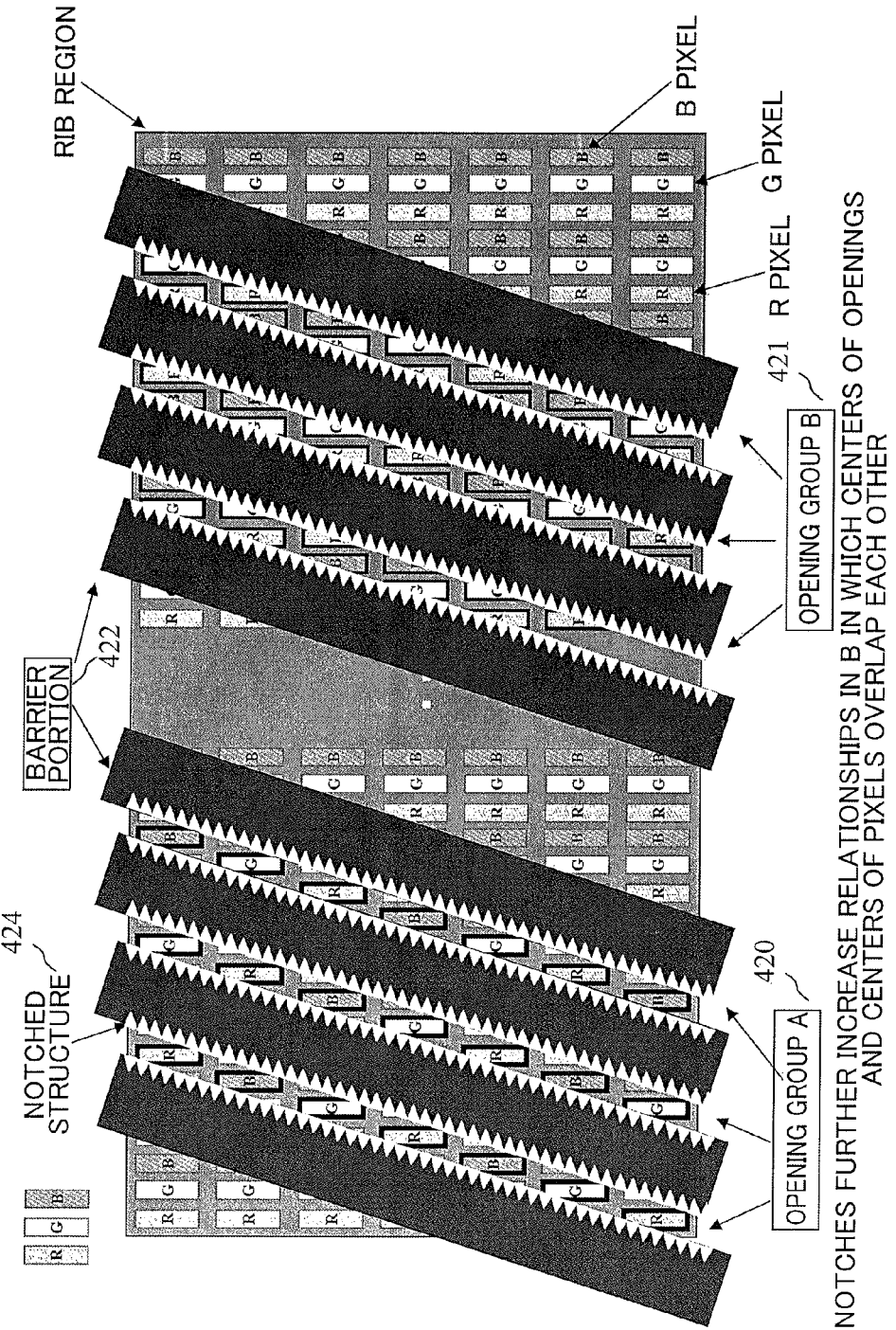
FIG. 30 schematically shows a positional relationship between openings and pixels in a barrier or a diffusion pattern of a second notched structure example (1 pixel is divided by 6.5) in the image display device as the sixth invention according to the present invention.

In this case, when viewing an opening Bm[s] of a single opening stripe Bm included in the opening group B in combination with an opening Bm[s+1] below the opening Bm[s], a greater proportion of the pixel (G pixel), which is behind the opening Bm[s], is visible. This positional relationship may be similarly observed with other opening stripes Bm included in the opening group B. In other words, with regard to the opening group B, this indicates that the addition of the notched structure increases the brightness, which is visible under light diffusion by the diffusion pattern in comparison to the opening group B shown in FIG. 23. In contrast, with regard to the opening group A, it is conceivable that the addition of the notched structure results in brightness at a level comparable to that of the opening group A shown in FIG. 27 although the minimum opening width hmin is smaller than an opening width hth of an ordinary slanted diffusion pattern. From the above, in comparison to FIG. 28, FIG. 29 shows that there is a smaller difference between the positional relationships between openings and pixels in group A and the positional relationships between openings and pixels in group B although similar positional relationships between openings and pixels are assembled. Accordingly, it is predicted that a moiré pattern decreases due to a reduction in contrast. FIG. 30 shows a case where the height dw of the notched structure is the same but the cycle width ds is reduced (the number of divisions n of a notched structure is increased to n=6.5) in comparison to FIG. 29. Compared to FIG. 29, when viewing an opening Bm[s] of a single opening stripe Bm included in the opening group B in combination with an opening Bm[s+1] below the opening Bm[s], the visible proportion of the pixel (G pixel) behind the opening Bm[s] is even greater. With regard to the opening group B, this indicates that the addition of a notched structure with a smaller cycle increases the brightness, which is visible through the diffusion pattern in comparison to the opening group B shown in FIGS. 27 and 29. In other words, there is an even smaller difference between the positional relationships between openings and pixels in group A and the positional relationships between openings and pixels in group B, in comparison to that in FIG. 29. Accordingly, it is predicted that a moiré pattern further decreases due to a further reduction in contrast.

Figure 31:
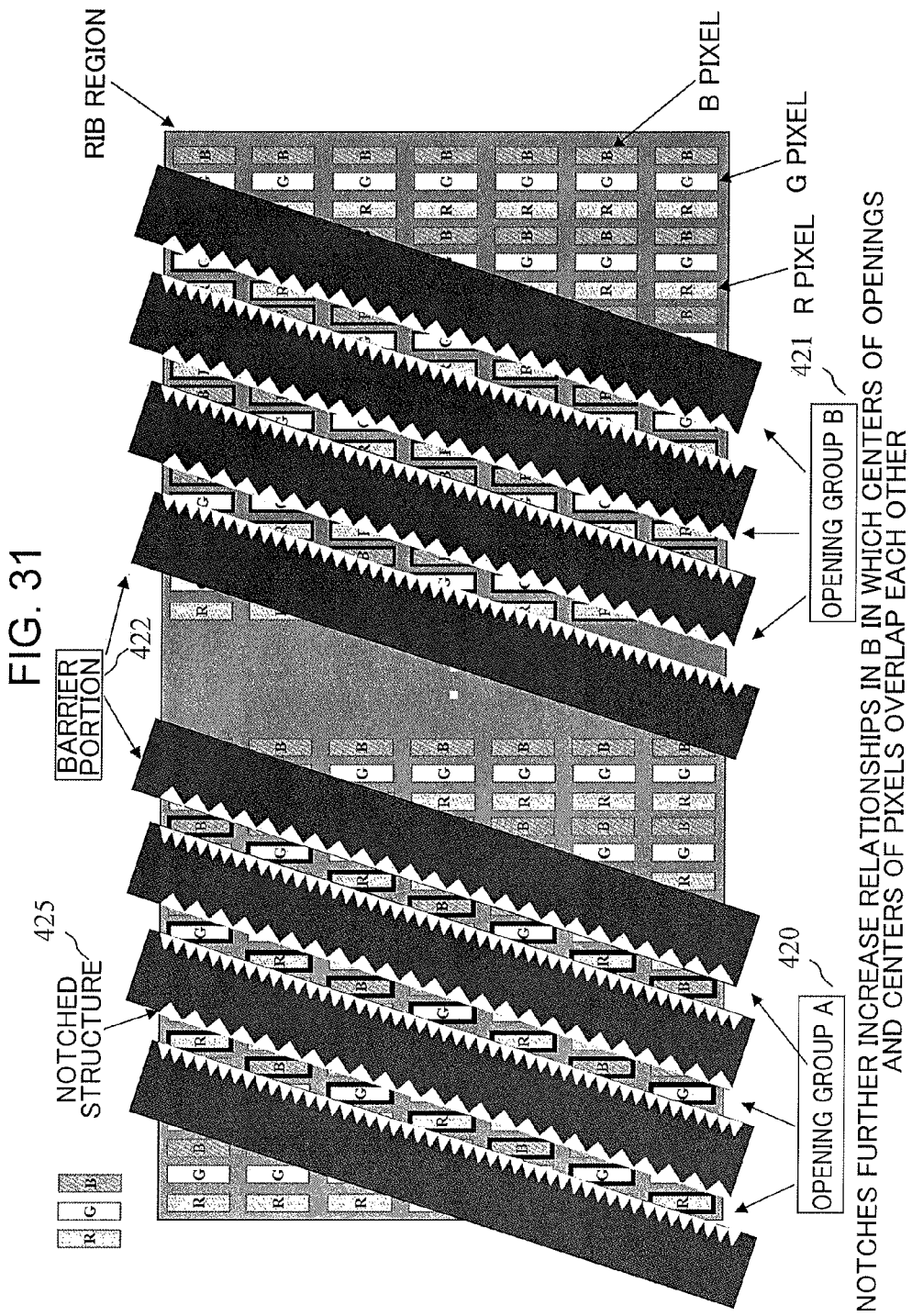
FIG. 31 schematically shows a positional relationship between openings and pixels in a barrier or a diffusion pattern of a third notched structure example (1 pixel is divided by 6.5 on the left and divided by 3.5 on the right) in the image display device as the sixth invention according to the present invention.

FIG. 31 shows a pattern in which the number of divisions nR of a right notched structure is set smaller than the number of divisions nL of a left notched structure (nR=3.5, nL=6.5). In this case, the average opening ratio Ave_rh in one pixel remains unchanged from FIG. 29 although a phase shift is created between the left and right notched structures. The visible proportion of the pixel (G pixel) behind the opening Bm[s] is not significantly differerent from that shown in FIG. 29, although a proportion of an opening Bm[s] of a single opening stripe Bm included in the opening group B increases and a visible proportion of an opening Bm[s+1] below the opening Bm[s] further decreases, like FIG. 29.

Figure 32:
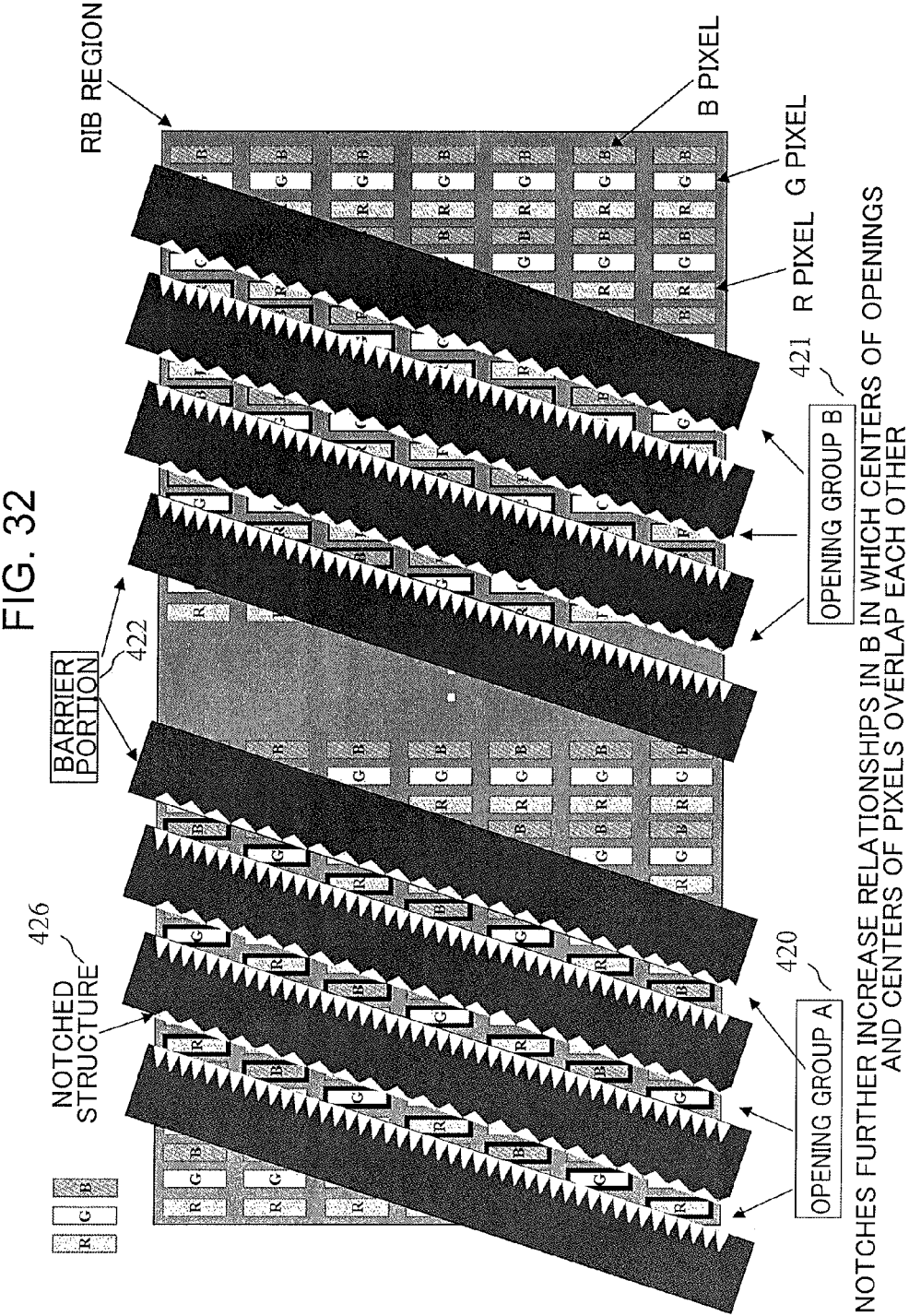
FIG. 32 schematically shows a positional relationship between openings and pixels in a barrier or a diffusion pattern of a fourth notched structure example (1 pixel is divided by 6.5 on the left and divided by 3.5 on the right, so that left and right notch widths are inconsistent) in the image display device as the sixth invention according to the present invention.

Left and right heights dw may be conceivably varied as shown in FIG. 32. If the left height is expressed as dwL=dw+Ddw and the right height is expressed as dwR=dw−Ddw, the average opening ratio Ave_rh in one pixel is the same as shown in FIG. 31. In this case, the visible proportion of the pixel (G pixel) behind the opening Bm[s] is not significantly different from that shown in FIG. 31 although a proportion of an opening Bm[s] of a single opening stripe Bm included in the opening group B increases and a visible proportion of an opening Bm[s+1] below the opening Bm[s] decreases. Therefore, brightness does not pose a problem as compared to FIG. 31. Since it is conceivable that the positional relationships between openings and pixels in group A and the positional relationships between openings and pixels in group B become even closer to each other, it is predicted a moiré pattern significantly decreases on the basis of the aforementioned study.

An example in which the height dwL of some of the first left notched structures when viewed in pixel units is set larger than other left notched structures with respect to the notched structures shown in FIGS. 31 and 32 is also possible. In this case, the height dwR of corresponding right notched structures becomes smaller than other right notched structures. Likewise, even in such a case, the visible proportion of the pixel (G pixel) behind the opening Bm[s] is not significantly different from that shown in FIG. 29 although a proportion of an opening Bm[s] of a single opening stripe Bm included in the opening group B increases and a visible proportion of an opening Bm[s+1] below the opening Bm[s] further decreases. Therefore, brightness does not pose a problem as compared to FIG. 29. Since it is conceivable that the positional relationships between openings and pixels in group A and the positional relationships between openings and pixels in group B become even closer to each other, it is predicted that a moiré pattern more significantly decreases on the basis of the aforementioned study.

With regard to dwL and dwR, and nL and nR shown in FIGS. 31 and 32, even if dwL and dwR are interchanged and nL and nR are interchanged, the same effects as described above may be obtained although the openings shift toward the right (B pixel becomes the background pixel that is notably visible in an opening Bm[s] of a single opening stripe Bm included in the opening group B).

Therefore, a slanted diffusion pattern having the notched structure described below is favorable.

The number of divisions n of the notched structure is set large. In other words, the cycle ds is set small. However, it is preferable that the number of divisions n is a value selected, like the first or the second embodiment. In consideration of the influence of manufacturing errors, a value and as a quotient of a sub-pixel size p in the vertical direction divided by the notch cycle ds is a value, which is apart from a vicinity of an integer. If possible, a notch cycle, which is close to an intermediate value of consecutive integer ratios nn1 and nn1+1 or nn1−1 and nn1, is more favorable since the influence of manufacturing errors may be almost totally eliminated.

Heights of left and right notched structures, namely, cycles thereof are varied in order to vary phases.

Heights of left and right notched structures are varied, namely, the height of the left notched structure is set to dwL=dw+Ddw whereas the height of the right notched structure is set to dwR=dw−Ddw so that the sum of the heights equals 2dw.

In order to maintain the average opening ratio Ave_rh at a predetermined opening ratio rhth, although the smaller the minimum opening width hmin, the greater the height dw of the notched structure, an increased acuteness of the notched structure makes it more susceptible to manufacturing errors. Therefore, it is preferable that a minimum opening width ratio rhmin is set to 0.6−0.7×hth≤rhmin<rhth.

Sub-pixel division (and metal auxiliary electrodes) may be considered in a similar manner although sub-pixel division (and metal auxiliary electrodes) is not taken into consideration in the drawings. The number of divisions n is dependent on pixel structure and is conceivably related to the number of divisions in one sub-pixel. Therefore, when a sub-pixel is divided by t, it is preferable that the number of divisions n is no less than t (the number of pixel regions)+2 (black matrix regions)+t−1 (auxiliary electrode regions) to the left or the right of an opening. This means that the number of divisions n (a small non-natural number) to be used is greater than the number of repetitions of effective pixel portions which emit light at a predetermined brightness and dark portions without light emission such as a black matrix or a metal electrode when viewed in the vertical direction.

Evaluation of a slanted diffusion pattern having a predetermined notched structure may be performed from the perspective of the possibility of moiré creation on the basis of the analysis method performed above although the creation of a pattern with less moiré is described above. In this case, for example, a distribution of positional relationships created in the opening group A may be compared with a distribution of positional relationships in the opening group B. A distribution of a region of visible pixels that result from positional relationships created in the opening group A may be compared with a distribution of a region of visible pixels that result from positional relationships in the opening group B. Or a distribution of brightness created by positional relationships created in the opening group A may be compared with a distribution of brightness created by positional relationships in the opening group B.

Alternatively, the notched structure may include trapezoids, elliptical arcs with varying curvature, or parallelograms although a notched structure including triangles is used, like the first embodiment. Instead of providing a notched structure in the horizontal direction as shown in FIG. 5, a notched structure may be added in a direction perpendicular to the central axis of a diffusion pattern.

The cycle dsL of a notched structure (a notch cycle of a left notched structure) and the cycle dsR of a notched structure (a notch cycle of a right notched structure) are determined from candidate values adjusted by a method like that of the first or third embodiment. In other words, this moiré reduction effect is dependent on a pixel structure of a sub-pixel in the vertical direction. Therefore, when a sub-pixel is divided by t, it is preferable that the cycle is no more than a size obtained by the number of divisions nn of t (the number of pixel regions)+2 (black matrix regions)+t−1 (auxiliary electrode regions) to the left or the right of an opening. However, as shown in the first or third embodiment, in consideration of the influence of manufacturing errors, it is preferable that a value and as a quotient of a sub-pixel size p in the vertical direction divided by the notch cycle ds is a value, which is apart from a vicinity of an integer. If possible, a notch cycle, which is close to an intermediate value of consecutive integer ratios nn1 and nn1+1 or nn1−1 and nn1, is more favorable since the influence of manufacturing errors may be almost totally eliminated.

With maintaining the pixel-size average opening ratio Ave_rh, a pattern satisfying crosstalk reduction may be obtained by suppressing the maximum opening width so as to stay in a predetermined size LWMax=sp×dmax relative to the sub-pixel size sp=p/3. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater.

The present embodiment may be applied to a diffusion pattern having a diagonal stepped structure in which rectangular shapes of sub-pixels are arranged in a diagonal direction although a diffusion pattern having a slanted structure is described as an example.

The present invention may be combined with the second embodiment (FIG. 12). In this case, the pattern example described in the present invention is applied to a barrier opening or reflecting/diffusing means. A configuration, in which the initial adjusting means 105 adjusts a parallax barrier, a diffusion pattern (second embodiment) or alike, is obtained. The notch adjusting means 109 is added to the separating adjusting circuit 1200 which controls a barrier opening or the diffusing means adjusting circuit 106 which controls the reflecting/diffusing means.

<Seventh Embodiment>

The seventh embodiment of the present invention is described with reference to FIGS. 1, 2, and 33 to 42. This embodiment takes into consideration the fact that a positional relationship among openings, pixel regions and a black matrix becomes imbalance in coexistence relationship among the openings, the pixel regions, and the black matrix for each barrier because of black portions and in-pixel electrodes, which results in a moiré pattern. With regard to the seventh image display device of the present invention, stereoscopic image display is provided. The stereoscopic image display may reduce moiré contrast without increasing crosstalk by adding a notched structure so as to restore omitted positional relationships in order to improve the imbalance of the coexistent positional relationship. The image display device is also equipped with a function, which determines and corrects a notch cycle so as to create few resultant adverse effects from the notches themselves, like the first embodiment. FIGS. 1 and 14 or FIGS. 1 and 16 which show configurations of the third embodiment may be combined with contents shown in FIGS. 33 to 42.

Figure 33:
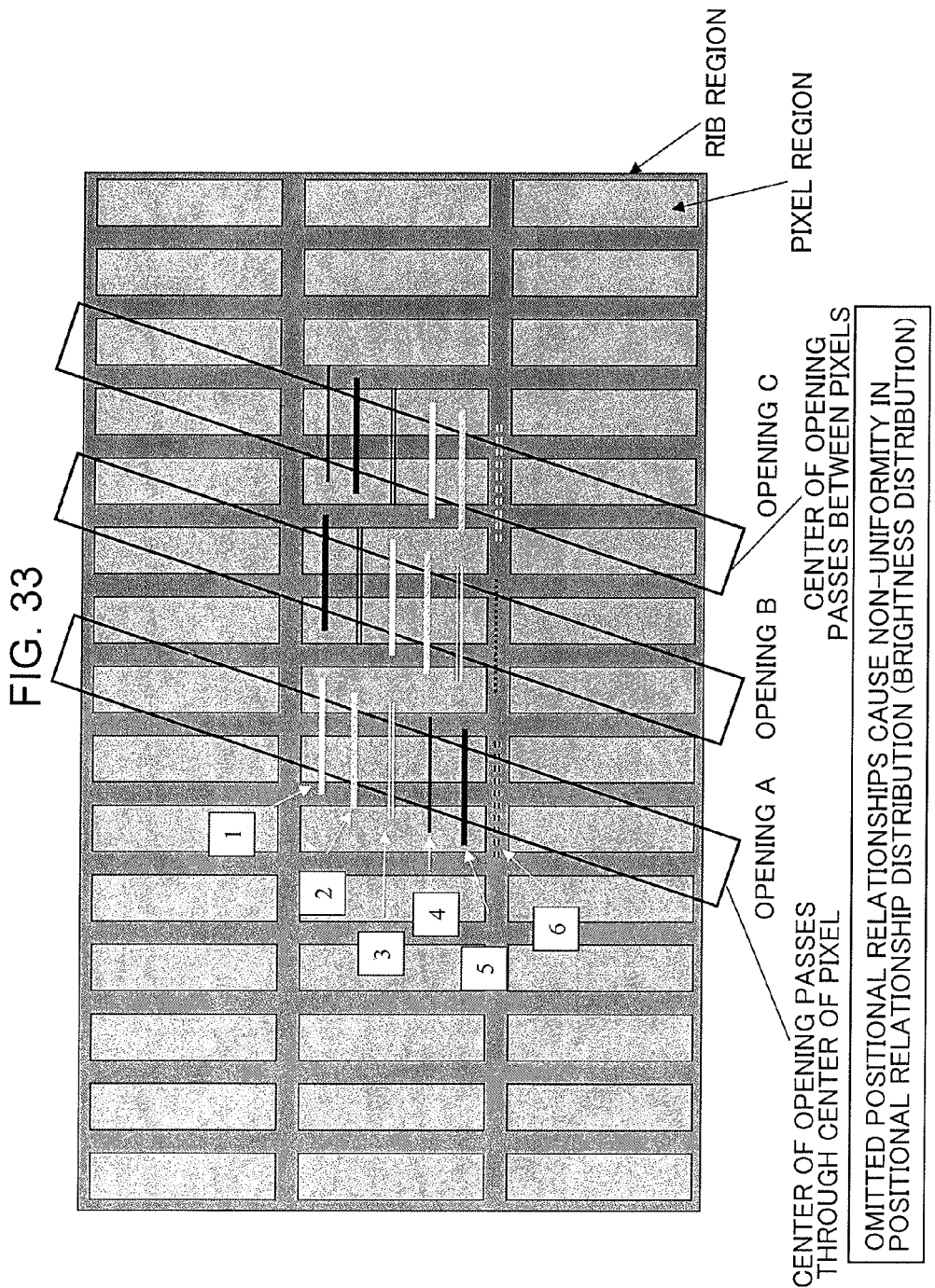
FIG. 33 schematically shows a relationship between a black matrix and openings in an image display device as the seventh invention according to the present invention.
Figure 34:
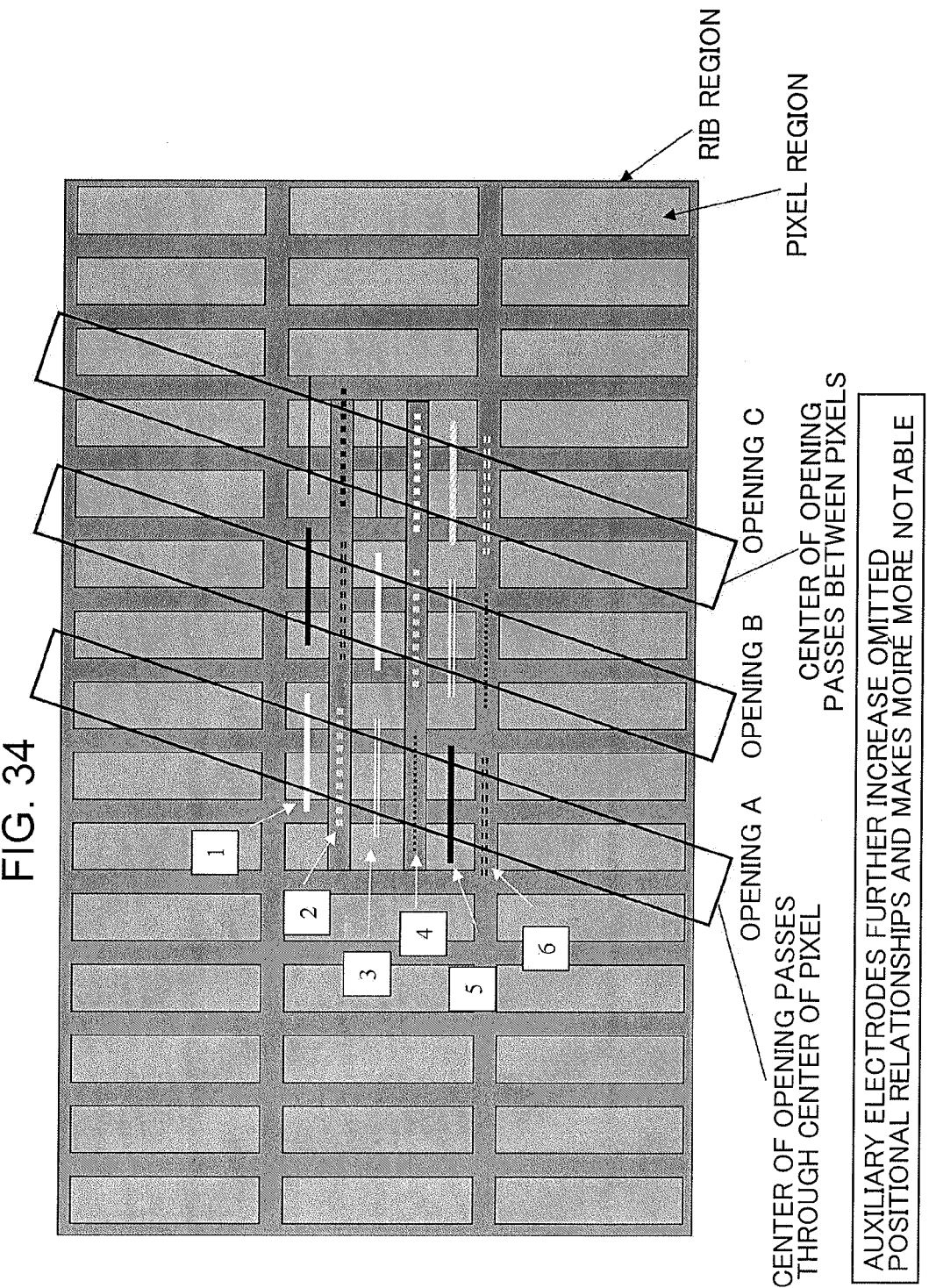
FIG. 34 schematically shows a relationship among a black matrix, horizontal auxiliary electrodes and openings in the image display device as the seventh invention according to the present invention.

The configuration is similar to the first or third embodiment as shown in FIG. 1. Features of this invention are that a slanted diffusion pattern having the notched structure according to the first or third embodiment is created on the basis of concepts depicted in FIGS. 33 and 34. FIGS. 33 and 34 show a reason for the creation of a moiré pattern when a diffusion pattern having an inclination of 3:1 (α=18.435 degrees) is observed from a predetermined position. FIG. 34 shows a reason of the higher likelihood of moiré being created when a metal auxiliary electrode is present upon performing the pixel division shown in FIG. 33. FIGS. 35 to 42 show examples of patterns in which an uneven structure (notched structure) is added to the diffusion pattern of α=18.435 degrees shown in FIG. 34 so as to reduce the moiré pattern on the basis of the reasons depicted in FIGS. 33 and 34. As shown in FIGS. 35 to 42, in the notched structures, heights dw or cycle widths ds of the notched structures do not have to coincide with each other to the left and right of a central opening unlike the first and third embodiments. However, each notched structure is defined by four parameters, namely, an inclination angle α of the central axis of a diffusion pattern with respect to the vertical direction, an inclination angle β of the notched structure (triangular) portion with respect to a horizontal axis, a cycle width ds of the notched structure, and a height dw of the notched structure. ds may be expressed by means of the number of divisions n of the notched structure in one pixel width p as ds=p/n. However, as described in the first or third embodiment, since the notch cycle ds is adjusted so as to suppress adverse effects caused by the interference between the notches themselves and the pixels, n generally does not assume an integer.

The width of the notched structure may be defined along an inclination angle θ of the diffusion pattern although the cycle width ds of the notched structure represents a width in the vertical direction. In this case, the cycle width of the notched structure is a quotient of ds divided by cos θ.

The likelihood of creation of a moiré pattern by a diffusion pattern having an ordinary slanted structure is described with reference to FIGS. 33 and 34. In the drawings, several openings of a striped diffusion pattern having a predetermined opening width (opening ratio rhth=1.4) are shown in front of RGB pixels. Although a case of parallax number N=4 is shown in this example, the same is applicable to other parallax numbers. A case of inclination angle α=18.435 degrees may be schematically represented as shown in FIG. 33. An opening A represents a diffusion pattern with a striped structure in which the center of the opening passes through the center of a pixel. An opening C represents a diffusion pattern with a striped structure in which the center of the opening passes between pixels. An opening B represents a diffusion pattern with a striped structure, which is positioned between the openings A and C. In FIG. 33, each of horizontal lines is numbered (k=1, 2, 3, 4, 5, 6) from top to bottom for corresponding openings. Each of the horizontal lines represents positional relationships among openings, pixels and black matrix (also referred to as a rib in the case of a PDP) at a horizontal position at corresponding openings. FIG. 33 shows that the following combinations have the same positional relationships among openings, pixels, and black matrix. In this case, it is assumed that a positional relationship Ak represents a horizontal line indicating a positional relationship of number k with respect to the opening A. It should be noted that horizontal lines representing the same positional relationship in FIGS. 33 and 34 are depicted by the same line type. Horizontal lines representing a positional relationship, which is omitted due to a rib (or a black matrix), a horizontal auxiliary electrode or alike, are depicted by dotted lines.

Positional relationship A1 and positional relationship B3, and positional relationship C4

Positional relationship A2 and positional relationship B4, and positional relationship C5

Positional relationship A3 and positional relationship B5, and positional relationship C6

Positional relationship A4 and positional relationship B6, and positional relationship C1

Positional relationship A5 and positional relationship B1, and positional relationship C2

Positional relationship A6 and positional relationship B2, and positional relationship C3

Pixels visible in the same positional relationship among the above are conceivably the same. Due to the assembly/coexistence of the many positional relationships above within a single stripe, moiré is conceivably reduced due to coexistence/averaging of pixels visible at the openings A, B and C. In contrast, the positional relationship A6, the positional relationship B6, and the positional relationship C6 are positional relationships in a black matrix region to be omitted. Since such omitted positional relationships are different as shown in FIG. 33, distributions of positional relationships included in the stripe A, the stripe B, and the stripe C do not coincide with one another. Accordingly, a variation is created in the state of coexistence at the respective openings. Therefore, the variation is manifested as a bright-dark pattern (moiré). Since the metal auxiliary electrodes cause omitted positional relationships in the positional relationship A2, the positional relationship A4, the positional relationship A6, the positional relationship B2, the positional relationship B4, the positional relationship B6, the positional relationship C2, the positional relationship C4, and the positional relationship C6, moiré is likely to become more notable although FIG. 34 represents a case where metal auxiliary electrodes exist upon performing the pixel division shown in FIG. 33.

By adding a notched structure to a slanted-structure diffusion pattern with the minimum opening width hmin, the omitted positional relationships appear at different locations. Accordingly, by having distributions of positional relationships included in the slanted diffusion pattern A, the slanted diffusion pattern B, and the slanted diffusion pattern C coincide with each other and having states of coexistence at each of the openings coincide with each other as much as possible, moiré may be conceivably reduced. The present embodiment has a slanted-structure diffusion pattern to which a notched structure evaluated and developed on the basis of the concept described above is added. The outline is described with reference to FIGS. 35 to 42.

Figure 35:
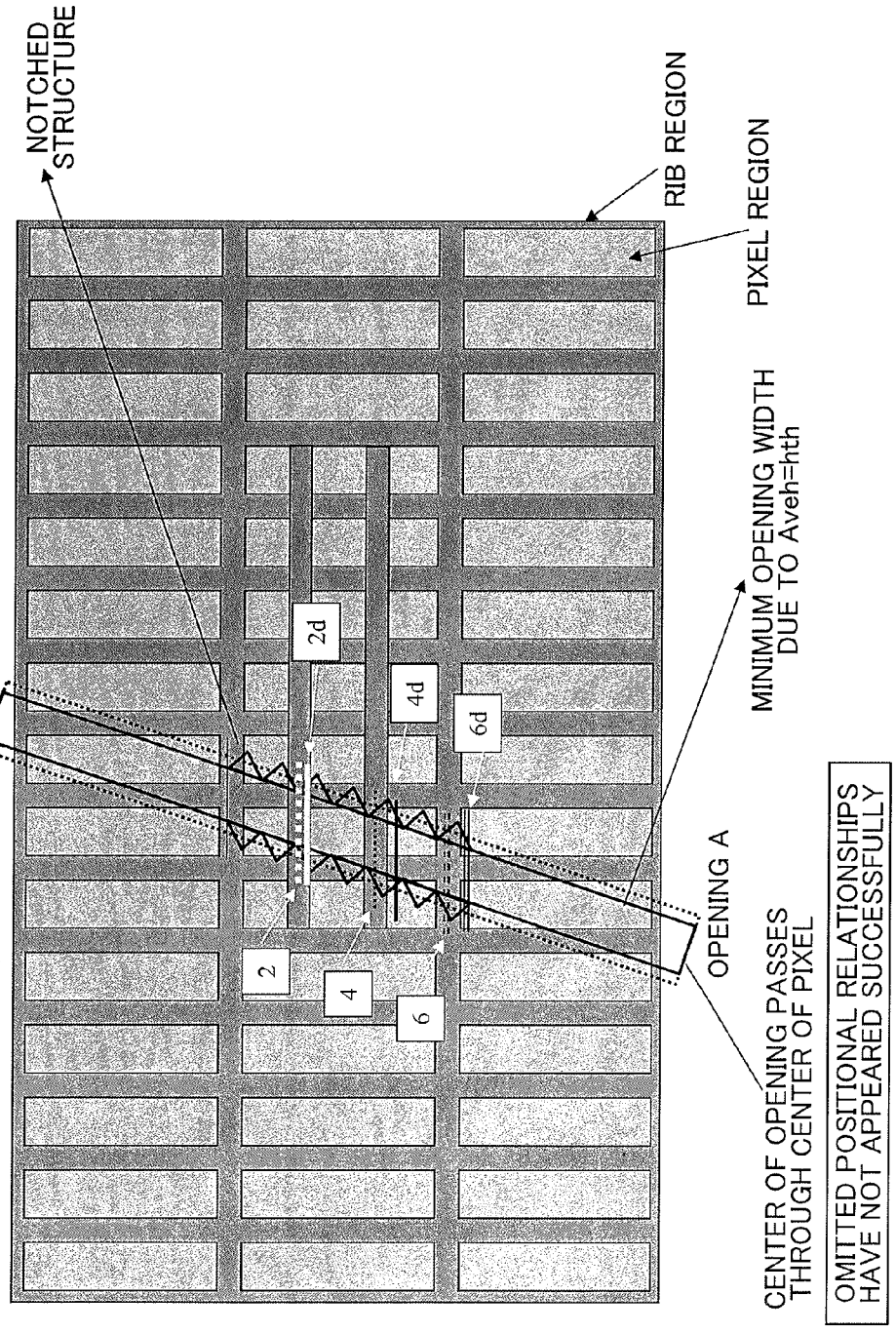
FIG. 35 schematically shows the first example of a barrier or a diffusion pattern having a notched structure in which left and right phases coincide with each other in the image display device as the seventh invention according to the present invention.
Figure 36:
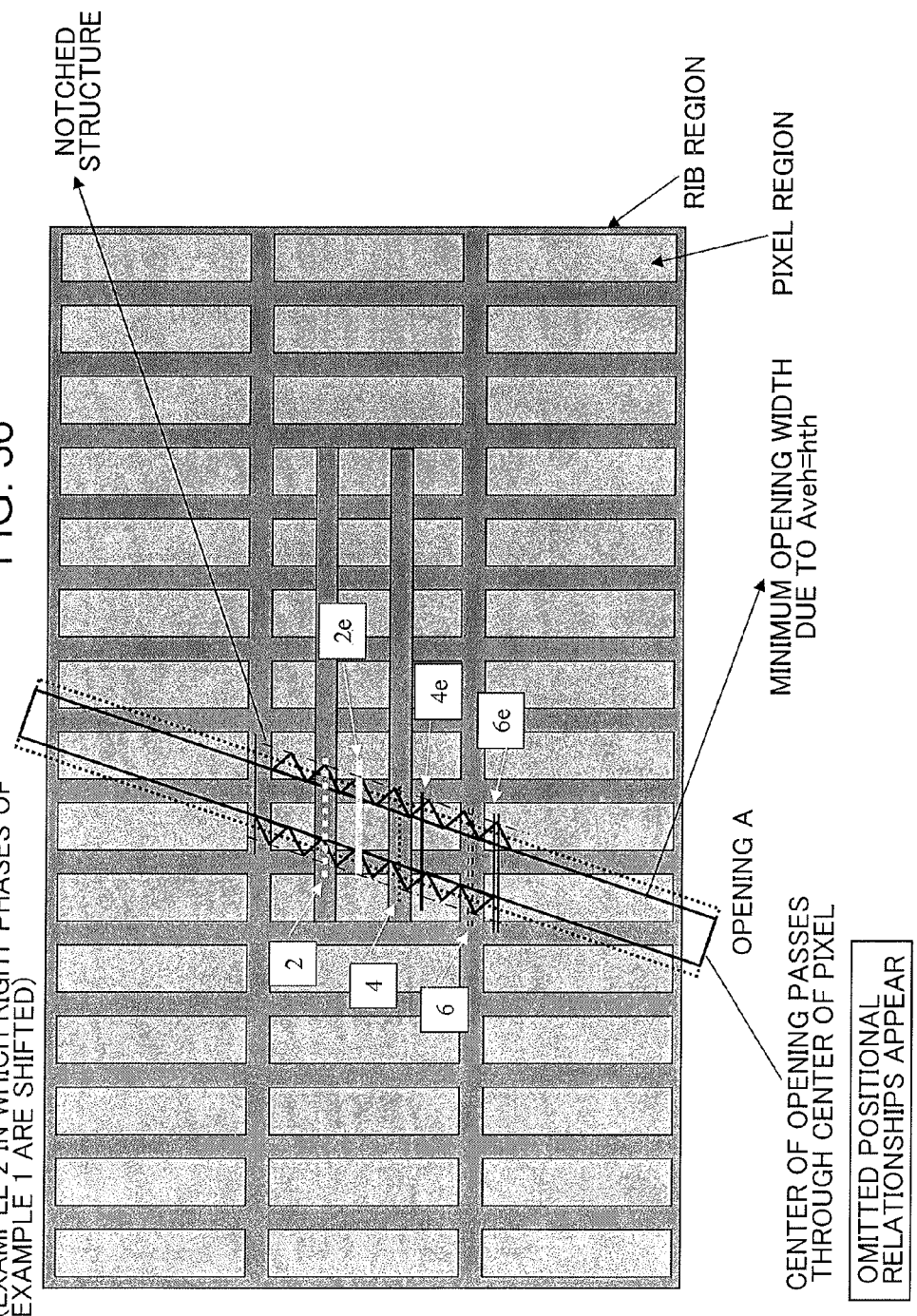
FIG. 36 schematically shows the second example of a barrier or a diffusion pattern having a notched structure in which left and right phases do not coincide with each other in the image display device as the seventh invention according to the present invention.

When phases of the left and right notched structures coincide with each other (FIG. 35: example 1), the number of such cases are conceivably insufficient although some positional relationships omitted due to the opening A appear as the cases of A2$d$, A4$d$ and A$d$6. In this case, A2$d$ represents a positional relationship, which is conceivably created by the notched structure for the positional relationship A2 omitted due to the opening A. In contrast, by shifting phases as shown in FIG. 36 (notched structure height dsxlen (0<len<1.0): example 2), the positional relationships A2, A4 and A6 appear as positional relationships A2$e$, A4$e$ and A6$e$. In this case, it is assumed that an uneven portion of a notched structure has neither horizontal lines nor vertical lines.

For the cycle ds of a notched structure, a value selected and corrected by means of a method similar to that of the first or third embodiment is used. This moiré reduction effect is dependent on a pixel structure of a sub-pixel in the vertical direction. Therefore, when a sub-pixel is divided by t, it is preferable that the cycle is no greater than a size obtained by the number of divisions nn of t (the number of pixel regions)+2 (black matrix regions)+t−1 (auxiliary electrode regions) to the left or the right of an opening. However, as shown in the first or third embodiment, in consideration of influence of manufacturing errors, it is preferable that a value nnd as a quotient of a sub-pixel size p in the vertical direction divided by the notch cycle ds is a value, which is apart from a vicinity of an integer. If possible, it is more preferable that a notch cycle is close to an intermediate value of consecutive integer ratios nn1 and nn1+1 or nn1−1 and nn1 since the influence of manufacturing errors may be almost totally eliminated. In FIG. 35, a pixel is divided by 3. In consideration of the influence of manufacturing errors, a cycle greater than a value nn=6, which is 2 times 3, is used. The cycle is obtained on the basis of the number of divisions n=6.5 for which the value nnd as a quotient of a sub-pixel size p in the vertical direction divided by the notch cycle ds is apart from a vicinity of an integer. Even when using this value, in a symmetrical case where phases of left and right notched structures coincide with each other, the omitted positional relationships may not always successfully appear.

Figure 37:
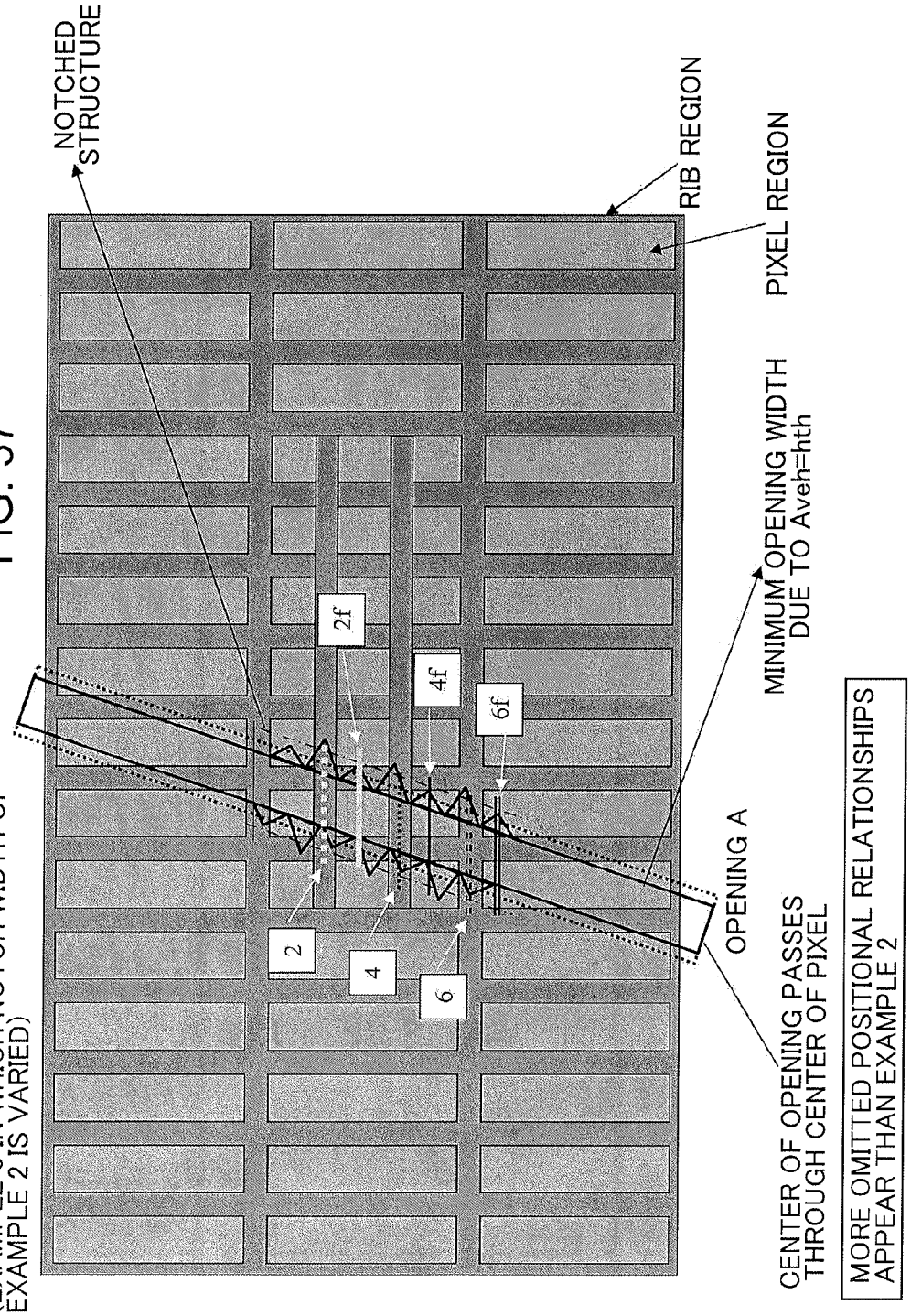
FIG. 37 schematically shows the third example representing a variation in width of the second example of a barrier or a diffusion pattern having a notched structure, in which left and right phases do not coincide with each other in the image display device as the seventh invention according to the present invention.

As shown in FIG. 37, by combining diffusion patterns with different maximum opening widths, omitted positional relationships are more likely to appear (A2, A4 and A6 appear as A2$f$, A4$f$ and A6$f$: example 3).

Figure 38:
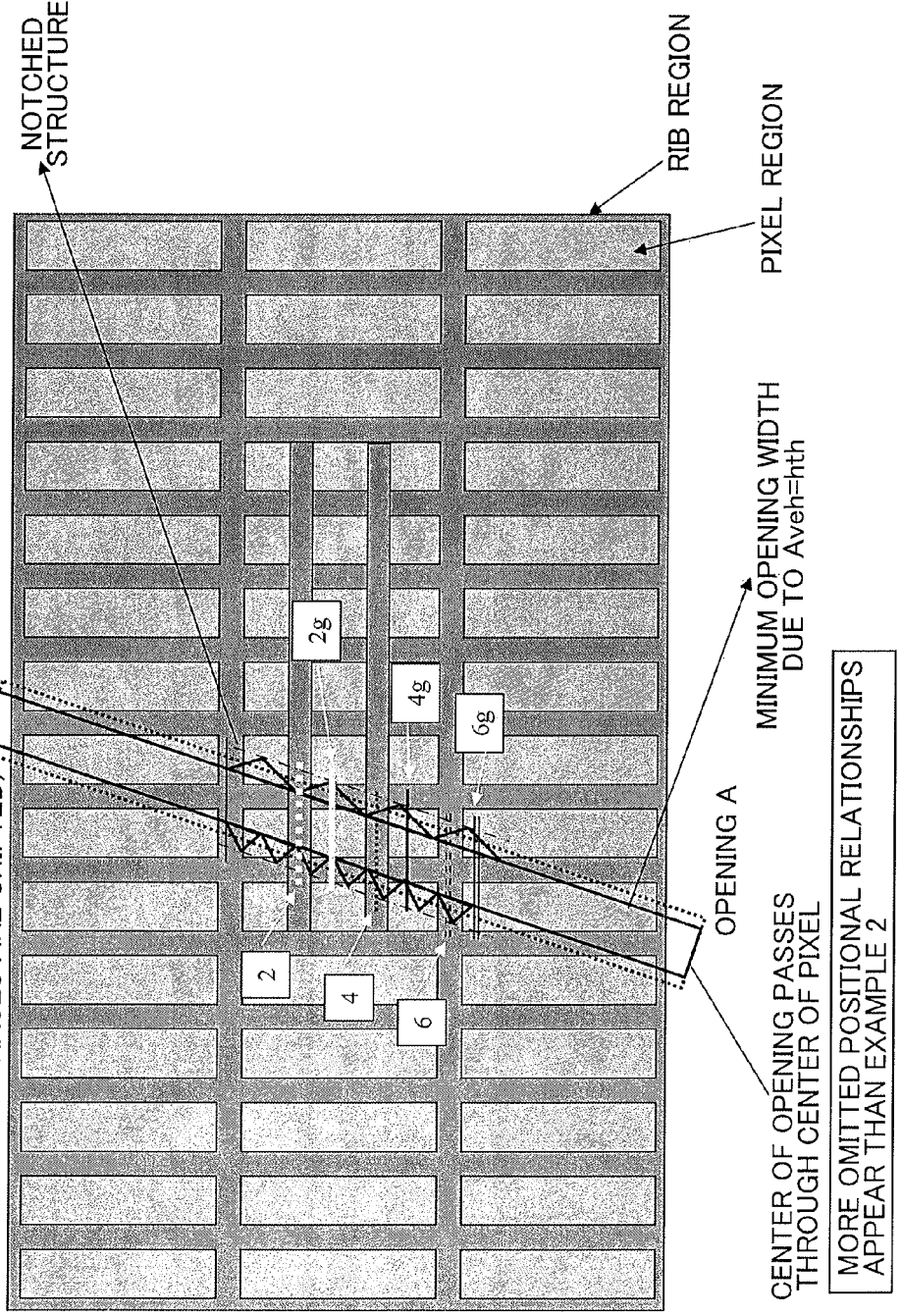
FIG. 38 schematically shows the fourth example representing a reduction in a number of right divisions to shift right phases from left phases in a barrier or a diffusion pattern having a notched structure of the image display device as the seventh invention according to the present invention.

A phase shift is also created by varying left and right notch cycles. FIG. 38 shows an example 4 including the number of divisions nL=6.5 (dsL=3p/nL) for determining a left notch cycle dsL and the number of divisions nR=3.5 (dsR=3p/nR) for determining a right notch cycle dsR. The effect of creating a left-right phase shift becomes more significant as a relationship between the left notch cycle dsL and the right notch cycle dsR deviates from an integral multiple.

Figure 39:
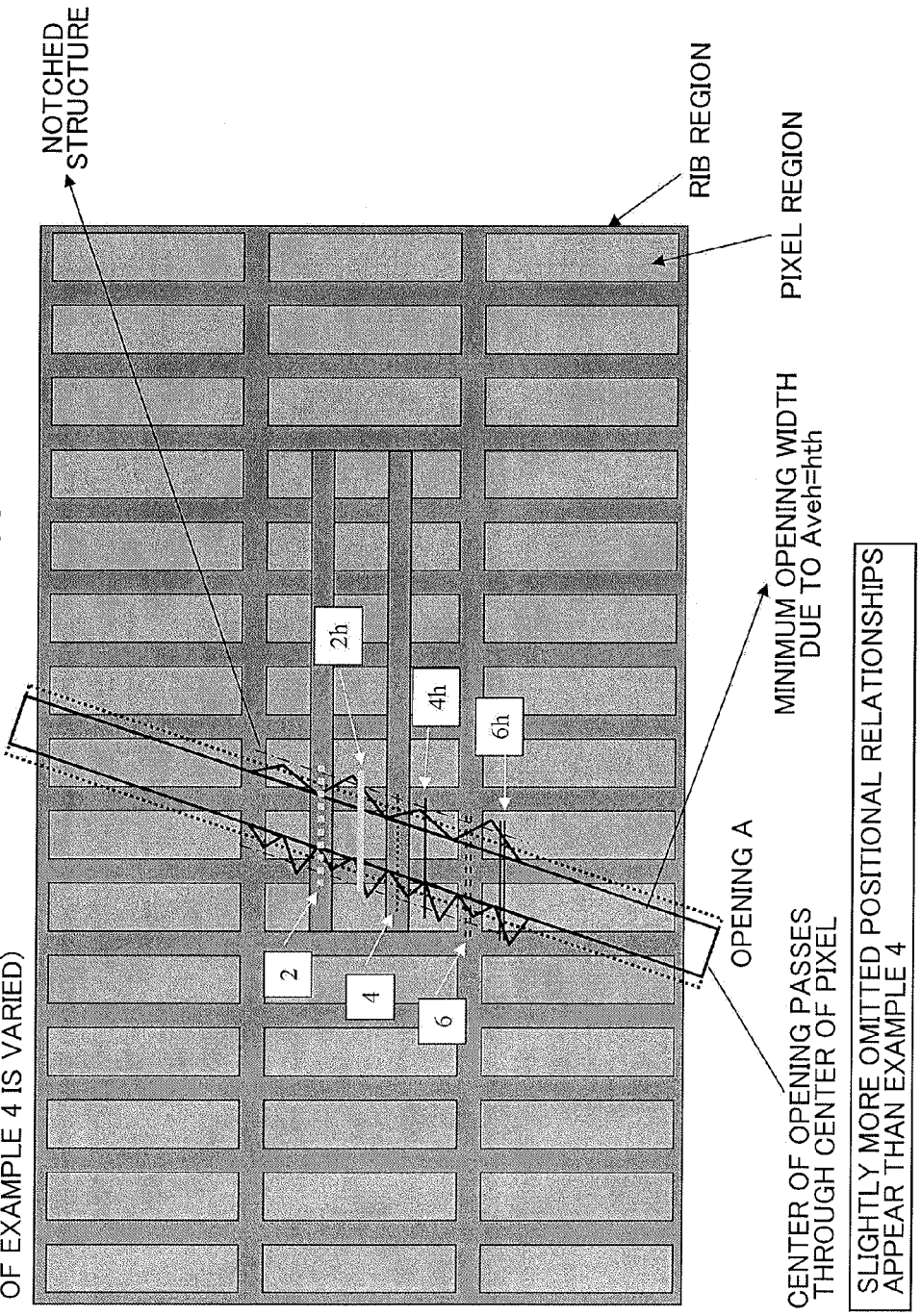
FIG. 39 schematically shows the fifth example representing a variation in notch width of the fourth example representing a reduction in a number of right divisions to shift right phases from left phases in a barrier or a diffusion pattern having a notched structure of the image display device as the seventh invention according to the present invention.

By further combining diffusion patterns with different maximum opening widths with FIG. 38 showing a configuration in which left and right notch cycles are varied, omitted positional relationships are more likely to appear. FIG. 39 shows an example 5. From a different perspective, with a notched structure in which left and right phases differ from each other, the same positional relationship appears a few times in the region of one pixel. Accordingly, different positional relationships coexist in a region smaller than one pixel and averaging is promoted. Therefore, an averaged state is more likely to be maintained even if there are omitted regions.

Figure 40:
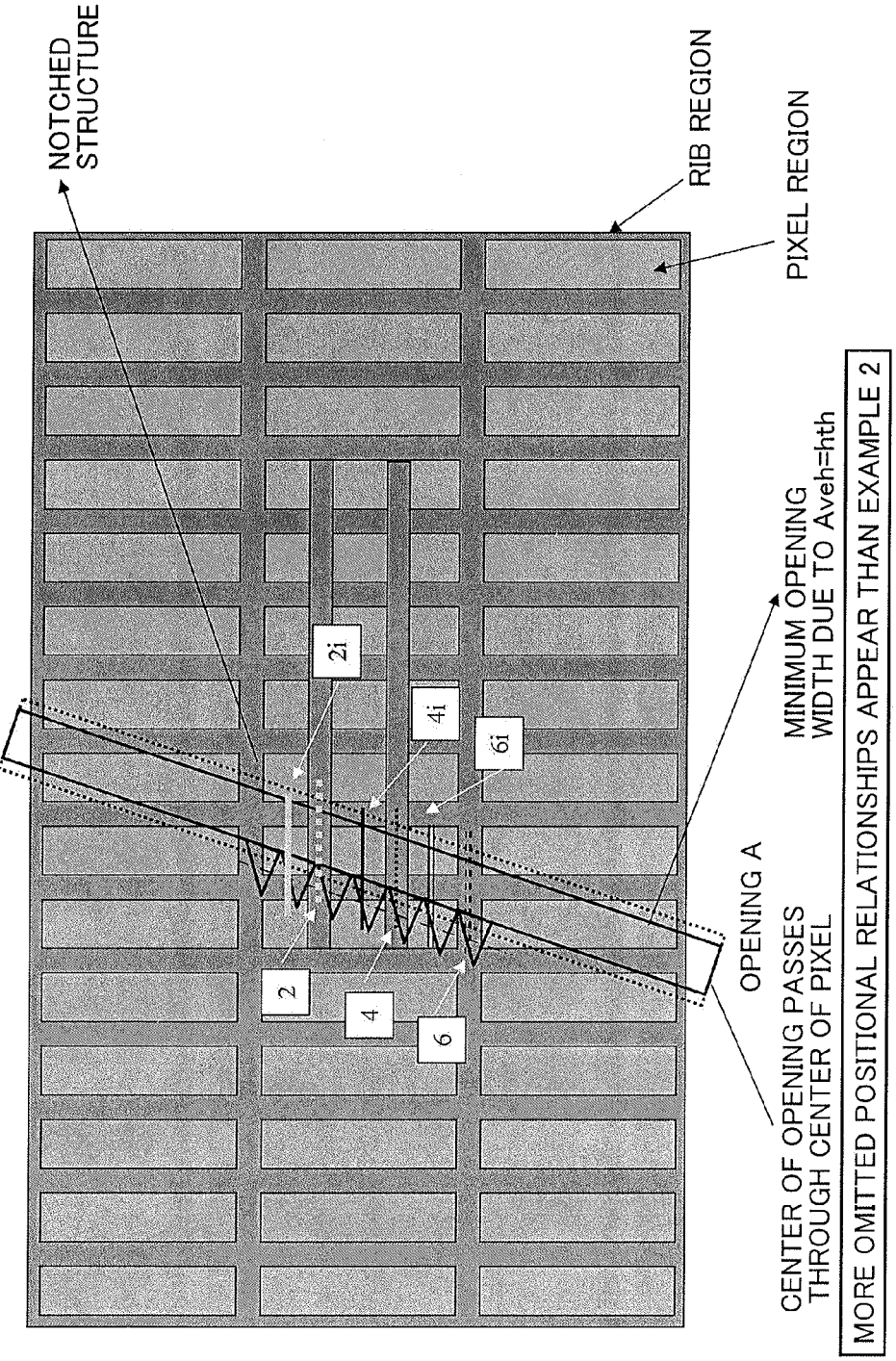
FIG. 40 schematically shows the sixth example in which a notched structure is added only to the left in a barrier or a diffusion pattern having the notched structure of the image display device as the seventh invention according to the present invention.

In addition, both edges of an opening do not have to have notched structures. At least one of the edges may be a notched structure. FIG. 40 shows an example 6. FIG. 40 shows a case where the number of divisions nL for determining a left notch cycle dsL is nL=6.5. A far greater number of omitted positional relationships appears, in comparison to the case of example 2. In example 6, the notch width dw takes a double value so as to equal examples 1 to 5.

Figure 41:
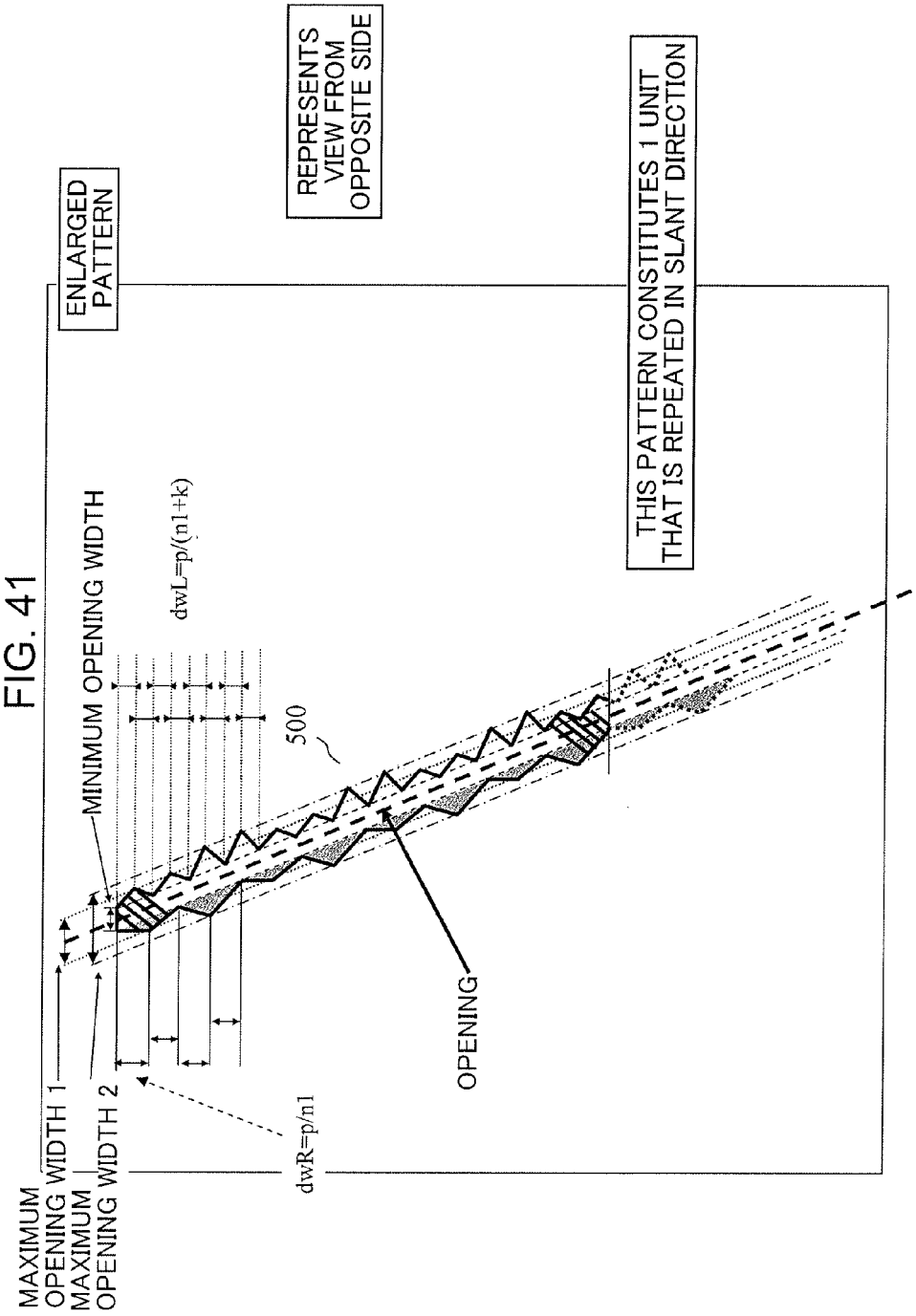
FIG. 41 shows the first example of a barrier or a diffusion pattern having a notched structure of the image display device as the seventh invention according to the present invention.
Figure 42:
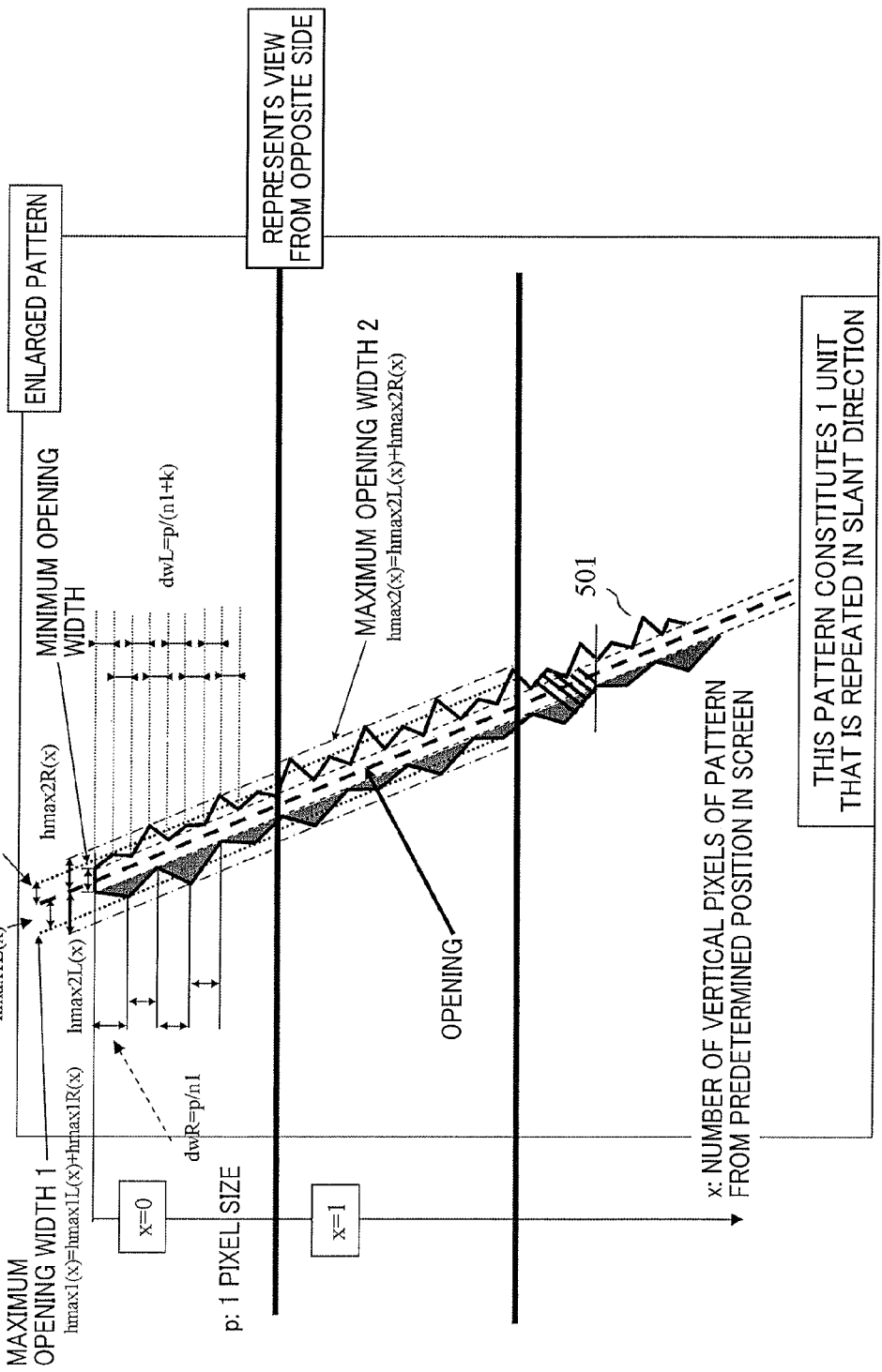
FIG. 42 shows the second example of a barrier or a diffusion pattern having a notched structure of the image display device as the seventh invention according to the present invention.

FIG. 41 represents an example of a slanted diffusion pattern having a notched structure actually designed on the basis of this concept. Since the drawings represent a perspective from an opposite side to an observer, the slant direction is left and right reversed if the previous notation is used although a slant direction shown in FIGS. 41 and 42 is opposite to the above discussion. FIG. 41 represents a case where a ratio (minimum opening ratio) rhmin of minimum opening width to sub-pixel pitch is set to rhmin=0.6. The number of divisions nR of the right notched structure for one vertical pixel pitch is set to nR=6.5. The number of divisions nL of the left notched structure for one vertical pixel pitch is set to nL=11.5. On the basis of a notched structure height dw at a notch inclination angle β=β0 degrees, a height dw1 of a large notch 1 is set to dw1=dwx(1+krate) and a height dw2 of a small notch 2 is set to dw2=dwx(1−krate). dw denotes a value of a height obtained from a notched structure (cycle 6.5) in which left and right sides have the same width and height like the above description (Expression 1). When dw is varied so that dw1+dw2=dw×2, dw may be determined so that an average opening ratio Ave_rh coincides with an average opening ratio in one pixel pitch when the same notched structure is added to the left and right sides. A notched structure in which maximum opening widths hmax1 and hmax2 are varied according to a pixel number x in the vertical direction as shown in FIG. 38 may be adopted. For example, starting from hmax1L[0]>hmax1R[0] and hmax2L[0]>hmax2R[0], as x increases, hmax1L[x]<hmax1R[x] and hmax2L[x]<hmax2R[x] are satisfied, where hmax1L[x]+hmax1R[x]=dwx2 and hmax2L[x]+hmax2R[x]=dwx2. Accordingly, an effect of approaching the inclination angle α=23 degrees with minimal moiré may be produced, albeit in a subtle manner.

With maintaining the pixel-size average opening ratio Ave_rh, a pattern satisfying crosstalk reduction may be obtained by suppressing the maximum opening width so as to stay in a predetermined size LWMax=spxdmax relative to the sub-pixel size sp=p/3. In this case, since a minimum opening width of around sub-pixel size ×0.5 or smaller is susceptible to adverse effects due to abrupt opening width fluctuation and the influence of fluctuations in viewing positions (horizontal/vertical), it is preferable that the minimum opening width is around sub-pixel size ×0.7 or greater.

Evaluation of a slanted-structure diffusion pattern having a predetermined notched structure may be performed from the perspective of the possibility of moiré creation on the basis of the aforementioned analysis method although the creation of a pattern with less moiré is described above. In this case, for example, a distribution of positional relationships created in A may be compared with a distribution of positional relationships in B or C. A distribution of a region of visible pixels, which result from positional relationships created in A, may be compared with a distribution of a region of visible pixels, which result from positional relationships in B or C. Or a distribution of brightness created by positional relationships created in A may be compared with a distribution of brightness created by positional relationships in B or C.

Alternatively, the notched structure may include trapezoids, elliptical arcs with varying curvature or parallelograms although a notched structure including triangles is used, like the first embodiment. Instead of providing a notched structure in the horizontal direction as shown in FIG. 2, a notched structure may be added in a direction perpendicular to the central axis of the diffusion pattern.

The cycle dsL of a notched structure (a left notch cycle) and the cycle dsR of a notched structure (a right notch cycle) are determined from candidate values adjusted by a method similar to that of the first or second embodiment. In other words, this moiré reduction effect is dependent on a pixel structure of a sub-pixel in the vertical direction. Therefore, when a sub-pixel is divided by t, it is preferable that the cycle is no greater than a size obtained by the number of divisions nn of t (the number of pixel regions)+2 (black matrix regions)+t−1 (auxiliary electrode regions) to the left or the right of an opening. However, as shown in the first or second embodiment, in consideration of the influence of manufacturing errors, it is preferable that a value and as a quotient of a sub-pixel size p in the vertical direction divided by the notch cycle ds is a value, which is apart from a vicinity of an integer. If possible, it is preferable that a notch cycle is close to an intermediate value of consecutive integer ratios nn 1 and nn1+1 or nn1−1 and nn1 since the influence of manufacturing errors may be almost totally eliminated.

The present embodiment may be applied to a diffusion pattern having a diagonal stepped structure in which rectangular shapes of sub-pixels are arranged in a diagonal direction although a diffusion pattern having a slanted structure is described as an example.

The present invention may be combined with the second embodiment (FIG. 12). In this case, the pattern example described in the present invention is applied to a barrier opening or reflecting/diffusing means. A configuration in which the initial adjusting means 105 adjusts a parallax barrier, a diffusion pattern (second embodiment), or alike is obtained. The notch adjusting means 109 is added to the separating adjusting circuit 1200 which controls a barrier opening or the diffusing means adjusting circuit 106 which controls the reflecting/diffusing means.

<Eighth Embodiment>

Stereoscopic image display is described on the basis of a configuration, which is a combination of any one of FIGS. 1 and 2, FIGS. 1 and 14, and FIGS. 1 and 16, and with reference to the schematic drawings of FIGS. 43 to 47, as the eighth embodiment of the present invention. Stereoscopic image display may reduce moiré contrast without increasing crosstalk by providing and repeating a unit structure along a diffusion pattern. The unit structure includes a group of pixels, for which phases of left and right notched structures coincide with each other, and groups of pixels, for which pattern phases do not coincide with each other. The image display device is also equipped with a function, which determines and corrects a notch cycle so as to create few resultant adverse effects from the notches themselves, like the first or third embodiment. Features of this invention is that a slanted diffusion pattern having the notched structure according to the first to third embodiment is created on the basis of concepts shown in FIGS. 43 and 44.

As described above, when observing a barrier pattern of α=18.435 degrees from a predetermined position through each of the openings as shown in FIG. 27, it is speculated that an assembly of similar positional relationships between each of the openings and the RGB sub-pixel regions behind the respective openings is likely to result in non-uniform brightness among each of the openings (Ak and Bk), and increases the likelihood of moiré pattern creation. Likewise, when observing a barrier pattern with an inclination of α=23 degrees from a predetermined position in FIG. 28, it is speculated that a dispersion instead of an assembly of similar positional relationships between each of the openings and the RGB sub-pixel regions behind each of the openings reduces the likelihood of non-uniform brightness among each of the openings (Ak and Bk), and reduces the likelihood of moiré pattern creation.

Figure 43:
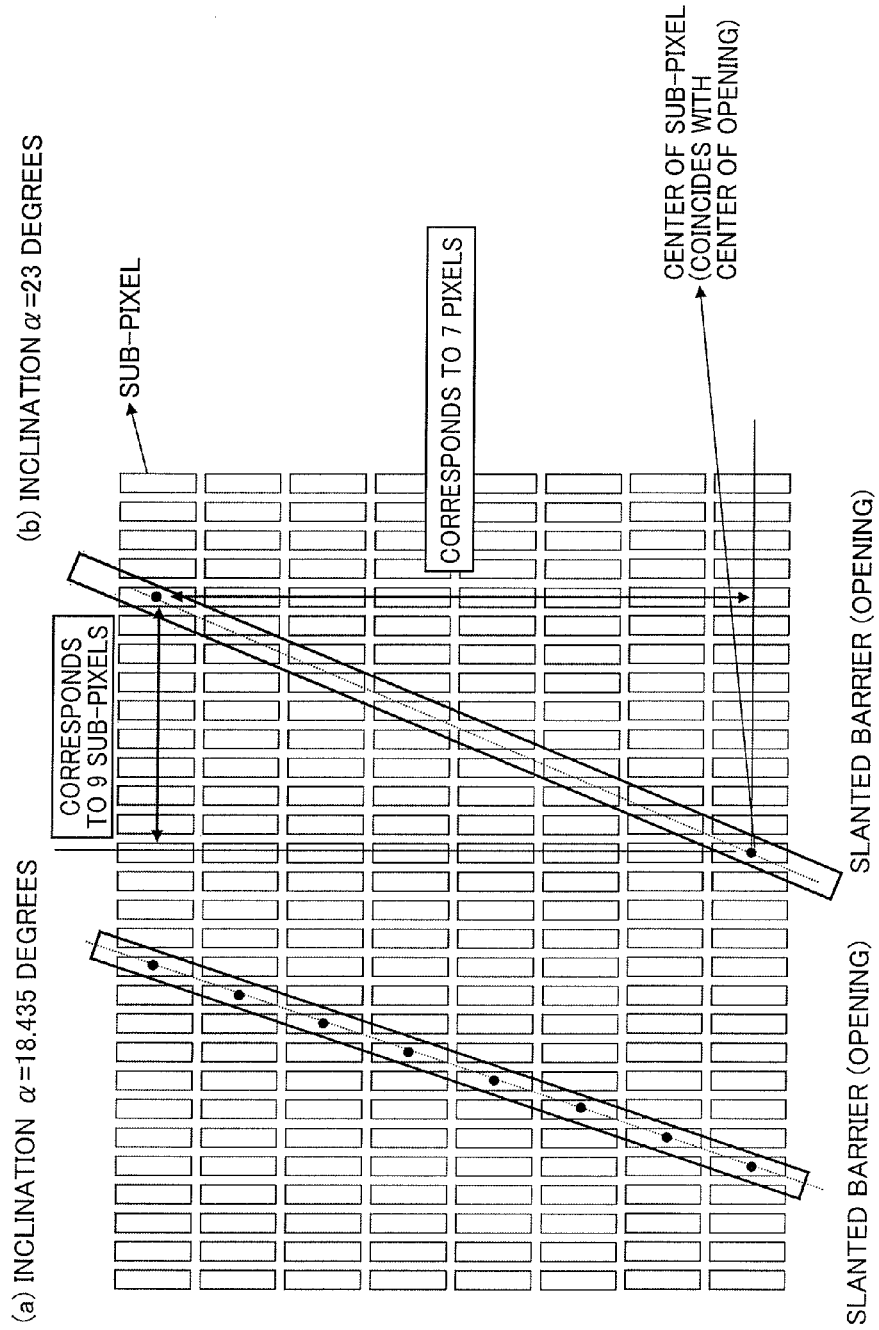
FIG. 43 shows a relationship between openings and the centers of pixels in a slanted barrier or a diffusion pattern inclined at an angle of 18.435 degrees and in a slanted barrier or a diffusion pattern inclined at an angle of 23 degrees in an image display device as the eighth invention according to the present invention.

FIG. 43(*a*) shows an extracted single slanted pattern with an inclination of α=18.435 degrees which represents a consideration given to FIG. 27 according to the sixth embodiment as follows. In the case of this inclination (the case of a barrier belonging to the opening group A in FIG. 27), when viewed from a single slanted pattern, the center of a pixel is similarly visible through an opening Am[s] and through another opening Am[t](s≠t). Therefore, the same pixel arrangement is visible through the opening Am[s] and through the other opening Am[t](s≠t). This means that a diffusion pattern at a position from which the center of a pixel is visible along a single slanted pattern has a regularity at this angle in that the center of a pixel and the center of a pattern always coincide with each other. Likewise, with regard to the opening group B in FIG. 27, a state conceivably occurs if a large number of positional relationships with regularity in that the center of an opening and the center of a black matrix region coincide with each other are created.

On the other hand, in the case of an inclination α of 23 degrees, the analysis shown in FIG. 28 according to the sixth embodiment may be considered as shown in FIG. 43(b). FIG. 43(b) shows an extracted single slanted pattern with an inclination of α=23 degrees. When considering a single slanted pattern belonging to the opening group A in FIG. 28, openings are repeated so that an opening Am[s], though which the center of a pixel is visible, and another opening Am[u](s≠u), through which the center of a pixel is similarly visible, satisfy a relationship expressed as u=s+sunit, where sunit=11 (7 pixels in the vertical direction, 9 sub-pixels in the horizontal direction). This is also applicable to other inclination angles α. sunit is dependent on the inclination angle α. Examples of sunit include sunit=1 (1 pixel in the vertical direction, 1 sub-pixel in the horizontal direction) when α=18.435 degrees and sunit=2 (2 pixels in the vertical direction, 3 sub-pixels in the horizontal direction) when α=26.57 degrees.

Figure 44:
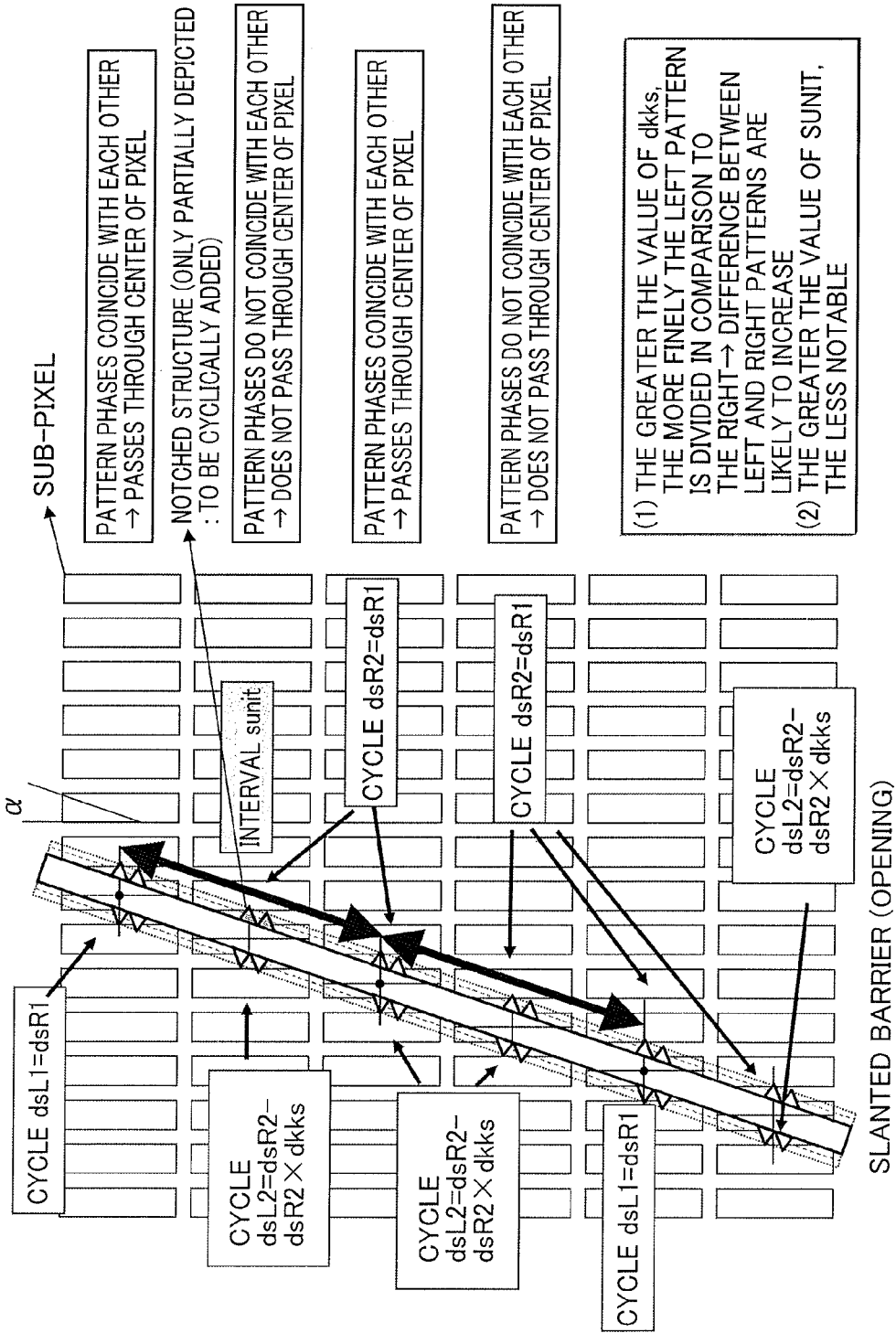
FIG. 44 schematically shows addition of a notched structure to reduce moiré in the image display device as the eighth invention according to the present invention.

It was thought that a situation similar to that shown in the right diagram in FIG. 43 could be created with a configuration shown in FIG. 44 which includes diffusion patterns (of which height corresponds to a pixel) in which a cycle dsL1 of a left notched structure and a cycle dsR1 of a right notched structure coincide with each other. Diffusion patterns (of which height corresponds to a pixel) in which a cycle dsL2 of a left notched structure and a cycle dsR2 of a right notched structure do not coincide with each other continue for sunit−1 between the diffusion patterns, in which the cycles of the left and right notched structures coincide with each other. In other words, with a diffusion pattern in which the cycle dsL1 of the left notched structure and the cycle dsR1 of the right notched structure coincide with each other, phases of left and right notched structures coincide with each other. Accordingly, the center of a pixel and the center of a pattern coincide with each other. However, with the sunit−1 number of diffusion patterns, since phases of the left and right notched structures do not coincide with each other, the center of a pixel and the center of a pattern do not coincide with each other (there is a positional relationship between the center of an opening and the center of a pixel which is different from the positional relationship of a coinciding pattern). For example, a configuration expressed by (Eqn 6) may be adopted in order to prevent the cycle dsL2 of the left notched structure and the cycle dsR2 of the right notched structure from coinciding with each other.
(Eqn 6)

$$dsL2 = dsR2 \times (1-dkks) \quad (6)$$

dkks is assumed to be a small value which satisfies 0.0<kks<1.0. Features of the present embodiment create a relationship similar to the positional relationship shown in FIG. 24 (e.g. a positional relationship in a 23-degree diffusion pattern) according to the fifth embodiment by repeating configuration units having sunit described above as a unit. In particular, the following is conceivable.

The greater the value of dkks, the finer the division of the left notched structure relative to the right notched structure and the greater the phase shift between left and right notched structure patterns.

The greater the value of sunit, the closer to a slanted barrier with a steep inclination.

Favorably, the same positional relationship is avoided as much as possible at black matrix regions and auxiliary electrodes.

Figure 45:
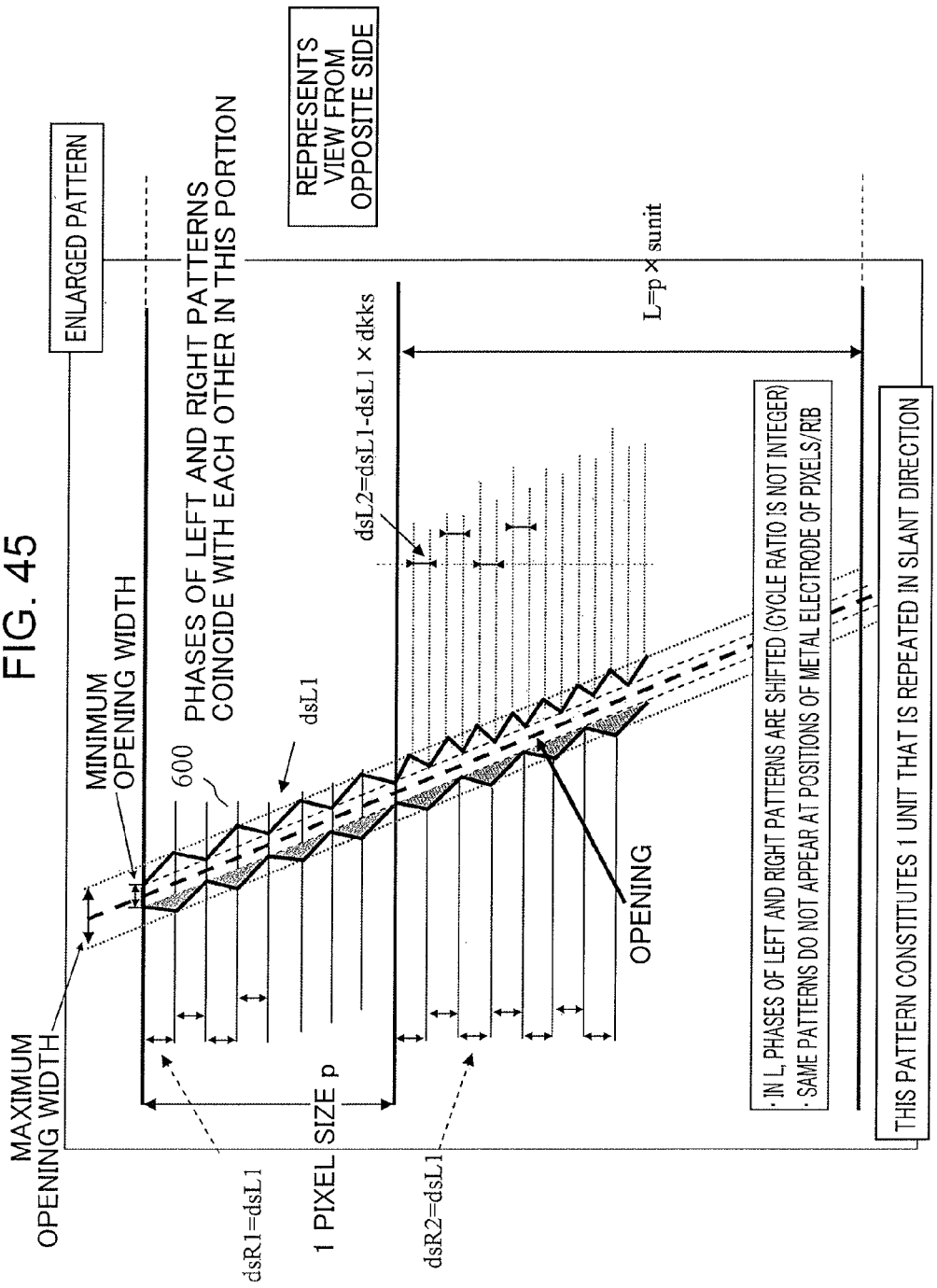
FIG. 45 shows the first example of a slanted barrier or a diffusion pattern to which a notched structure is added in the image display device as the eighth invention according to the present invention.
Figure 46:
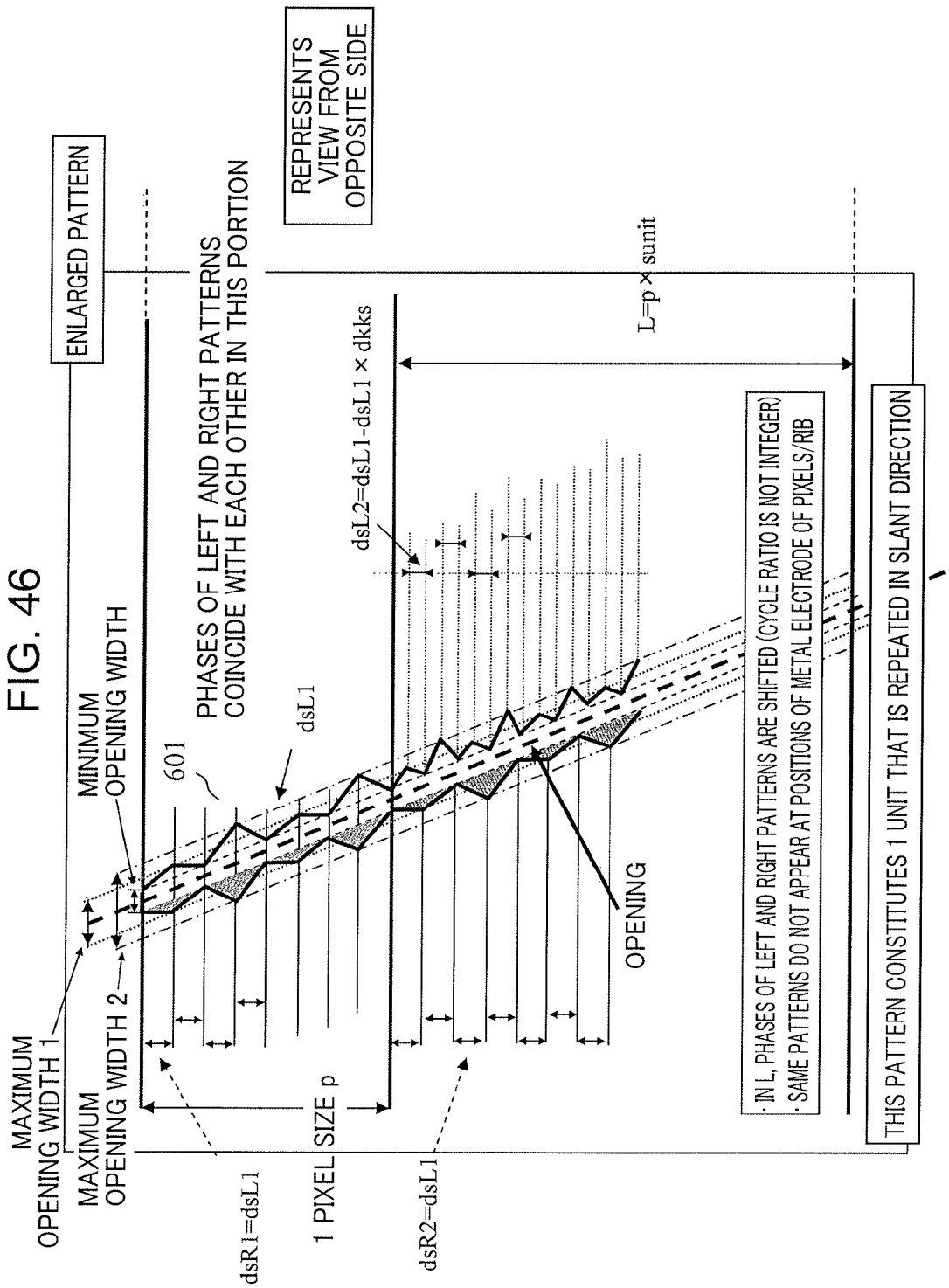
FIG. 46 shows the second example of a slanted barrier or a diffusion pattern to which a notched structure is added in the image display device as the eighth invention according to the present invention.
Figure 47:
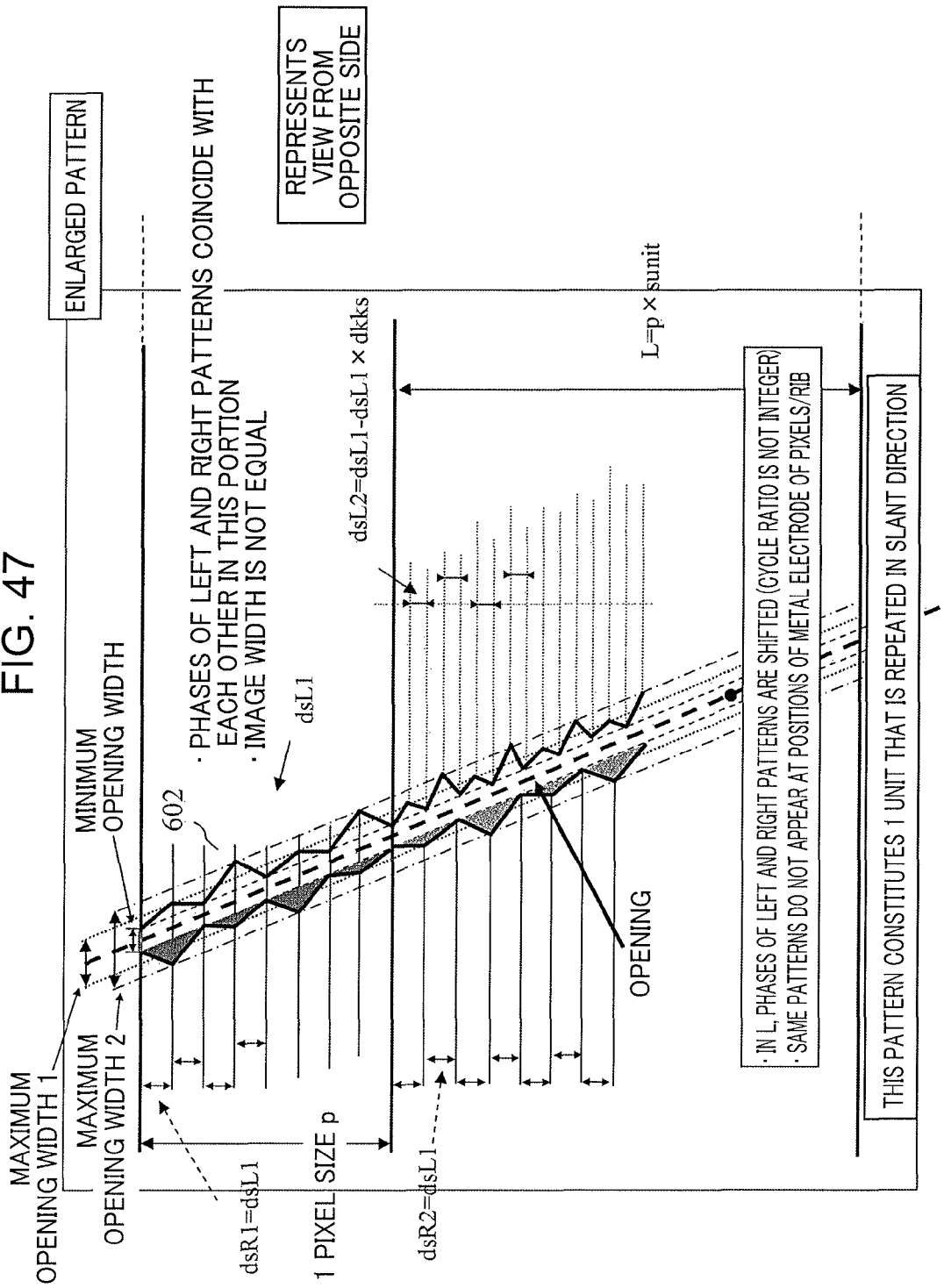
FIG. 47 shows the third example of a slanted barrier or a diffusion pattern to which a notched structure is added in the image display device as the eighth invention according to the present invention.

Although dkks may be set so to dkks<0, it is required that dsL2 be set to or below a predetermined maximum cycle for the purpose of maintaining the average opening ratio. FIGS. 45 to 47 show examples. FIGS. 45 to 47 represent views from an opposite side to the diffusion aforementioned patterns. FIG. 45 shows a case where nL=6.5+5, nR=6.5, β=34 degrees, and sunit=11. In other words, this corresponds to a pattern approaching 23 degrees. FIG. 46 shows that sizes of left and right patterns dwL and dwR in FIG. 45 have two patterns (dw1, dw2) which alternately appear (however, an order of alternating appearances of the left coincides with that of the right). FIG. 47 shows a case where orders, in which left and right widths are repeated, are reversed from FIG. 46. Both FIGS. 46 and 47 are aimed at increasing phase shifts of sunit−1 number of diffusion patterns by varying the left and right widths. In addition to promoting the phase shift shown in FIG. 46, FIG. 47 is also aimed at further approaching a more inclined direction by starting the left with a large-height notched structure while starting the right side with a small-height notched structure. L=sunit×p:p is created so that an average opening ratio of a pixel size is Ave_rh=rhth when dw1=dw+ddw and dw2=dw−ddw are set. An opening area added by the notched structure in L is maintained at Ave_rh, like the sixth embodiment, regardless of the alternation of dwL and dwR and regardless of dkks.

With maintaining the pixel-size average opening ratio Ave_rh, a pattern satisfying crosstalk reduction may be obtained by suppressing the maximum opening width so as to stay in a predetermined size LWMax=sp×dmax relative to the sub-pixel size sp=p/3. In this case, since a minimum opening width of around sub-pixel size ×0.5 or smaller is susceptible to resultant adverse effects from abrupt opening width fluctuation and the influence of fluctuations in viewing positions (horizontal/vertical), it is preferable that the minimum opening width is around sub-pixel size ×0.7 or greater.

The cycles dsL1, dsL2, dsR1 and dsR2 of the notched structures are determined from candidate values adjusted by a method similar to that of the first or third embodiment. In other words, this moiré reduction effect is dependent on a pixel structure of a sub-pixel in the vertical direction. Therefore, when a sub-pixel is divided by t, it is preferable that the cycle is no greater than a size obtained by the number of divisions nn of t (the number of pixel regions)+2 (black matrix regions)+t−1 (auxiliary electrode regions) to the left or the right of an opening. However, as shown in the first or second embodiment, in consideration of the influence of manufacturing errors, it is preferable that a value and as a quotient of a sub-pixel size p in the vertical direction divided by the notch cycle ds is a value which is apart from a vicinity of an integer. If possible, it is preferable that a notch cycle is close to an intermediate value of consecutive integer ratios nn1 and nn1+1 or nn1−1 and nn1 since the influence of manufacturing errors may be almost totally eliminated.

Alternatively, the notched structure may include trapezoids, elliptical arcs with varing curvature, or parallelograms although a notched structure including triangles is used like the first to seventh embodiments. Instead of providing a notched structure in the horizontal direction as shown in FIG. 5, a notched structure may be added in a direction perpendicular to the central axis of the diffusion pattern.

The present embodiment may be applied to a diffusion pattern example having a diagonal stepped structure in which rectangular shapes of sub-pixels are arranged in a diagonal direction although a diffusion pattern having a slanted structure is described as an example.

The present invention may be combined with the second embodiment (FIG. 12). In this case, the pattern example described in the present invention is applicable to a barrier opening or reflecting/diffusing means. A configuration in which the initial adjusting means 105 adjusts a parallax barrier, a diffusion pattern (second embodiment), or alike is obtained. The notch adjusting means 109 is added to the separating adjusting circuit 1200 which controls a barrier opening or the diffusing means adjusting circuit 106 which controls the reflecting/diffusing means.

<Other>

With regard to the image display device according to the present invention described in the aforementioned embodiments, the image display means 100 configured to display parallax images may be a liquid crystal panel, which uses a backlight device, or a light-emitting PDP or organic EL panel. The image display means 100 may be applied to any display means capable of displaying rows of pixels of a parallax image.

The image display device according to the present invention may be combined with a result of a head position detected by means of one camera image or a two or more camera images. A barrier pitch, a distance between a panel and a barrier and alike may be dynamically adjusted by combining the image display device according to the present invention with head tracking or eye tracking. Besides using images, tracking may be performed by means of a time of flight (TOF) method in which distance is measured by measuring a time TOF from irradiation of an object by illuminating light of an LED light source or alike to the return of reflected light or by means of a wired connection method which performs three-dimensional position measurement using electromagnetic force.

A tracking method in which a predetermined test pattern is always displayed in a photograph of a viewer and a geometric measurement is performed on the basis of a size, a moiré variation of a pixel value or alike of the test pattern portion may be used.

Alternatively, an image of an entire person may be used although position detection is premised on the detection of the head of a person. In this case, a region of a pupil or an eye is extracted. Position detection is performed on the basis of the extraction result.

When controlling an arrangement of pixel rows of several parallax images according to a head position, the arrangement of pixel rows may be controlled by performing real-time calculations using a CPU, a GPU or alike. The arrangement of pixel rows may be selected from an LUT table prepared in advance.

A barrier formation position or pitch intervals are fixed except for initial adjustment in the description above. In this case, a barrier may be manufactured during manufacturing processes of electronic components such as a flat panel display, which is an example of the image display portion 100, or a print circuit board using a photomask which functions as an original plate in transfer techniques for transferring wiring or circuit patterns of components. In this case, materials used in the photomask include a hard mask, in which a shading film portion is created on glass using a chrome (or chromic oxide) thin film, and an emulsion mask, in which a shading film region is created on a flexible and transparent polymeric film or glass using blackened metallic silver. In the case of glass, when a process rule is an ultra-fine process, synthetic silica may be used, instead of ordinary soda-lime glass. A shading film pattern of this mask is created by means of optical techniques. A chrome or emulsion shading film is created by sputtering on an entire one side of very smoothly polished glass. Subsequently, photoresist is coated on the shading film. A pattern is then drawn by light irradiation. Examples of a drawing apparatus include a laser pattern generator and a beam exposure apparatus which utilizes electron beams. In this case, a width of a notched structure or an angle of a peak (i.e. a height) of a notched structure is dependent on a beam diameter or a pitch accuracy of the drawing apparatus. For example, the width of a notched structure has to be greater than the beam diameter. In addition, an undulating portion which constitutes a notched structure requires an angle no less than a predetermined magnitude in order to enable pattern generation at several points by a laser. In other words, a notched structure is created so as to satisfy a minimum width or a minimum height of a notched structure which may be described by a laser diameter or a laser pitch of a laser pattern generator or alike that is used in drawing processes. Fixed barriers may be mass-produced using the aforementioned mask member. Alternatively, barriers may be created by directly transferring these materials onto glass or alike to form a shading region.

In addition to the aforementioned materials, a liquid crystal display/panel or alike in which liquid crystals are sandwiched between two sheets of glass or a device including liquid crystal and a polarizing plate may be used in a parallax barrier portion. In this case, since there are advantages that a light-shielded state is created under voltage application and a light-transmitting state is created when voltage is set to zero, it is possible to freely adjust regions, which may be switched between a completely shielded state (light transmittance is 0%) and a completely transmitted state (light transmittance is 100%), and regions, in which light transmittance can be freely controlled. When a device, in which light transmission/shield is controlled by voltage application to liquid crystal or alike, is used in a parallax barrier portion, a width (cycle, wave width) and a height (wave height, amplitude) of a notched structure are determined on the basis of a resolution (pixel pitch) of a liquid crystal panel in use or on accuracy of a shape formed by an oxide of indium and tin (ITO) which is used as a transparent electrode material. Therefore, the width and the height of the notched structure has to be set to no less than the resolution or accuracy. A further advantage of this configuration is that a barrier position or a barrier pitch may be actively varied according to a head position. In this case, even a simultaneous variation in depth direction of a few observers may be acceptable. The image display device according to the present invention may be applied to a case where a fixed barrier position or a fixed barrier pitch is used for adjustment upon installing a panel according to the present invention in a space such as a living room in which the panel is viewed.

Evaluation of a barrier or a diffusion pattern, to which a notched structure according to each embodiment is added, may be performed by adding the frequency distribution analyzing means according to the fourth embodiment to the sixth, seventh, or eighth embodiment. Or a moiré pattern may be estimated or evaluated in advance for a barrier or a diffusion pattern candidate obtained in each embodiment using the moiré estimating means or the moiré pattern evaluating means according to the third embodiment. Likewise, several barriers or diffusion pattern candidates obtained from the fifth to seventh embodiments may be automatically adjusted by combining the fifth embodiment with the sixth, seventh or eighth embodiment.

Similar effects are achieved even when the notched structure has a saw-tooth shape, a hog-backed shape, a step shape, a shape of a trigonometric function such as a sine function, a cosine function, or a tangent function including a sine curve, a rectangular shape, a trapezoidal shape, a parallelogrammatic shape, a dog-leg shape, or a crescent shape although the first to eighth embodiments are described based on a notched structure having protrusions and recesses.

Although the fourth to eighth embodiments describe a notched structure having protrusions and recesses, in which heights or widths of the protrusions are not uniform (non-uniform), this represents that a state where protrusions with a few heights coexist or a state where protrusions with a few widths coexist.

Although a method of determining a notched structure on the basis of a structure of a sub-pixel is described in the first to eighth embodiments, this method is not restrictive. A notched structure has to be only based on a structure of a minimal unit that forms an image. For example, a notched structure may be based on a structure of a pixel including several sub-pixels.

The present invention may be applied to a barrier pattern shape for suppressing leakage of light (stray light) from a lens boundary in a lenticular system or to a barrier shape or a diffusion pattern shape having a vertical striped structure. A means for reflecting or diffusing stray light may be solely provided near the lens boundary in order to suppress stray light from the boundary in a lenticular system. In this case, the present invention may be applied to a barrier pattern shape arranged solely at the boundary portion.

The image display device described on the basis of the aforementioned various embodiments has the following features.

The first image display device according to the present invention reduces moiré by providing a means for guiding light from a light source, arranging a diffusion pattern at predetermined intervals in the means for guiding and diffusing light, and adding a notched structure to an edge portion of the diffusion pattern when diffusing and separating incident light on the diffusion pattern in a predetermined direction of display means. By providing a mechanism which determines a cycle of an uneven portion (notches) so that adverse effects are not created by the notches themselves of the diffusion pattern edge, stereoscopic image display is provided so that an amount/range of blur of pixels visible under light illumination after diffusion by the diffusion pattern and orientation toward the display means may be controlled.

With regard to the first image display device according to the present invention, stereoscopic image display may be realized by determining a cycle of an uneven portion (notches) so that adverse effects are not created by the notches themselves and adding a notched structure to a diffusion pattern edge portion in order to control an amount/range of blur of pixels visible under light illumination after diffusion by the pattern and orientation toward display means.

The second image display device according to the present invention includes a parallax barrier constituted by an opening which allows light transmission from a light source means and a barrier portion which blocks light, and reflecting means situated between image separating means and the light source means and configured to reflect and diffuse light, which is emitted from the light source means and then shielded by the image separating means. Moiré is reduced by adding a notched structure to one of the parallax barrier and the diffusing means. By providing a mechanism which determines a cycle of an uneven portion (notches) so that adverse effects are not created by the notches themselves of the diffusion pattern edge, stereoscopic image display is provided so that an amount/range of blur of pixels visible under light illumination after diffusion by the diffusion pattern and orientation toward the display means may be controlled.

With regard to the second image display device according to the present invention, stereoscopic image display may be realized by determining a cycle of an uneven portion (notches) so that adverse effects are not created by the notches themselves and adding a notched structure to an edge of a parallax barrier opening or reflecting means in order to control a blur amount/range of pixels visible under light illumination after diffusion by the pattern and orientation toward display means.

The third image display device according to the present invention provides the image display device according to the first or second invention, further including a mechanism which uses parameters for realizing a notched structure to perform moiré pattern estimation. Based on the analysis, the mechanism determines whether or not resultant adverse effects from the notches themselves are created.

With regard to the third image display device according to the present invention, in addition to the first or second invention, a mechanism determines whether or not resultant adverse effects from the notches themselves are created on the basis of evaluation and analysis of a moiré pattern using parameters for realizing a notched structure. Further appropriate adjustment to the notched structure may be achieved with confirming presence/absence of adverse effects due to the notched structure itself.

The fourth image display device according to the present invention provides stereoscopic image display. An adjustable range is expanded by adding variation parameters for a phase shift between left and right notched structures, a gap between notched structures, and a maximum opening width to any one of the first to third inventions. A moiré pattern is estimated by means of parameters for realizing a notched structure. By adding a notched structure obtained by comparing frequency characteristics of moiré patterns obtained by a diffusion pattern or a parallax barrier having a predetermined reference angle and estimating appropriate parameters, quantitative evaluation of a moiré pattern obtained by each parameter is performed.

With regard to the fourth image display device according to the present invention, the adjustable range is further expanded by adding variation parameters for a phase shift between left and right notched structures, a gap between notched structures, and a maximum opening width to any one of the first to third inventions. Quantitative evaluation of a moiré pattern obtained by each parameter may be performed by comparing frequency characteristics between a moiré pattern estimated from parameters for realizing a notched structure using an appropriately adjusted notch cycle, like any one of the first to third inventions, with a moiré pattern obtained by a barrier having a predetermined reference angle. Based on the evaluation, a pattern may be studied which is capable of reducing moiré contrast without increasing crosstalk.

The fifth image display device according to the present invention provides stereoscopic image display having a more appropriate notched pattern by performing the quantitative evaluation of each moiré pattern according to the fourth invention on several pattern candidates, which satisfy a notch cycle, and by performing a predetermined optimization search.

With regard to the fifth image display device according to the present invention, a diffusion pattern, a parallax barrier or a reflecting means pattern may be automatically optimized so that adverse effects due to the notches themselves are not created, by performing the quantitative evaluation of each moiré pattern according to the fourth invention on several pattern candidates, which satisfy a notch cycle, and by performing a predetermined optimization search.

The sixth image display device according to the present invention provides stereoscopic image display having a barrier pattern structure which has a notched structure so that a proportion of a visible pixel region through openings in the barrier pattern is as uniform as possible among respective barrier positions, which are aligned in the horizontal direction, by using a notch cycle evaluated and appropriately adjusted according to any one of the first to third inventions.

It is also conceivable that due to omissions of positional relationships among openings, pixel regions, and black matrix caused by black portions and in-pixel electrodes, an imbalance is created in the coexistence relationship among the openings, the pixel regions, and the black matrix for each barrier, which causes a moiré pattern.

With regard to the sixth image display device according to the present invention, by providing a notched structure so that a proportion of a visible pixel region through light from a parallax barrier pattern or a diffusion pattern is as uniform as possible among respective barrier positions, which are aligned horizontally by using a notch cycle evaluated and appropriately adjusted according to any one of the first to third inventions, stereoscopic image display in which moiré contrast is reduced without increasing crosstalk may be provided.

The seventh image display device according to the present invention provides stereoscopic image display having a barrier structure to which a notched structure is added using the notch cycle evaluated and appropriately adjusted according to any of the first to third inventions to restore omitted positional relationships and to improve an imbalance of coexistent positional relationships.

With the seventh image display device according to the present invention, by adding a notched structure using the notch cycle evaluated and appropriately adjusted according to any one of the first to third inventions so as to improve an imbalance of coexistent relationships due to omissions of positional relationships among openings, pixel regions, and a black matrix caused by black portions and in-pixel electrodes, moiré contrast may be reduced without increasing crosstalk.

The eighth image display device according to the present invention provides stereoscopic image display having a barrier structure which has a repetitive unit structure formed along a barrier pattern by groups of pixels, in which phases created by left and right notched structures coincide with each other, and groups of pixels, in which pattern phases do not coincide with each other, using a notch cycle evaluated and appropriately adjusted according to any one of the first to third inventions.

With regard to the eighth image display device according to the present invention, by providing and repeating a unit structure formed along a barrier pattern by groups of pixels, in which phases created by left and right notched structures coincide with each other, and groups of pixels, in which pattern phases do not coincide with each other, using a notch cycle evaluated and appropriately adjusted according to any one of the first to third inventions, moiré contrast may be reduced without increasing crosstalk.

INDUSTRIAL APPLICABILITY

The present invention provides advantages of reducing moiré without increasing crosstalk with a multi-view system which uses a diffusion pattern to produce an effect comparable to that of a parallax barrier system. Further advantages are provided in that moiré may be reduced without increasing crosstalk with a multi-view system which combines reflecting means with a parallax barrier. A mechanism is provided to appropriately adjust a cycle of a notched structure so that adverse effects (horizontal or diagonal stripes or alike) caused by the notched structure itself are suppressed.

By combining distribution of light from a light source with a diffusion pattern or reflecting means with a parallax barrier, brighter image display than a system which solely uses an ordinary parallax bather having a shielding and an opening may be achieved.

What is claimed is:
1. An image display device comprising:
an image display which includes pixel units to display a composite image of different images;
a light source which illuminates the image display; and
a diffuser situated behind the image display, the diffuser having diffusion patterns to diffuse and transmit light from the light source to the image display and allowing at least one of images included in the composite image displayed on the image display to be observed, wherein
the diffuser reflects and guides the light from the light source,
the diffusion patterns are engraved at predetermined intervals on the diffuser so that the diffusion pattern diffuses and transmits incident light on the diffusion pattern toward the image display,
the diffusion patterns are continuous in a direction having a predetermined angle with respect to a vertical direction and arranged at predetermined intervals in a horizontal direction,
paired facing edges forming the diffusion patterns include repetitions of recesses and protrusions, the repetitions having a cycle adjusted within a predetermined range,
the protrusions of at least one of the paired facing edges are inconsistent in height or width,
start positions of the cycles of the repetitions of the paired facing edges are different from each other by a phase shift dp,
the cycles of the repetitions of the paired facing edges are different from each other, and
the phase shift dp is smaller than both of the cycles of the repetitions of the paired facing edges.
2. An image display device comprising:
an image display which includes pixel units to display a composite image of different images;
a light source which illuminates the image display;
an image separator situated at a predetermined distance from the image display, the image separator having openings, which allow light transmission, and barrier portions, which shield the light from the light source, to separate at least one of images included in the composite image displayed on the image display and make the at least one of the images observable; and a reflector situated between the image separator and the light source and configured to reflect light, which is emitted from the light source and then shielded by the image separator, wherein the openings of the image separator or edge portions of the reflector are continuous in a direction having a predetermined angle with respect to a vertical direction, and arranged at predetermined intervals in a horizontal direction, paired facing edges forming the openings include repetitions of recesses and protrusions, the repetitions having a cycle adjusted within a predetermined range, the protrusions of at least one of the paired facing edges are inconsistent in height or width, start positions of the cycles of the repetitions of the paired facing edges are different from each other by a phase shift dp, the cycles of the repetitions of the paired facing edges are different from each other, and the phase shift dp is smaller than both of the cycles of the repetitions of the paired facing edges.

3. The image display device according to claim 1, wherein gaps are added between the repetitions of the respective paired facing edges, and each of the gaps is smaller than both of the cycles of the repetitions of the paired facing edges.

4. The image display device according to claim 2, wherein gaps are added between the repetitions of the respective paired facing edges, and each of the gaps is smaller than both of the cycles of the repetitions of the paired facing edges.

* * * * *